(12) United States Patent
Redford et al.

(10) Patent No.: US 8,660,545 B1
(45) Date of Patent: Feb. 25, 2014

(54) RESPONDING TO A VIDEO REQUEST BY DISPLAYING INFORMATION ON A TV REMOTE AND VIDEO ON THE TV

(75) Inventors: Peter Redford, Saratoga, CA (US); Bala Chander, Saratoga, CA (US)

(73) Assignee: ILook Corporation, San Jose, CA (US)

( * ) Notice: Subject to any disclaimer, the term of this patent is extended or adjusted under 35 U.S.C. 154(b) by 541 days.

(21) Appl. No.: 12/683,405

(22) Filed: Jan. 6, 2010

(51) Int. Cl.
*H04M 3/00* (2006.01)

(52) U.S. Cl.
USPC ............... 455/418; 455/414.1; 455/556.1; 725/39; 348/552

(58) Field of Classification Search
USPC ........ 455/418, 414.1, 556.1; 725/39; 348/552
See application file for complete search history.

(56) References Cited

U.S. PATENT DOCUMENTS

| | | | |
|---|---|---|---|
| 6,567,984 B1 | 5/2003 | Allport | |
| 6,741,684 B2 | 5/2004 | Kaars | |
| 7,428,023 B2 | 9/2008 | Allen et al. | |
| 7,479,949 B2 | 1/2009 | Jobs et al. | |
| 7,643,095 B2 * | 1/2010 | Yoshii | 348/687 |
| 2002/0031120 A1 * | 3/2002 | Rakib | 370/386 |
| 2006/0123076 A1 | 6/2006 | Raiyat | |
| 2007/0250863 A1 * | 10/2007 | Ferguson | 725/46 |
| 2008/0092198 A1 * | 4/2008 | Hutten | 725/133 |
| 2008/0122796 A1 | 5/2008 | Jobs et al. | |
| 2008/0281718 A1 * | 11/2008 | Morgan | 705/26 |
| 2009/0007198 A1 * | 1/2009 | Lavender et al. | 725/91 |
| 2009/0204493 A1 | 8/2009 | Kim | |
| 2010/0095345 A1 * | 4/2010 | Tran et al. | 725/131 |
| 2010/0321095 A1 * | 12/2010 | Mikawa et al. | 327/525 |
| 2011/0063317 A1 * | 3/2011 | Gharaat et al. | 345/545 |

OTHER PUBLICATIONS

Kleban, T. "A Tutorial on Watching YouTube Videos From an iPhone", published on Ezine on Oct. 19, 2007, pp. 2.
Wilson, B. "Possibly the Best iPhone Web app yet: vtap trumps built-in iPhone YouTube app", published on CNET on Nov. 2, 2007, p. 1.
Maltais, M. "Appiphilia: i.TV app tunes in new features for iPhone", published of the Los Angeles Times on Dec. 23, 2008, pp. 6.
Lowensohn, J. "i.TV's iPhone app gets deep Netflix integration", published on CNET on Nov. 10, 2008, pp. 2.
Sadun, E. "i.TV for iPhone: Cluttered but promising entertainment guide", published on Aug. 17, 2009 of Weblogs, Inc., pp. 2.
vTap—Frequently Asked Questions, Recently Raised questions (Mobiles using m.vtap.com), retrieved from http://vtap.com/faq.html on Nov. 22, 2009, pp. 7.
Katzmaier, D. "Could an Apple HDTV plus an iPhone remote equal living room bliss?", retrieved from http://news.cnet.com/8301-17938_105-10314746-1.html, Aug. 21, 2009, pp. 4.
Chen, B. X. "Flash Lands on iPhone—One App at a Time", retrieved from http://www.wired.com/gadgetlab/2009/10/iphone-flash/, Oct. 5, 2009, pp. 13.

* cited by examiner

*Primary Examiner* — Danh Le
(74) *Attorney, Agent, or Firm* — Silicon Valley Patent Group LLP

(57) ABSTRACT

A handheld device displays multiple applications ("apps"), from which a user selects one app. The selected app displays multiple descriptions of videos, from which the user selects one video. The handheld device transmits a video request containing an identification of the user-selected video. The computer system transmits the user-selected video to the television and transmits a signal to the handheld device, based on the video request. The television responds by automatically displaying on a television screen, a series of frames in the video, on receipt therein. The handheld device automatically displays on a handheld screen, information that is directly or indirectly based on the video request, as the signal is received from the computer system. Two displays based on a single video request, provide a richer viewing experience than a single display.

50 Claims, 42 Drawing Sheets

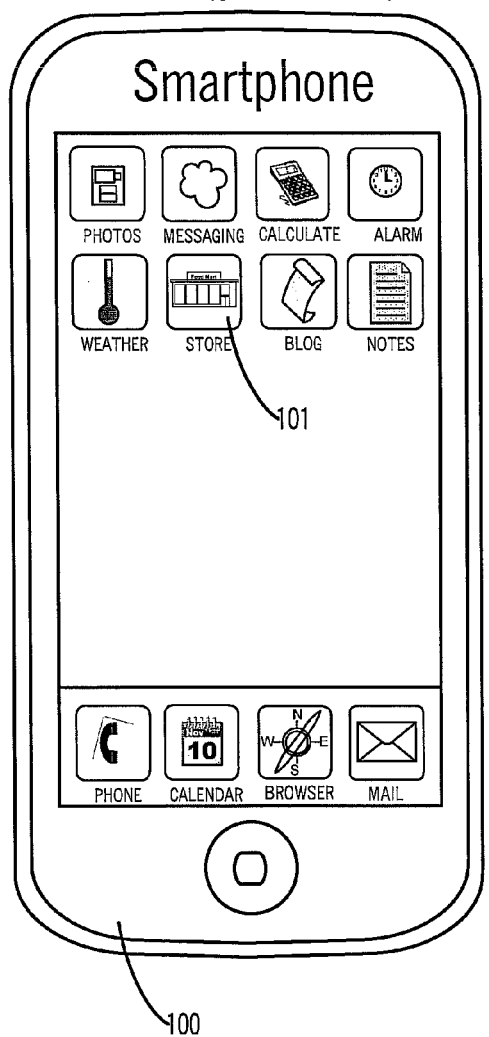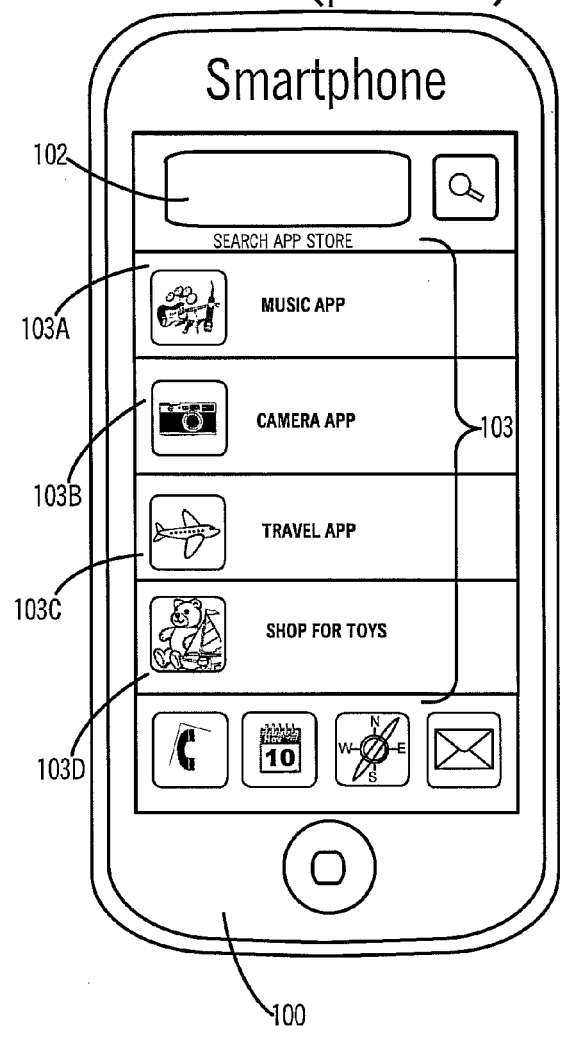

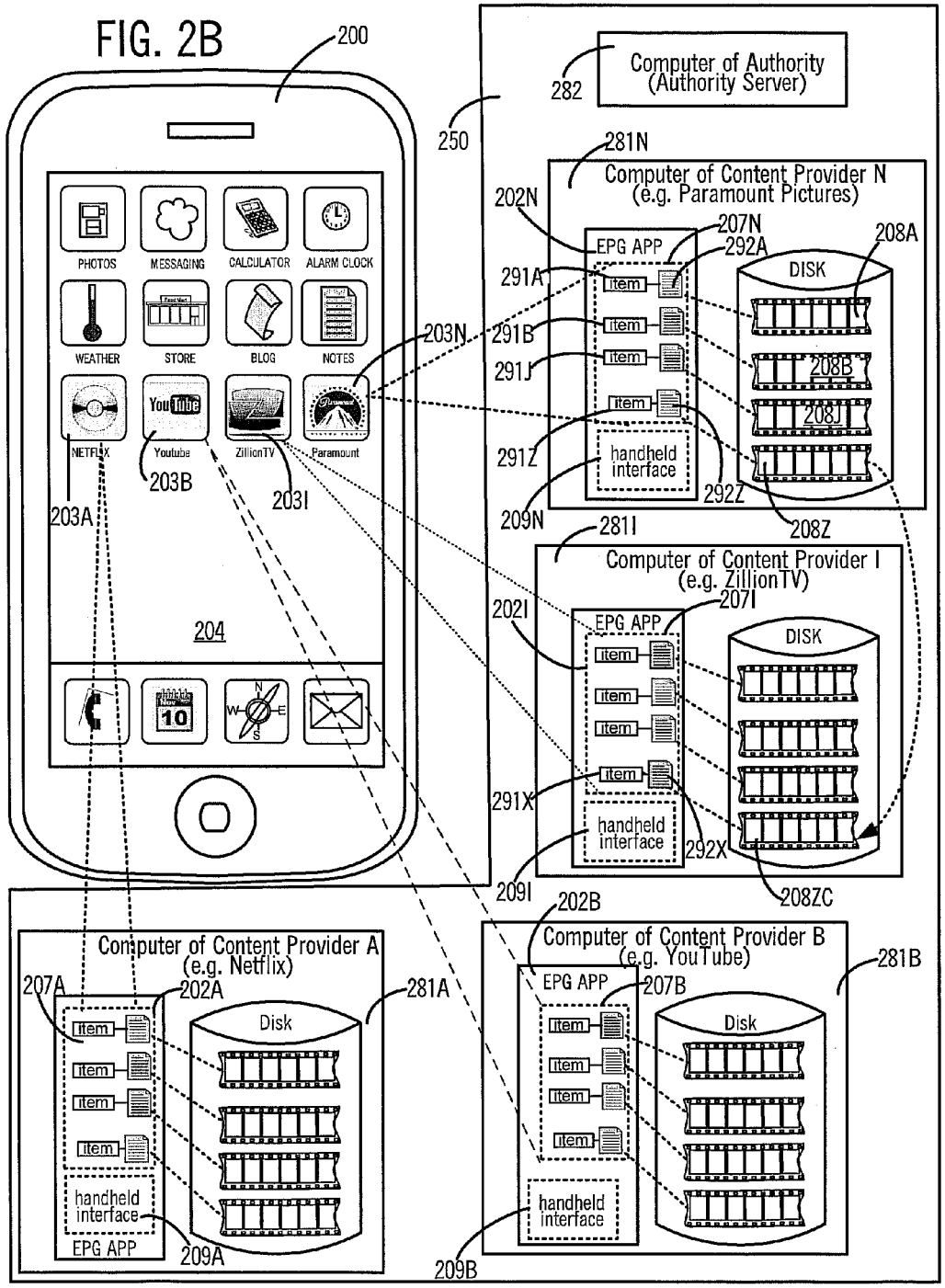

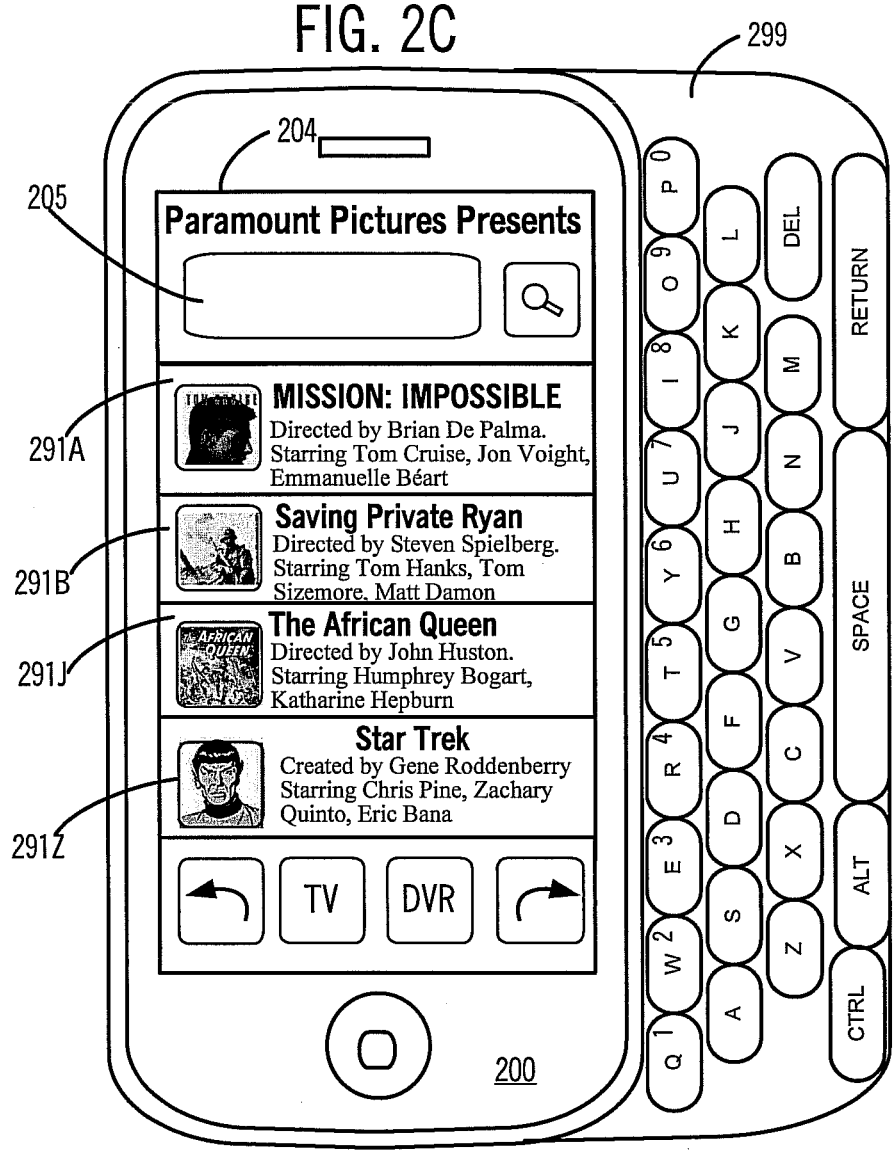

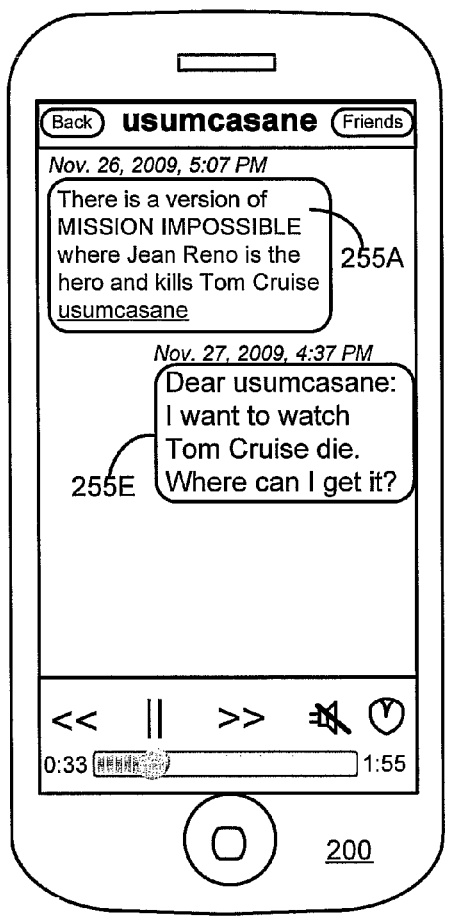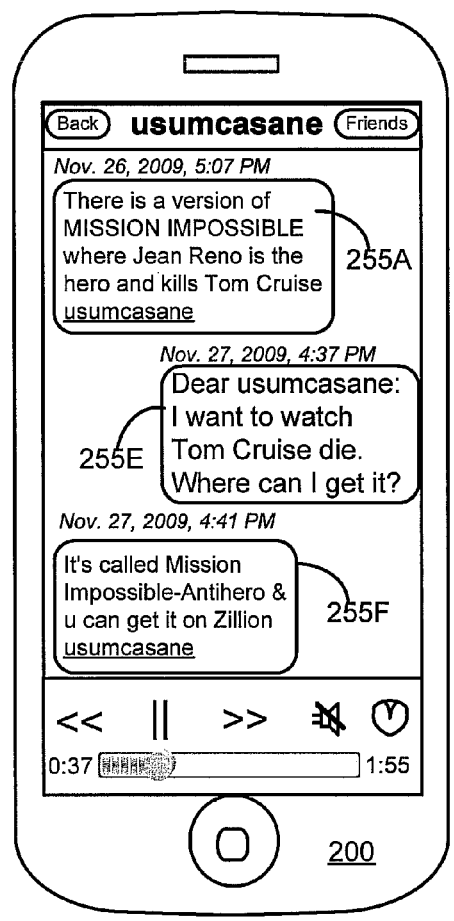

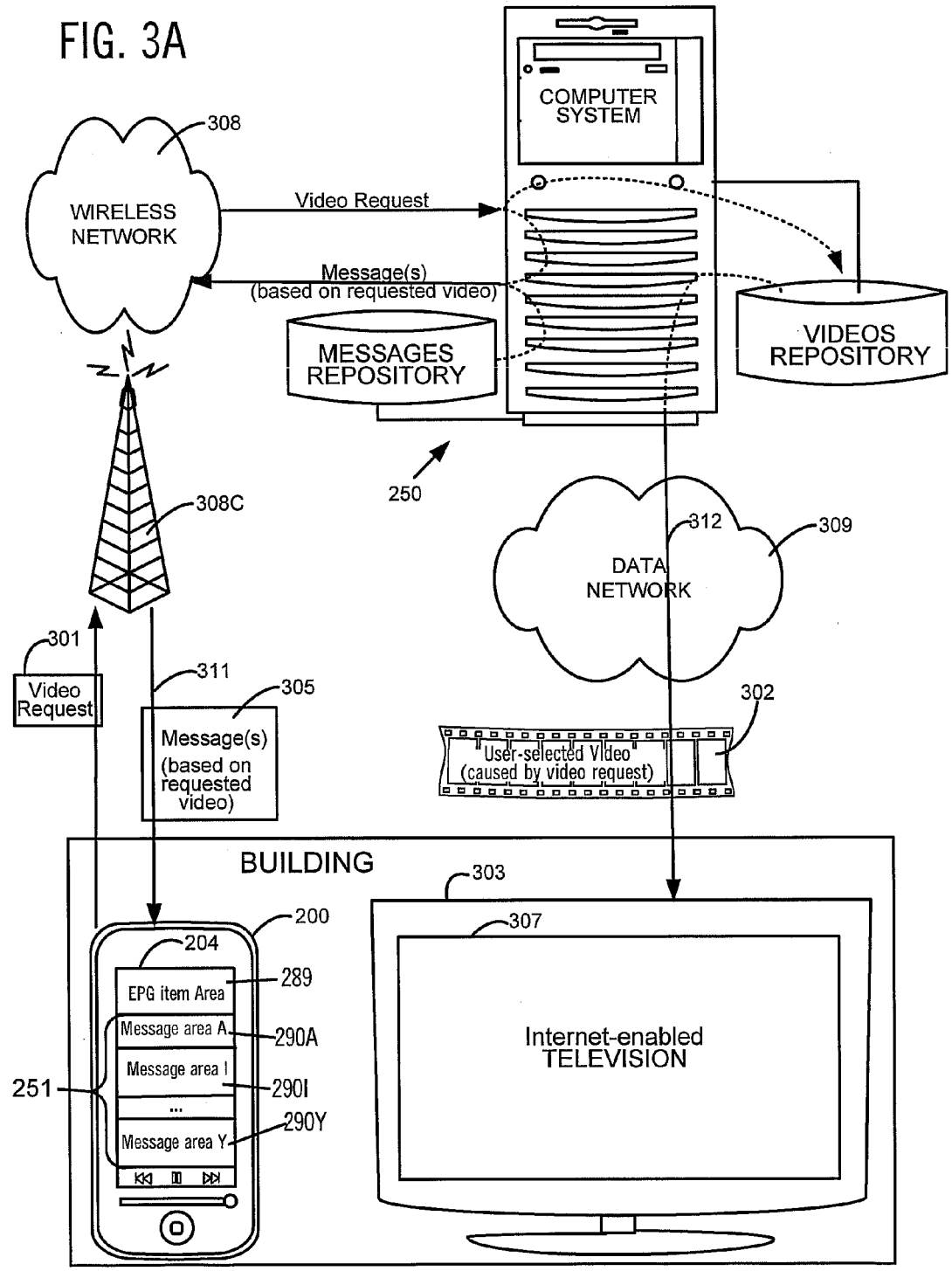

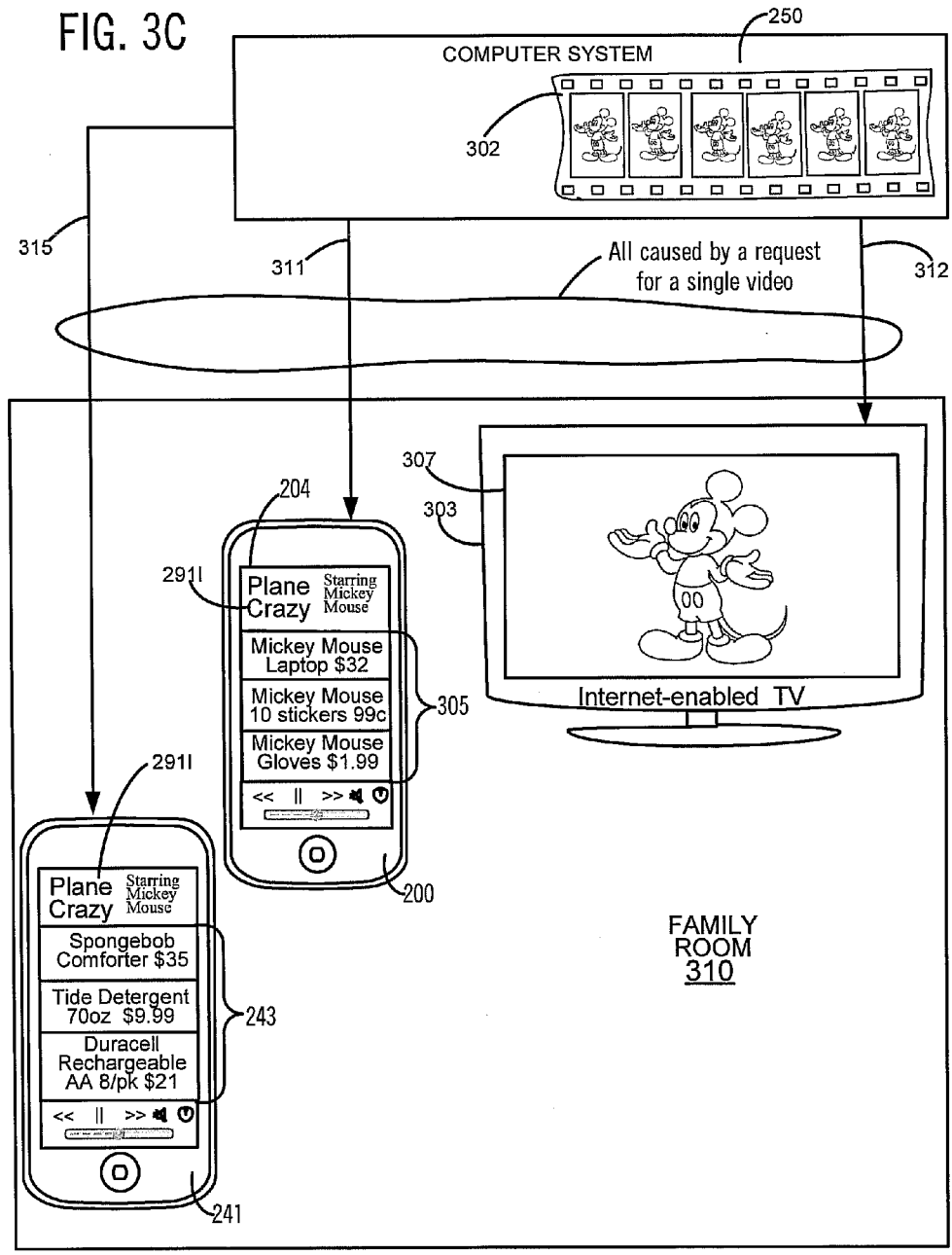

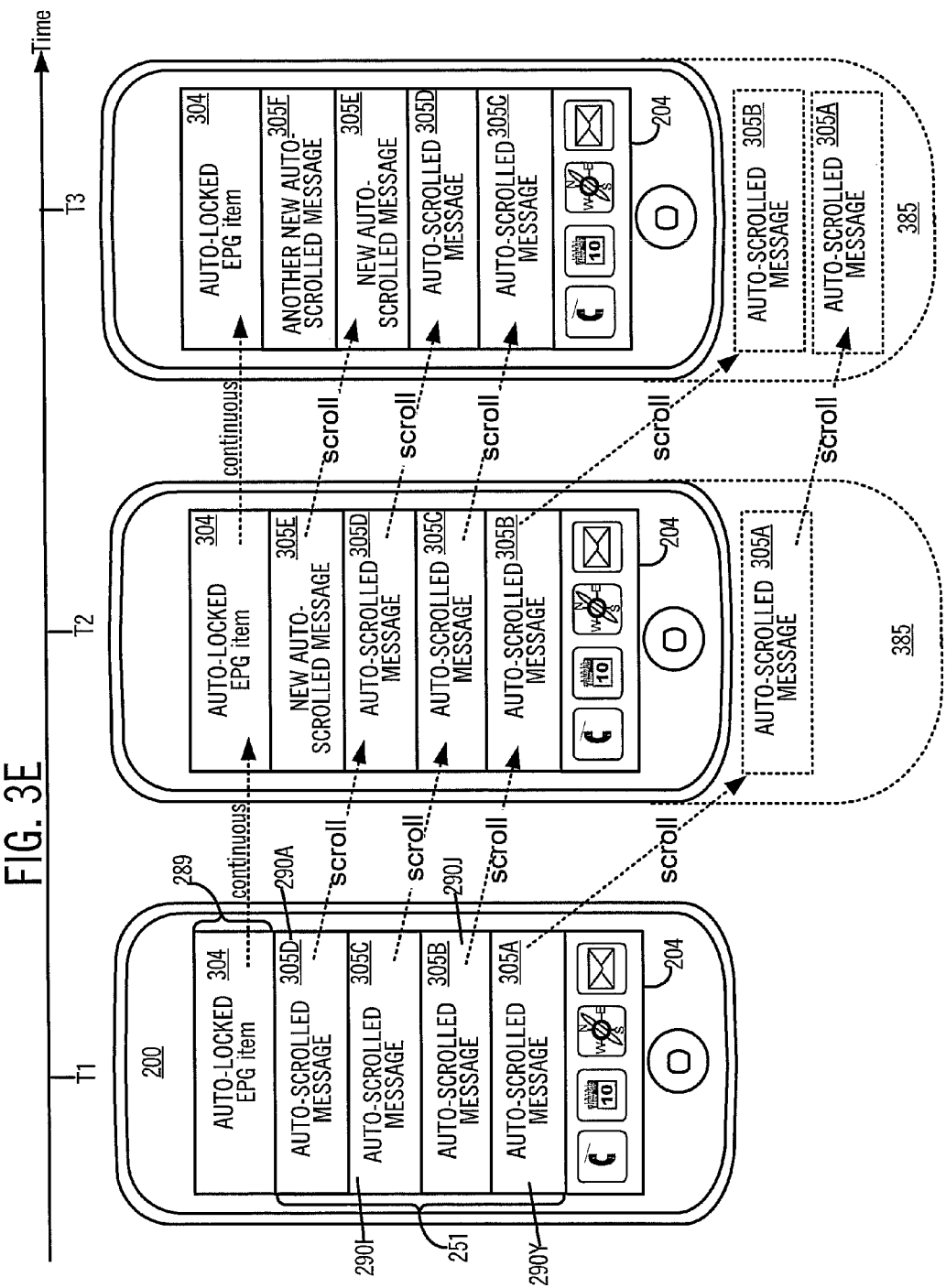

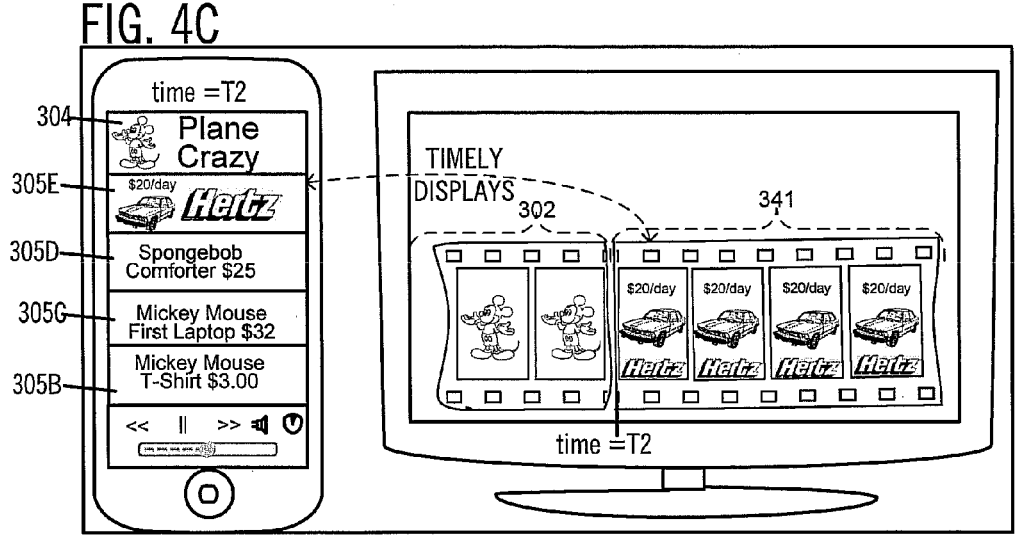
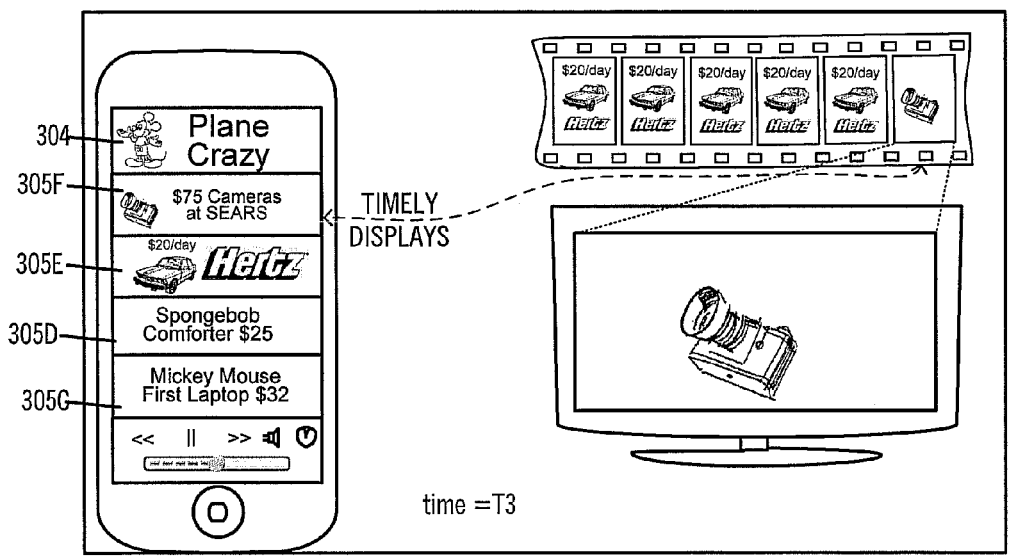

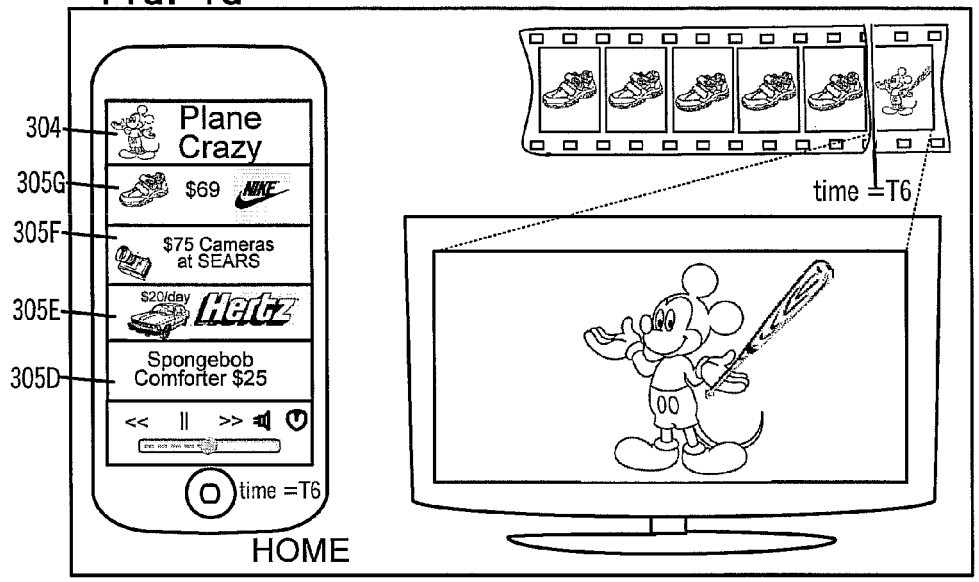
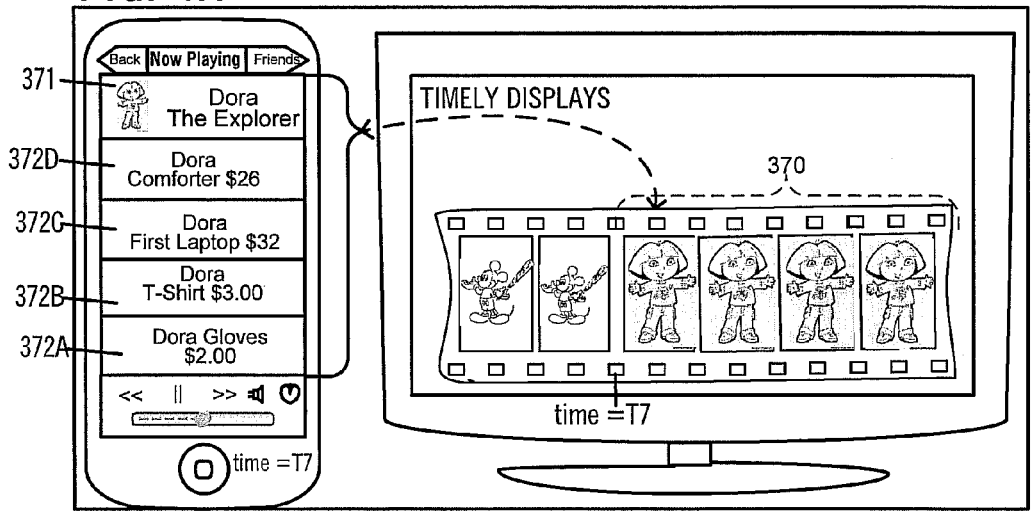

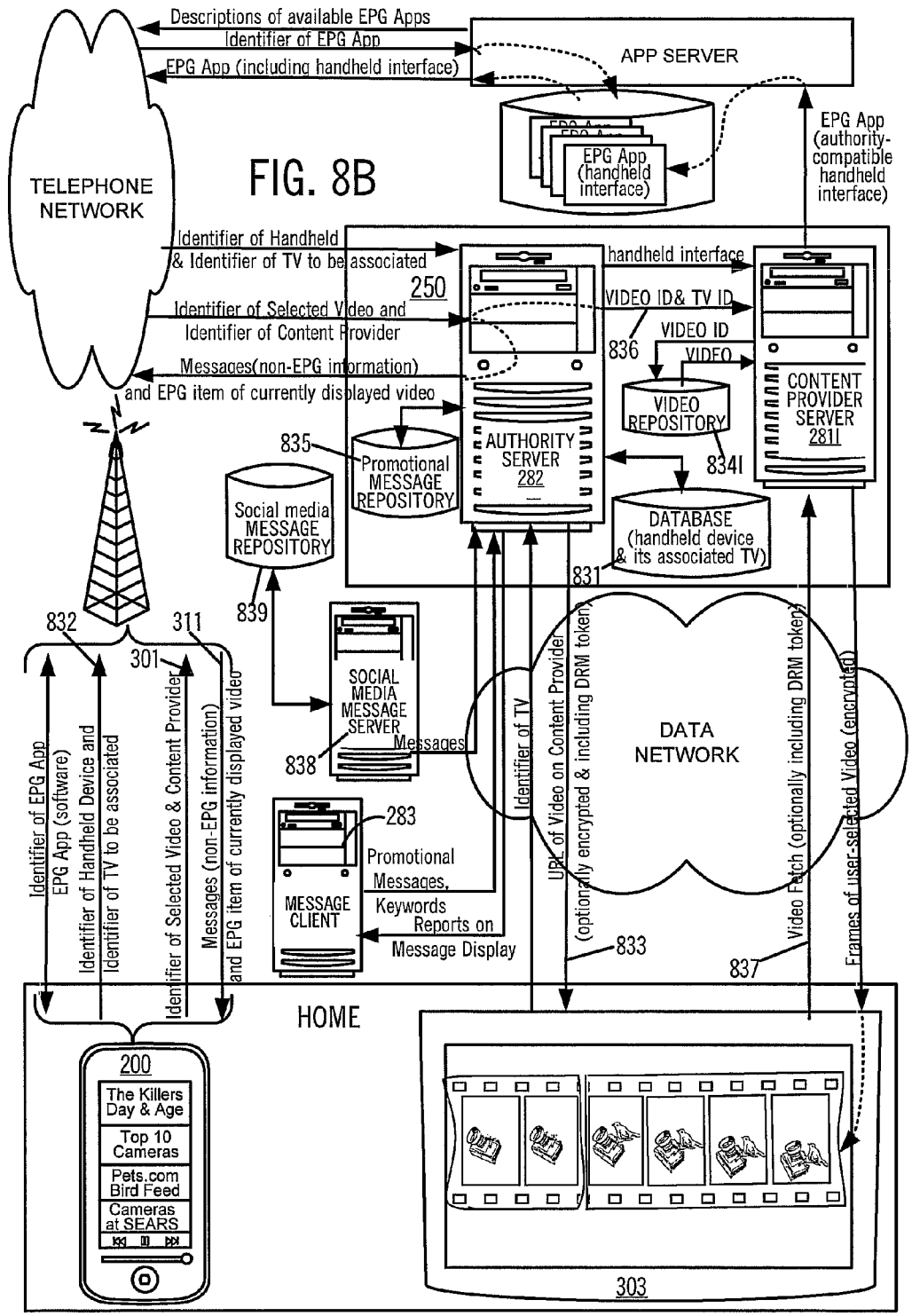

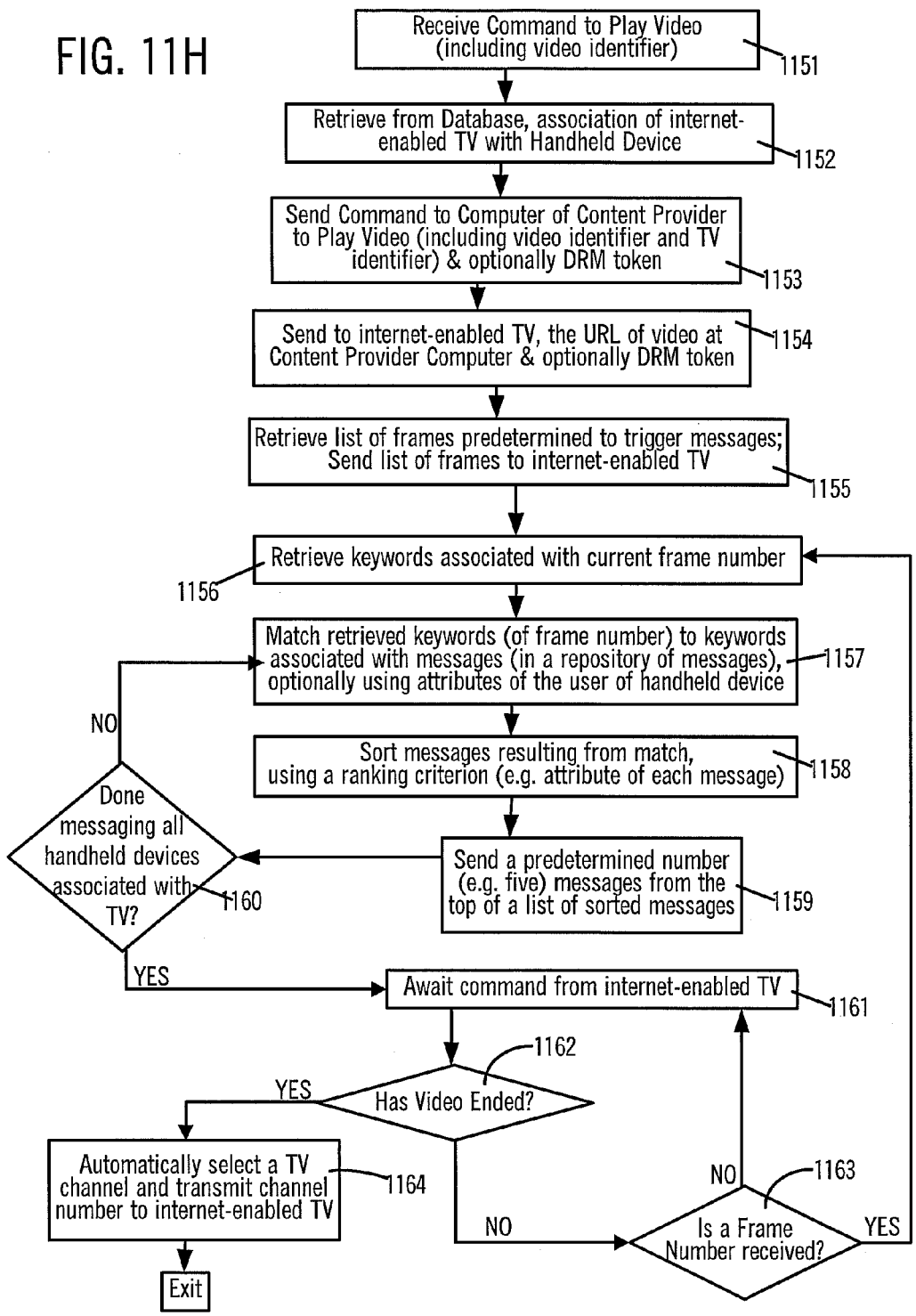

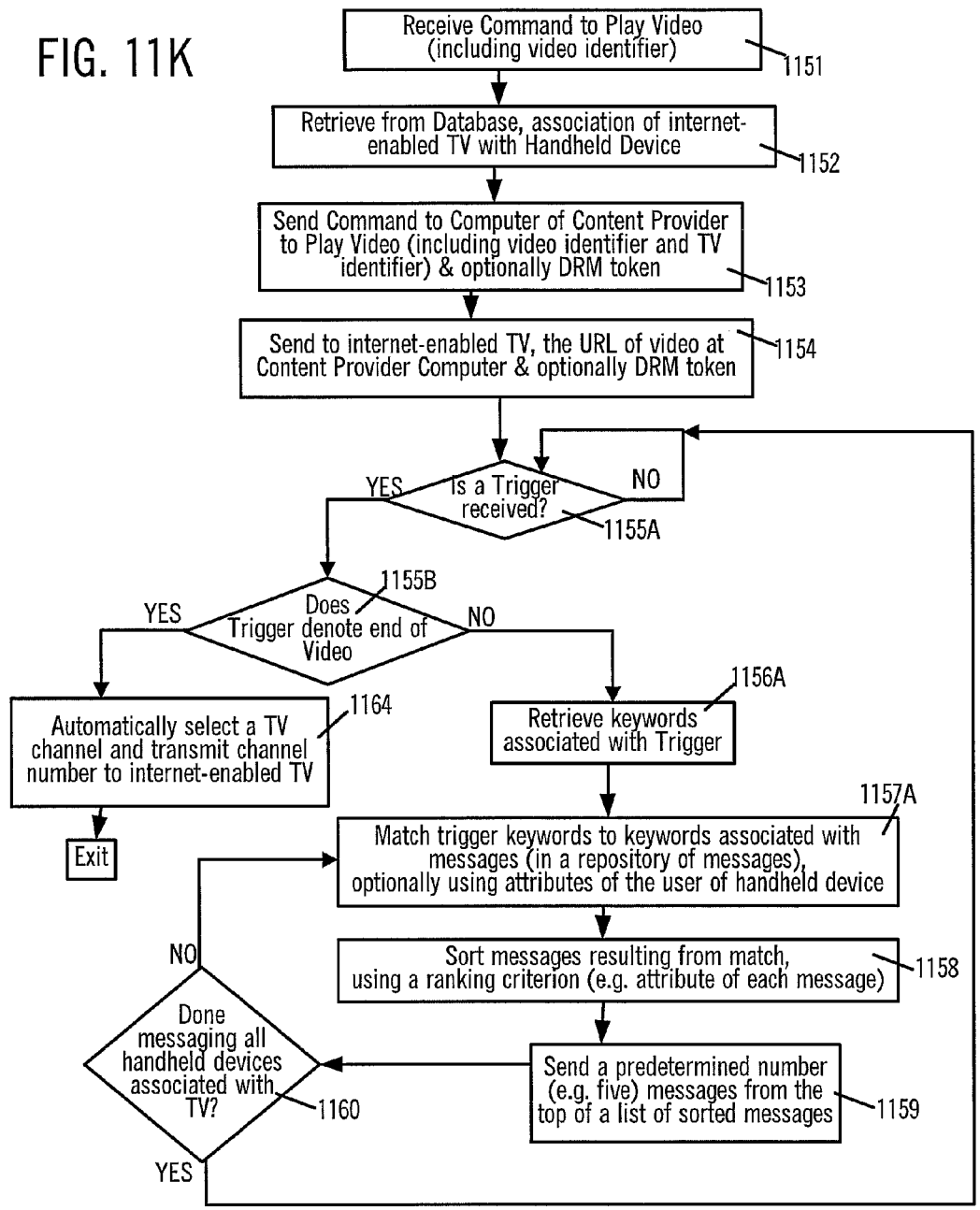

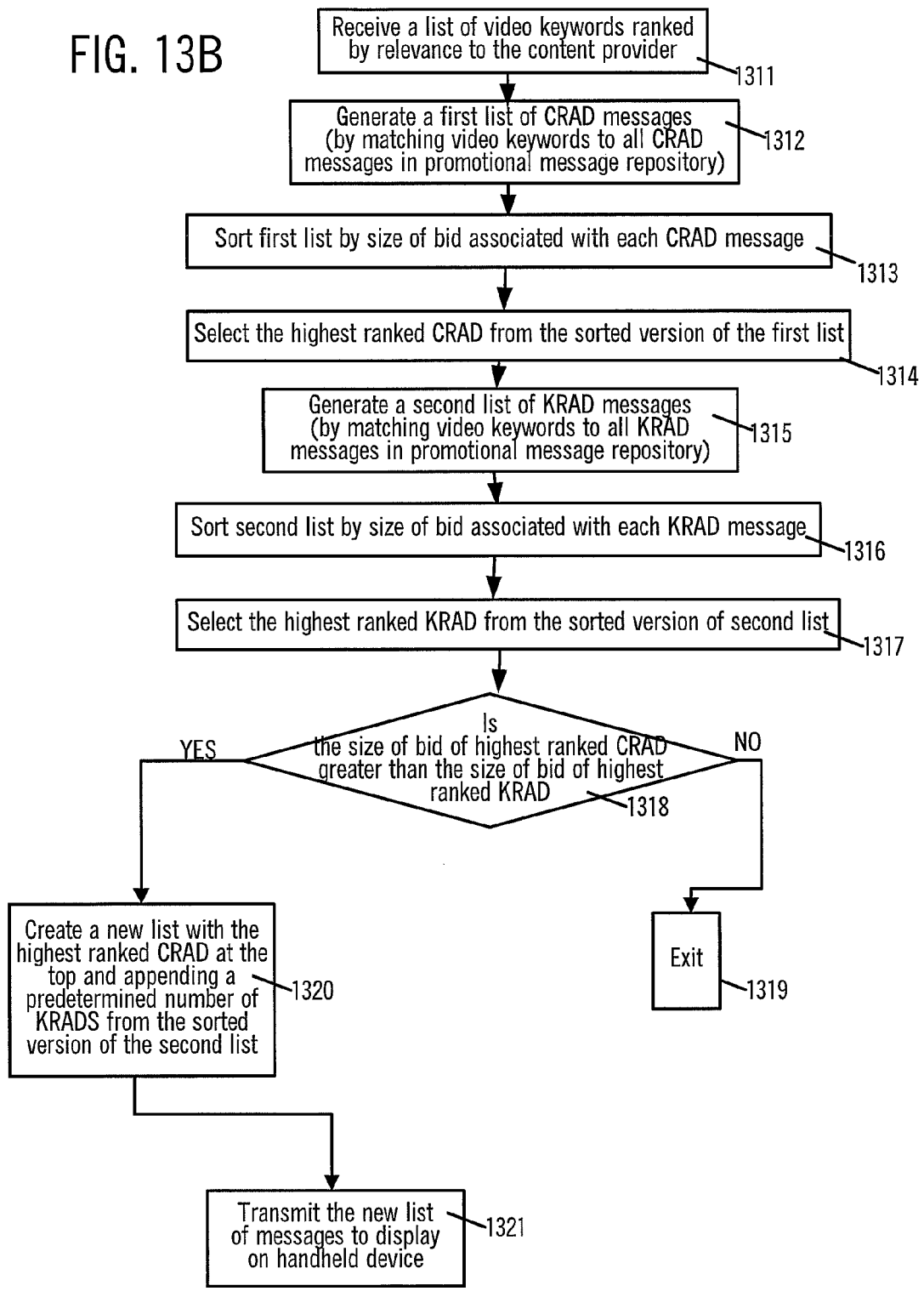

RESPONDING TO A VIDEO REQUEST BY DISPLAYING INFORMATION ON A TV REMOTE AND VIDEO ON THE TV

BACKGROUND

A smartphone 100 (FIG. 1A) of the prior art enables a user to make a telephone call as well as provides support for multiple applications ("apps"), such as a web browser or email client. An example of a smartphone is the product called "iPhone" available from APPLE INC, e.g. as described in US Patent Publication 20080122796 published on May 29, 2008 by Jobs et al, and in U.S. Pat. No. 7,479,949 granted to Jobs et al on Jan. 20, 2009 both of which are incorporated by reference herein in their entirety as background information on conventional smartphones.

One of the applications ("apps") in such a smartphone 100 may be, for example, a store application program ("store app") 101 (FIG. 1A) that enables users to download additional applications. Specifically, on touching store app 101 (FIG. 1A), smartphone 100 displays the user interface illustrated in FIG. 1B, wherein the user may enter a search term in box 102. Below search box 102 is displayed a list 103 of identifications 103A-103D of application programs, such as a music app, a camera app, a travel app and an app to search for toys, any or all of which may be downloaded into smartphone 100, from a computer at a predetermined address on the Internet.

One such app is created by YouTube, to enable a user to view on the smartphone iPhone, any video that is posted on the YouTube website. Specifically, touching a YouTube icon shown by the user interface of the iPhone opens the YouTube app, which displays on a touch screen of the iPhone, a main page of the YouTube website. The user may then enter appropriate keywords in a search field on the iPhone's touch screen, to find and select a video which is then displayed on the iPhone's touch screen. For more information, see an article entitled "A Tutorial on Watching YouTube Videos From an iPhone" by T I Kleban published on Ezine on Oct. 19, 2007. Another app called "vTap" allows a user to search for videos on the web, for example at the following websites: YouTube, MySpace, Dailymotion, news sites like the Associated Press and Reuters, even ESPN. For more information, see "Possibly the best iPhone Web app yet: vtap trumps built-in iPhone YouTube app" by Ben Wilson published on CNET, on Nov. 2, 2007.

The two apps described in the previous paragraph require the user to view video on a screen built into a smartphone. Another app called "i.TV" enables a user who subscribes to Netflix to manage their queue of films available via Netflix, and also enables the user to control a digital video recorder (DVR) of the type available from TiVo, Inc. For more information, see the following articles each of which is incorporated by reference herein in its entirety as background: (A)"Appiphilia: i.TV app tunes in new features for iPhone" published by Michelle Maltais of the Los Angeles Times on Dec. 23, 2008; (B) "i.TV's iPhone app gets deep Netflix integration" published Nov. 10, 2008 by Josh Lowensohn of CNET and (C) "i.TV for iPhone: Cluttered but promising entertainment guide" published Aug. 17, 2009, by Erica Sadun of Weblogs, Inc.

SUMMARY

In accordance with the invention, a handheld screen is used as a supplement to a television screen. Specifically, information displayed on a handheld screen in accordance with the invention supplements a video displayed on the television (TV) screen. In many embodiments of the invention, display of supplementary information on the handheld screen is coordinated with the display of video on the television screen. In some embodiments, the supplementary information on the handheld screen is selected by a computer system to match the specific video being displayed on the TV screen. Additionally, in several such embodiments of the invention, the display of such supplementary information occurs simultaneously or contemporaneously relative to the video display e.g. the two displays are made to overlap in time by the computer system transmitting the selected information (or an identifier thereof) to a handheld device (containing the handheld screen) at the same time as (or within a predetermined duration of) transmission of the video to a television (containing the television screen). Such display of supplementary information on a handheld screen in a timely manner relative to video display on the TV screen (i.e. while the video is still being displayed) in accordance with the invention provides a richer viewing experience to a user than any prior art combination known to the inventors of the current patent application.

In some embodiments, transmission of the video and transmission of the supplementary information are both transmitted in response to a single event, for example receipt by the computer system, of a request to display the video, on demand. In numerous embodiments, the handheld device transmits to the computer system, a single video request containing an identification of a user-selected video (e.g. a URL of the file containing the video. The computer system responds by transmitting to the television a first signal carrying a series of frames in the user-selected video, and further transmitting to the handheld device, a second signal carrying supplementary information that is automatically selected for display on the handheld device, both signals being based on the single video request. The television responds by automatically displaying on the television screen, the series of frames being received in the first signal. The handheld device responds by automatically displaying on the handheld screen, the supplementary information received in the second signal. As described above, the two signals are both transmitted by the computer system in response to the same event (for example, in the numerous embodiments described above, by a request for a user-selected video). In such embodiments, coordinated displays, of video on the television and supplementary information on the handheld device, occur in a timely manner relative to one another.

BRIEF DESCRIPTION OF THE FIGURES

FIGS. 1A and 1B show a smartphone 100 of the prior art.

FIG. 2B illustrates, in a high level block diagram, handheld device 200 of FIG. 2A, wherein multiple EPG apps have been downloaded and installed as represented by icons 203A-203N of corresponding EPG apps 202A-202N, to provide access to corresponding groups 207A-207N of descriptions of videos in computer system 250 including corresponding computers 281A-281N of respective content providers A-N and a computer 282 that authorizes transfer of video ("authority server").

FIG. 2C illustrates a user interface of an EPG app 202N of FIG. 2B, as displayed on handheld device 200 of FIG. 2A, including a list of EPG items 291A-291Z and a search box 205 displayed on a screen 204 and a slide-out keyboard 299 to input text to handheld device 200.

FIGS. 2H-2L illustrate display on handheld screen 204, of additional information being exchanged between a user of handheld screen 204 and another user in accordance with one aspect of the invention.

FIGS. 3A-3C illustrate, in high level block diagrams, flow of signals among handheld device 200, computer system 200 including at least one computer programmed in accordance with the invention, and a television located physically in the same building as and adjacent to handheld device 200.

FIG. 3E illustrates scrolling of messages 305A-305E between times T1 and T3 of FIG. 3C, in handheld device 200.

FIGS. 4A-4H illustrate, in an exemplary sequence of time illustrated in FIG. 3E, the operation of dual displays of coordinated media on handheld device 200 and internet-enabled television 303 in a user's home in some embodiments of the invention.

FIG. 8B illustrates, in a high level block diagram, flow of signals in an implementation of one embodiment of the invention.

FIGS. 11B-11J illustrate, in flow charts, acts performed by the authority server of FIG. 11A in an illustrative implementation in accordance with the invention.

FIG. 11K illustrates, in a flow chart, acts performed by an authority server similar to the acts of FIG. 11H, in an alternative embodiment of the invention.

FIGS. 13A and 13B illustrate, in flow charts, acts performed by the authority server in an illustrative implementation in accordance with the invention to prepare a list of messages transmitted to a handheld device for display thereon.

DETAILED DESCRIPTION

In several embodiments of the invention, a handheld device 200 is a smartphone, which is a cellular phone having a screen on which information unrelated to phone calls can be displayed through application software ("apps"), such as: calendar app, email app, web-browser app, and store app etc. Examples of smartphones (also called PDA phones) that can be used as handheld device 200 include the following: iPhone 3G available from Apple Inc, Blackberry Storm available from Research In Motion Limited and Nokia E71 available from Nokia Corporation. In several embodiments of the invention, a user of handheld device 200 searches for apps that can display electronic program guides (EPGs) of videos available for on-demand display on a television, by entering a character string, e.g. "EPG" in a search box 201 (FIG. 2A) displayed by a store app in a handheld device 200.

Although a handheld device 200 which includes a cellular phone is used in some embodiments of the invention, other embodiments of the invention use a handheld device 200 that does not have any telephone functionality. One example of such a handheld device 200 is a personal digital assistant (PDA) that has a screen 204 to display information and that has a wireless interface. One example of such a PDA that can be used as handheld device 200 is the music player iPod Touch® available from Apple Inc. Another example of handheld device 200 is a media viewing device that includes a screen for information display, e.g. an e-book device on which a book can be displayed. Examples of e-book devices that can be used as handheld device 200 in accordance with the invention include Kindle 2 available from Amazon.com, Inc. and PRS-700 available from Sony Corporation. In several embodiments, screen 204 (of a handheld device 200) simply displays information thereon and is not touch sensitive, although in other embodiments screen 204 is sensitive to a user's touch thereon. Accordingly, one example of a handheld device 200 is a tablet PC such as P1610 tablet PC available from Fujitsu, ThinkPad X200 Tablet 7449 available from Lenovo, and Pavilion TX1000Z 12.1" TOUCH-SCREEN Tablet available from HP.

In response to receipt of user input in search box 201 (FIG. 2A), handheld device 200 conducts a search of all apps available for download at an app server computer accessible by handheld device 200 at a predetermined address on the Internet, and displays representations of multiple apps 202A, 202B, 202I, 202N (wherein A≤I≤N, N being the total number of apps) that match the user input. Each app 202I contains an electronic program guide (EPG) identifying videos available for on-demand display on an internet-enabled television. The predetermined address is typically stored in a memory of handheld device 200, e.g. provisioned at the factory by a manufacturer of handheld device 200. The predetermined address is used by a store application of the type described in the Background section (see above).

Figure 2A:
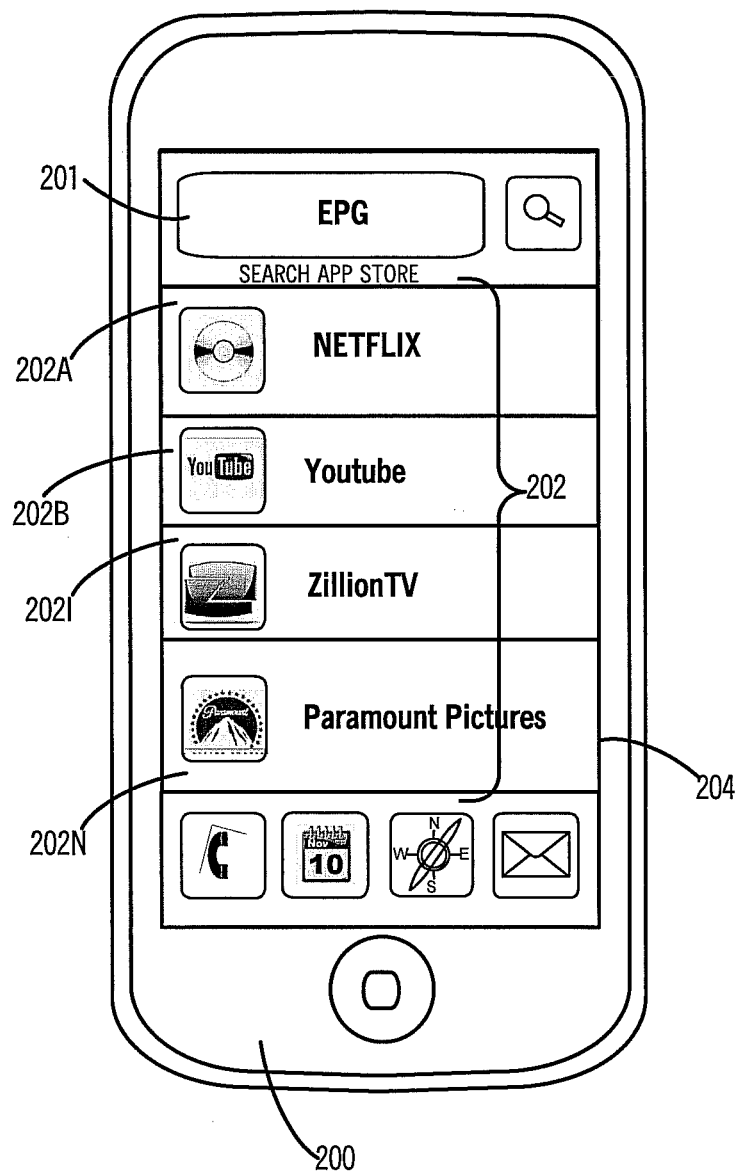
FIG. 2A illustrates a handheld device 200 (e.g. a smartphone) programmed to display multiple apps available for download from an app store, each app containing therein an electronic program guide (EPG) of videos available for on-demand display on an internet-enabled television in accordance with the invention.

In an illustrative example, the user may download into handheld device 200, any one (or more or even all) of EPG apps 202A, 202B, 202I, 202N (FIG. 2A). After download and installation in handheld device 200, corresponding text and/or graphic icons 203A, 203B, 203I, 203N are displayed on screen 204 of handheld device 200 (see FIG. 2B). On screen 204, each text and/or graphic icon 203I (also called "representation" of) denotes a copy of a corresponding app 202I that is now installed and available to be opened in handheld device 200. Screen 204 can be any external surface of a handheld device 200 on which an electronically created picture or image is normally formed, such as a glass plate of a liquid crystal display (LCD). Specifically, screen 204 can be, for example, 3.5-inch in size (measured diagonally) with 320× 480 pixel resolution and a multi-touch panel of the type included in a typical smartphone (such as the iPhone available from Apple, Inc).

Figure 2D:
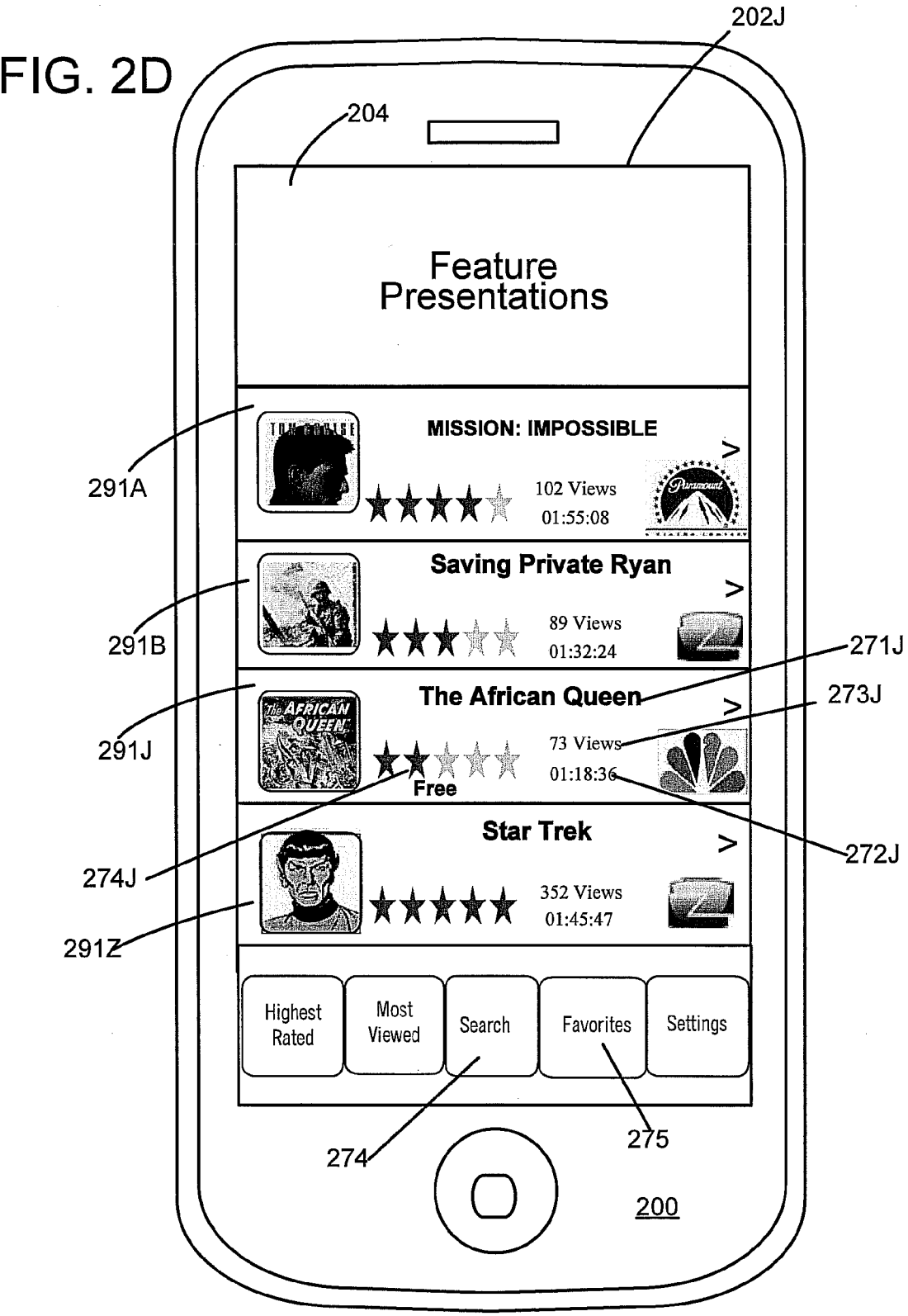
FIG. 2D illustrates a user interface of an EPG app 202J similar to FIG. 2C, in another embodiment in accordance with the invention.

After download of the type described in the immediately preceding paragraph, a user may choose from among multiple EPG apps 202A . . . 202N, e.g. in embodiments wherein screen 204 is touch sensitive, the user uses a finger to touch an icon 203N displayed by handheld device 200 (see FIG. 2B). In response to the user's touch on icon 203N, handheld device 200 opens the corresponding EPG app 202N on handheld screen 204 (i.e. after the download of app 202N into device 200). As shown in FIG. 2C, handheld device 200 may display on screen 204, a user interface of EPG app 202N including multiple items 291A-291Z of EPG information ("EPG items"). Each EPG item 291J (FIG. 2C) includes metadata on attributes of a video 208J (FIG. 2B) available for on-demand display. Examples of metadata in an EPG item 291J (FIG. 2D) that are displayed include title 271J, duration of play 272J, number of times viewed by other users 273J, five-star rating 274J and whether or not any payment is required for viewing the video 208J. Depending on the embodiment, metadata of an EPG item may also include EPG information that is not displayed, such as a unique video identifier.

EPG items 291A-291Z (FIG. 2C) initially displayed by default on handheld screen 204 on opening of app 202N are typically present in a list ("featured list") for the current user. Such a featured list may be predetermined in any manner depending on the embodiment, e.g. specifically determined by a content provider A operating a computer to digitally transmit videos 208A-208Z (identified by EPG items 291A-291Z). EPG items 291A-291Z that are initially displayed in a featured list are eventually replaced by a display of other EPG items, e.g. EPG items that match a user's input in a search box 205 (see FIG. 2C) accessible by touching button 274 (FIG. 2D) or EPG items in a favorites list accessible by touching button 275.

Figure 2E:
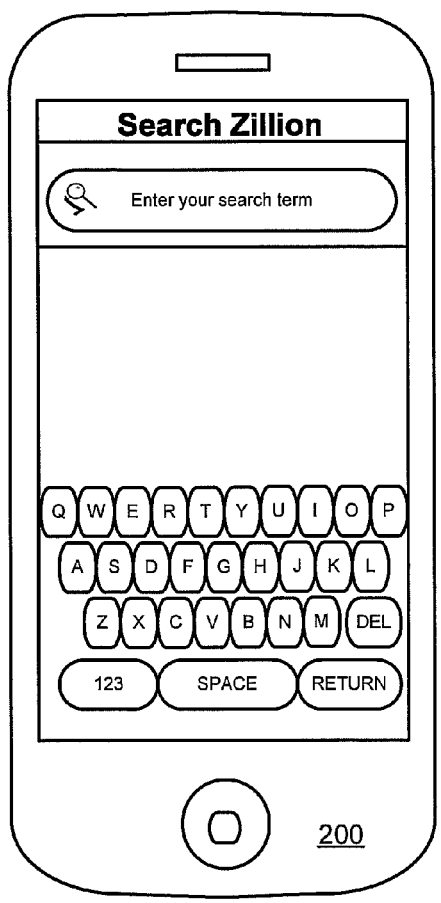
FIG. 2E illustrates a user interface of an EPG app 202J similar to FIG. 2C, in still another embodiment in accordance with the invention.

Search box 205 (FIG. 2C) is included in app 202N to enable a user to type in a search term therein, using a slide-out keyboard 299 that is included in a handheld device 200 of some embodiments. Instead of a slide-out keyboard, other embodiments of a handheld device 200 may receive a search term from a user via an on-screen keyboard as illustrated in FIG. 2E. Accordingly, the user may search among a group 207N (FIG. 2B) of EPG items 291A-291Z and optionally related video descriptions 292A-292Z supplied by a content provider N (such as Paramount Pictures Corporation) that creates a corresponding app 202N (which is identified on screen 204 by representation 203N). A video description 292J typically includes additional detailed information on subject matter included within the video, such as an outline of a plot, names of actors and/or director, a movie review, ratings etc.

In the example illustrated in FIG. 2C, video titles displayed on screen 204 by an app 202N are only of those EPG items 291A-291Z (FIG. 2B) for which a corresponding content provider N (namely Paramount Pictures Corporation) can provide the described videos 208A-208Z to the user for viewing on a television. Results of searching an EPG group 207D based on the user's input in box 205 are displayed immediately below search box 205 (replacing previously displayed EPG items 291A-291Z in FIG. 2C). Next, the user may select any EPG item 291J displayed on screen 204 of handheld device 200, to view its corresponding video 208J on an internet-enabled television (that has been associated with the user's smartphone).

Therefore, in some embodiments of the invention, each app 202I is strictly limited to searching among and/or displaying only within its corresponding group 207I of EPG items and related video descriptions, as shown in FIG. 2B. As one example, a user may open app 202A (see FIG. 2B) to search among its group 207A of video descriptions (not labeled in FIG. 2B) supplied by content provider A, namely Netflix, Inc. In this example, if the user decides not to select any video described in the search results from group 207A, the user may open another app 202C to search among another group 207C of video descriptions (also not labeled in FIG. 2B) that are supplied by another content provider I, namely ZillionTV Corporation. As yet another example of such embodiments, if the user wishes to watch the movie "Mission Impossible IV", the user must open an app 202N to search for the specific EPG item identifying this movie in the group 205N in a situation where the only content provider of this movie is content provider N, namely Paramount Pictures.

Depending on the embodiment of the invention, a specific video can be made available to a user for selection by more than one content provider (i.e. by multiple content providers). For example, a movie with title "Star Trek" in EPG item 291Z (FIG. 2C) is illustrated in FIG. 2B as identifying the video 208Z, and in this example video 208Z is made by content provider N, namely Paramount Pictures Company. Additionally, in this example content provider N, has provided a copy 208ZC of this exact same video 208Z to another content provider I (e.g. pursuant to a license agreement therebetween). Hence, content provider I (e.g. ZillionTV) also makes available its own copy 208ZC of video 208Z to the user through its own app 202I e.g. by including in its group 207I an EPG item 291X identifying the same title, of video 208Z. Note that description 292X of EPG item 291X that is provided by content provider I may be either different from, or a copy of, the description 292Z of video 208Z provided by content provider N, depending on the implementation of the invention. Hence, in this example, a user can obtain a video 208Z (or a copy thereof) for viewing on demand (VOD) from either one of two different content providers I and N, via their respective apps 202I, 202N (accessible in handheld device 200 by touching corresponding representations 203I, 203N).

Accordingly, as will be readily apparent from this detailed description, depending on the embodiment, the EPG apps 202A-202N displayed by a handheld device 200 (FIG. 2A) can be from different types of content providers. For example, one type of content provider illustrated in FIG. 2A is a movie studio that produces normal movies, such as Paramount Pictures (see EPG app 202N). FIG. 2A illustrates another type of content provider that supplies movies on demand using the Internet, such as Zillion (see EPG app 202I). In this example, another EPG app 202A in FIG. 2A identifies Netflix as yet another type of content provider which rents movies on storage devices such as DVDs, and also supports download of movies via the Internet on digital video records like TiVo. Finally, yet another EPG app 202B shown in FIG. 2A identifies YouTube as yet another type of content provider which makes user-submitted videos available for download via the Internet.

Referring to FIG. 2C, a user may touch an EPG item 291A in an EPG app 206A on a screen 204 of handheld device 200 to select (either directly or indirectly, depending on the embodiment) video 208A (FIG. 2B) for delivery to the user's television. Specifically some embodiments permit direct selection by a single touch of EPG item 291J, e.g. if a payment attribute for viewing the corresponding video 208J (FIG. 2B) indicates that the video is available free of cost to the user.

Figure 2F:
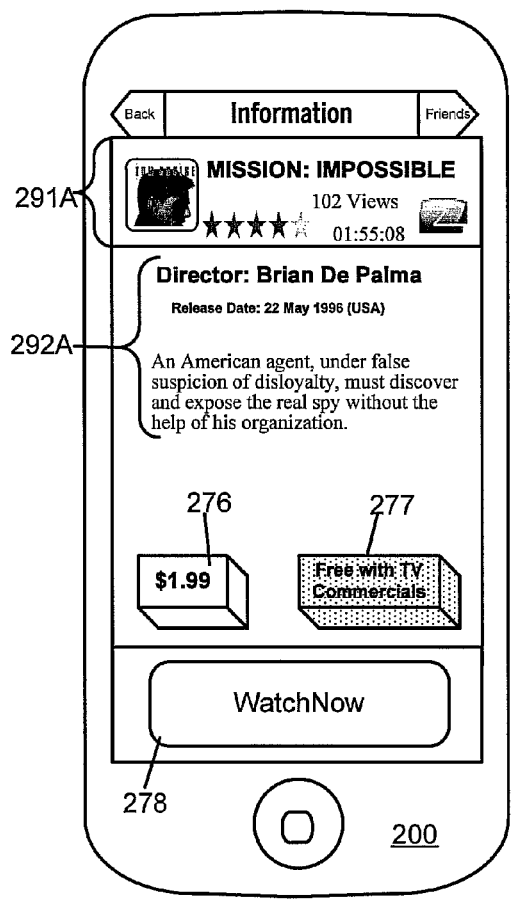
FIG. 2F illustrates display of a video description 292A in several embodiments of the invention, for a specific EPG item 291A selected by the user in the list of FIG. 2D.

However, in several embodiments, selection of EPG item 291A displays redraws the display to show EPG item 291A (which is no longer selectable) at the top of screen 204 and immediately underneath the corresponding video description 292A, as illustrated in FIG. 2F. In addition to the video description 292A, in the display illustrated in FIG. 2F the user is presented with two buttons 276 and 277 that respectively denote two options, namely (1) pay $1.99 to watch the video 208A free of any TV commercials and (2) a default option of watching the video 208A free of cost, but with TV commercials included in the display of video 208A. Note that button 277 is displayed greyed out on screen 204 as shown in FIG. 2F because in this example, this particular user had previously selected the second payment option and therefore the second payment option was automatically recorded as a default for this user, by handheld device 200. Accordingly, at this stage the user may simply press button 278, to select a video 208A to be displayed, with TV commercials included therein.

Figure 2G:
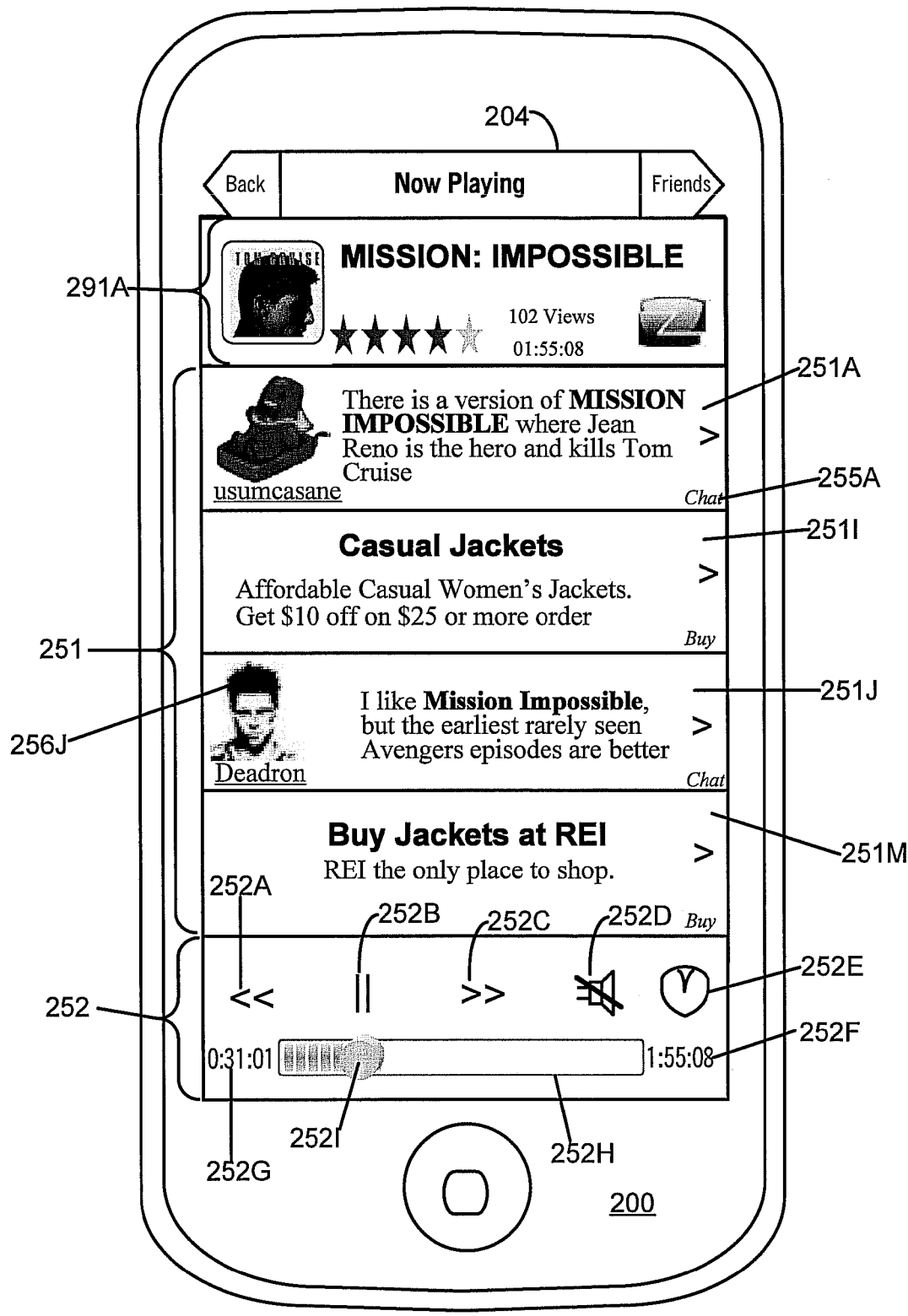
FIG. 2G illustrates display of information in the form of messages on a handheld screen 204, concurrent with a display of user-selected video 208A (identified by item 291A and described in video description 292A in FIG. 2B) on an internet-enabled television, in several embodiments of the invention.

In response to the user selection, video 208A begins to play on an internet-enabled television associated with handheld device 200. While video 208A is playing on a television screen, handheld device 200 displays the corresponding EPG item 291A at the top of handheld screen 204 and a control panel 252 at the bottom of handheld screen 204, as shown in FIG. 2G. Specifically, control panel 252 includes of some embodiments includes a rewind button 252A, a pause button 252B and a fast forward button 252C, to enable navigation of the play of video 208A on the television screen. Additionally, control panel 252 further includes two text strings to provide play status information to the user as follows: a text string 252G to display the duration for which video 208A has already played, and another text string 252F to display the total duration of video 208A.

Additional video status and control is provided in control panel 252, via a bar 252H on which a ball 252I automatically slides towards the right, as video 208A is played. The user can slide ball 252H anywhere on bar 252H to correspondingly change the frame of video 208A displayed on the television screen. Control panel also includes a mute button 252D that can be touched on handheld screen 204 to turn on/off the sound from the speakers of the television. Control panel also includes a favorites button 252E that can be touched to bring up on handheld screen 204, a display of a list of EPG items previously bookmarked by the user.

In certain alternative embodiments, in response to a user's touching of EPG item 291A in EPG app 206A on screen 204 as illustrated in FIG. 2C, a default payment option for the user is automatically used by handheld device 200 to select video 208A for display, i.e. without display of video description 292A in FIG. 2F, and handheld device 200 wirelessly transmits the selection of EPG item 291A in a video request (in this example, as if the user had pressed button 278). Therefore, in these embodiments, the video identified by EPG item 291A starts playing on television 303, immediately in response to the user's touching of EPG item 291A displayed in a list of EPG items on screen 204, i.e. instant play without displaying the video description.

During the time that video 208A is playing on a television screen (including any TV commercials therein), handheld device 200 additionally displays a window 251 located on screen 204 between EPG item 291A and control panel 252. Window 251 displays a list of messages 251A-251M to the user, containing information that "supplements" video 208A whereas the above-described EPG item 291A displays information (such as title) that "complements" video 208A. The meanings of the two words "complement" and "supplement" are described in the next paragraph immediately following this paragraph. In some embodiments, the information in messages 251A-251M is selected automatically for being likely to be of interest to the user. Accordingly, at this stage, the user has two attractive choices: the user may either watch video 208A on the television screen or review and select any of messages 251A-251M on handheld screen 204 to seek additional information. Depending on the embodiment, messages 251A-251M can be any type of messages, such as social media messages from other users and/or promotional messages from advertisers.

Social media messages and promotional messages as displayed on handheld screen 204 are different types of messages that may contain different information relative to one another, depending on the embodiment. In some embodiments, a social media message includes two or more of the following pieces of information: (a) user name and an optional graphic, (b) text string input by the user identified by the user name, (c) time at which the user typed the text string. Additionally, a promotional message of some embodiments includes two or more of the following pieces of information: (a) product name, (b) name of a vendor of the product identified by the product name and (c) price of the product. Note that other embodiments may exclude two or more of the just-described pieces of information, and/or alternatively include other pieces of information such as (d) name of a message thread in case of a social media message and (d) a graphic in case of a promotional message.

The words "complement" and "supplement" as used herein, both mean to make a display on a handheld screen in addition to the display of video 208A on a TV screen. However, there is an important distinction between these two words, as follows. To "complement" a TV display is to provide on the handheld screen, any information lacking from the TV display and needed for video navigation. For example, to perform video navigation, the user may need to be reminded of the specific movie playing on the TV screen, by a display of complementary information on the handheld screen. Hence, EPG item 291A (FIG. 2G) displayed on handheld screen 204 is "complementary" to the TV display. Moreover, control panel 252 (FIG. 2G) also displays complementary information on the handheld screen, such as the duration 252G of video already viewed. In contrast, to "supplement" the TV display is to provide any information on the handheld screen that is unnecessary for video navigation. For example, display of information in messages 251A-251M to converse with another user, or display of information promoting the purchase of a product or service is "supplementary" to the TV display, because such information is unrelated to video navigation.

In a specific embodiment illustrated in FIG. 2G, supplementary information presented in window 251 is physically arranged in the center of handheld screen 204, sandwiched symmetrically by complementary information in EPG item 291A at the top of screen 204, and complementary information in control panel 252 at the bottom of screen 204. However, as will be readily apparent from this detailed description, other arrangements of these two types of information are used in such displays on screen 204 in other embodiments of handheld device 200. For example, all complementary information is presented together in one area and all supplementary information is presented in another area (e.g. in a bottom half and a top half respectively of screen 203), in an alternative embodiment (not shown) of handheld device 200.

In an example illustrated in FIG. 2G, messages 251A and 251J are social media messages, and messages 251I and 251M are promotional messages from advertisers of products or services to be sold to the user. By selecting either of messages 251A and 251J the user (also called "owner") can obtain additional information and converse with (i.e. chat with) another user (also called "author") of such messages. By selecting messages 251I and 251M the owner of handheld device 200 can obtain additional information needed to enter into a purchase transaction, i.e. buy a corresponding product or service described in the messages displayed on handheld screen 204. Handheld device 200 enables its owner to distinguish between these two types of messages in the illustrative example by display of extra text (or graphic) 255A in a bottom right corner of a message 251A e.g. by displaying the word "Chat".

Although both words "Chat" and "Buy" are shown in FIG. 2G as identifying respective types of messages 251A-251M, other embodiments display only one word (e.g. Chat). No extra text (or graphic) is displayed in embodiments wherein the distinction between different types of messages is readily apparent to the owner of handheld device 200, from the presence of certain features depending on the type of message, such as a graphic image of a message's author and the author's nickname both located at the left side of screen 204 in case of a social media message. Messages of different types may alternatively be made visually distinct from each other by use of color and/or certain fonts and/or attributes of text, such as italics, depending on the embodiment. Also note that although only two types of messages are illustrated in FIG. 2G, other embodiments support additional types of messages, such as a third type of message from the government, about a local emergency (such as a fire) requiring evacuation of the user's neighborhood.

Figure 2H:
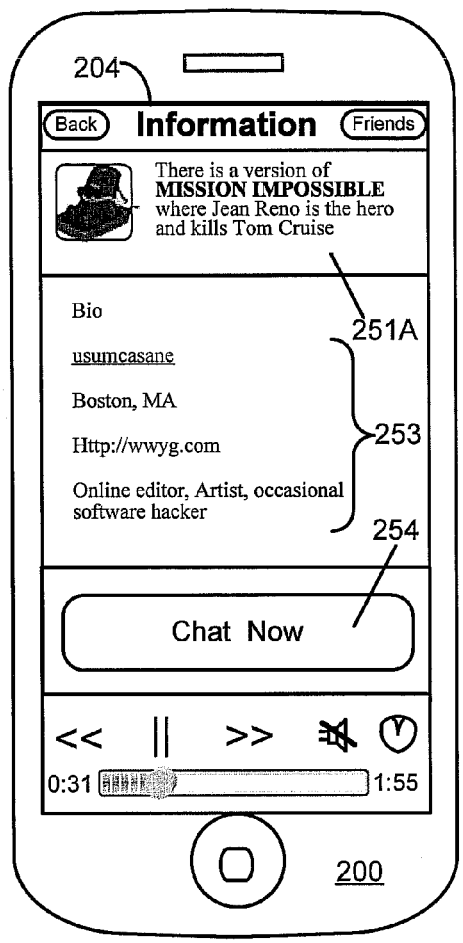

In response to manual selection of a social media message (see FIG. 2G), handheld device 200 responds by displaying the entirety of message 251A and additional information 253 in the form of the author's bio, as illustrated in FIG. 2H. In the example illustrated in FIG. 2G, the owner of handheld device 200 selected the movie "Mission: Impossible" for play on their internet-enabled television, and so this user's handheld screen 204 displays the following two social media messages, namely message 251A is a text message by a first author having the nickname "usumcasane" saying "There is a version of MISSION IMPOSSIBLE where Jean Reno is the hero and kills Tom Cruise" and message 251J is another text message by a second author having the nickname "Deadron" saying "I like Mission Impossible but the earliest rarely seen Avengers episodes are better." Note that these two text messages, which are displayed by handheld device 200 include information that is context-specific, e.g. information selected to be complementary to video 208A that in turn was selected by the user of handheld device 200.

Figure 2I:
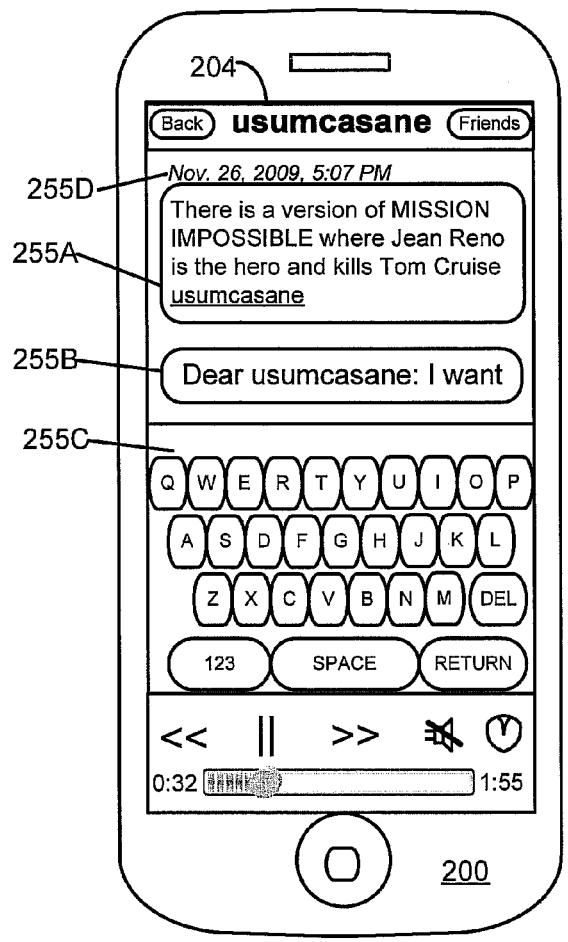

Handheld device 200 presents such context-specific information on handheld screen 204, while user-selected video 208A is playing on that user's television screen. Also as shown in FIG. 2H, the user may touch button 254 displayed on handheld screen 204 to prepare and send a new text message to the author of a displayed message 251A. For example, in response to button 254 being touched, handheld device 200 responds by displaying on touch-sensitive screen 204 (see FIG. 2I) at least the following: (a) the complete text and graphics of the selected message in a balloon 255A (b) a field 255B to hold new text to be typed by the current user, and (c) a keyboard 255C. Additional information, such as a time stamp 255D of the message 251A may also be displayed on screen 204 (see FIG. 2I) adjacent to message 251A.

Figure 2L:
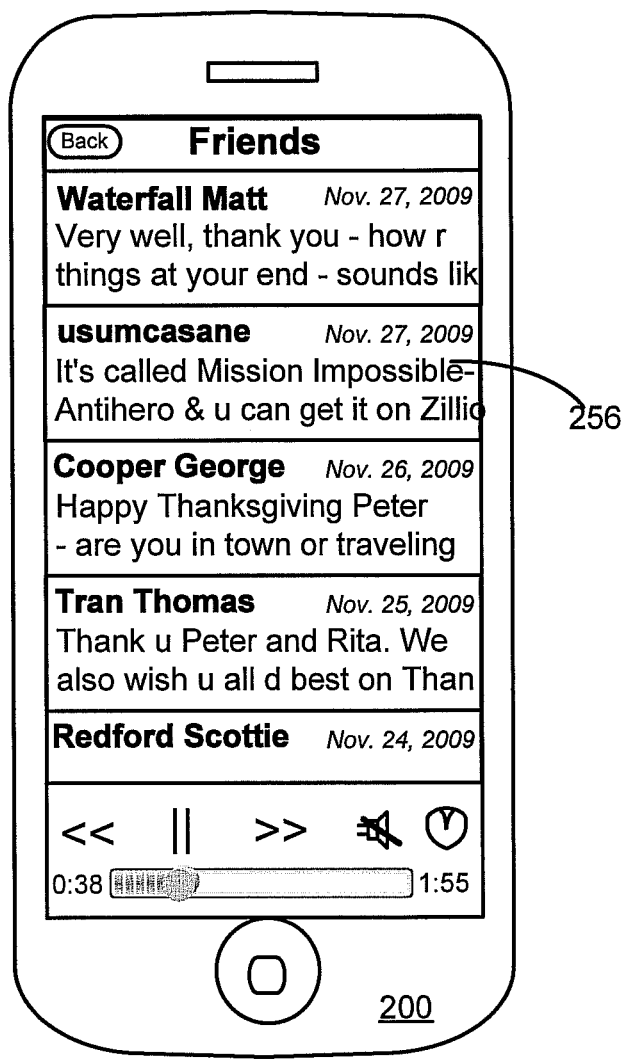

As will be readily apparent from this detailed description, a user can review additional information about any social media message on screen 204 and then enter a new social media message on screen 204, without affecting a display of video 208A on a television screen, in accordance with the invention. After such a new social media message is sent out wirelessly, handheld device 200 shows two text balloons 255A and 255E, as illustrated in FIG. 2J. When a recipient named in the new social media message responds, a third text balloon 255F is additionally displayed by handheld device 200, as illustrated in FIG. 2K. Additionally, as soon as the recipient responds, handheld device 200 adds the nickname of the recipient to a list of friends of the current user, and in future all text messages from the recipient become accessible by touching this nickname in the friends list (as illustrated in FIG. 2L). Specifically, the just-described conversation is recorded by handheld device 200, and displayed whenever requested, e.g. as message 256 in another window that lists the most-recently recorded social media messages that have been specifically addressed to the current user (i.e. owner of handheld device 200) as shown in FIG. 2L. The current user's review of the historical log of messages is performed by interaction with handheld screen 204, and does not affect the display of video 208 on the television screen which continues to play normally.

Referring back to FIG. 2G, in response to the user selecting a promotional message 251I, handheld device 200 responds by displaying on screen 204 additional information 257 (FIG. 2M) in the form of terms needed for a sale of a product (or service). Examples of the terms of sale include (A) description 258 of the product being sold, including, for example, color, size, product number and manufacturer, (B) price 259A, and (C) manner of shipping 259B. Handheld device 200 also displays on screen 204 a button 260 labeled "BUY NOW", and pressing this button forms a legally-binding contract for the purchase of the product as described in the terms of sale in additional information 257. In response to the user pressing button 260, handheld device 200 displays a pop-up message thanking the user for the purchase as illustrated in FIG. 2N. The user's review of additional information 257 and the user's input to purchase the product are all performed by interaction directly with handheld screen 204, and such activities by the user do not affect the display of video 208 on the television screen which, as noted above, continues to play normally.

Figure 2M:
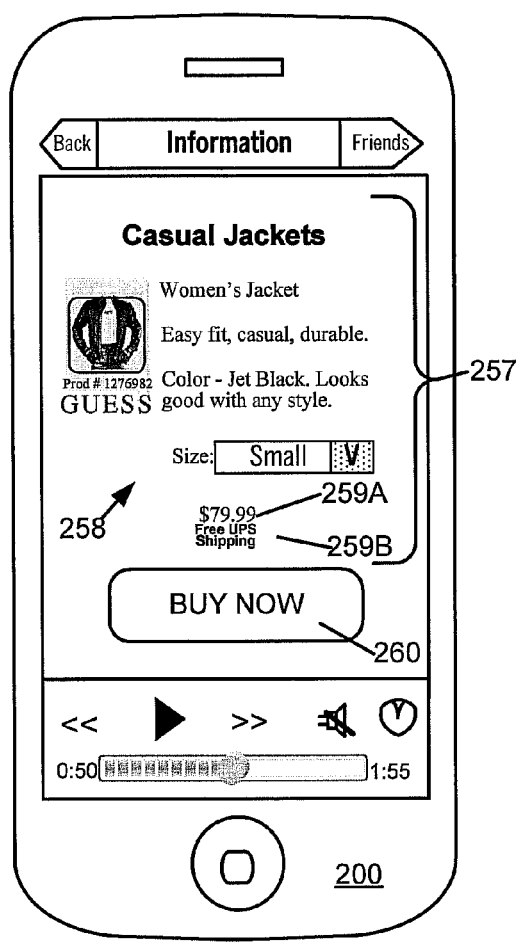
FIGS. 2M and 2N illustrate display on handheld screen 204, of additional information being exchanged between a user of handheld screen 204 and an advertiser in accordance with another aspect of the invention.
Figure 2N:
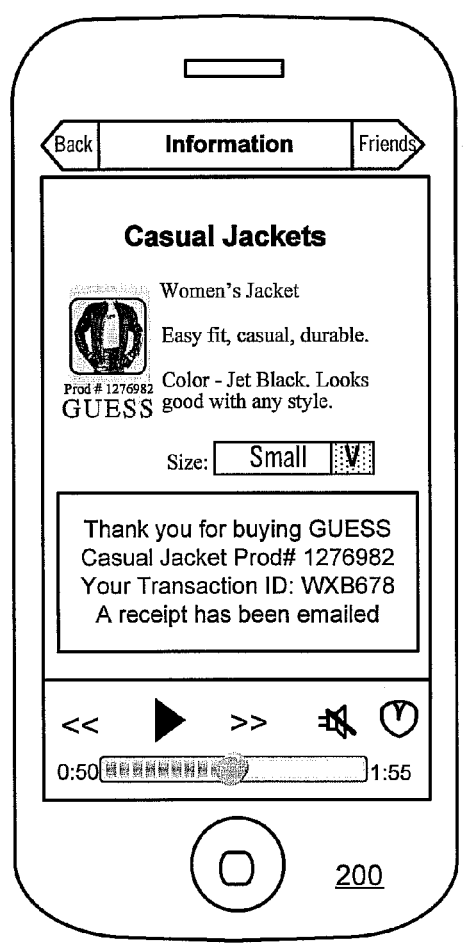

In certain alternative embodiments, in response to a user's touching of a promotional message 251I in window 251 as illustrated in FIG. 2G, a product or service advertised therein is instantly purchased by handheld device 200 transmitting an order to computer system 250, i.e. without display of product description 258 in FIG. 2M (in this example, as if the user had pressed button 260). Certain products and services which do not have any user-selectable options (such as books available on websites like Amazon.com) are suitable for such an instant purchase. In some embodiments, such an instant purchase promotional message 251I includes the name of the vendor.

The above-described display of video 208 on a TV screen 307 (FIG. 3A) is caused by a request 301 for on-demand viewing of a user-selected video 208A (also referred to as video 302) from a predetermined software 209 (also referred to as authority-compatible handheld interface software) that is executed by handheld device 200. Software 209 in certain embodiments is shared by multiple EPG apps 202A-202N in handheld device 200 as illustrated in FIG. 10C. However, in other embodiments, each copy of EPG app 202A-202N executing in handheld device 200 has its own corresponding copy that is compiled and linked therein, as software 209A-209N illustrated in FIG. 10B.

Depending on the embodiment, computer system 250 (FIG. 2B) includes either a single computer 282 and/or multiple computers 281A-281N interconnected to one another. Each of computers 282 and 281A-281N included in computer system 250 can be any computer that has access to a storage device to store video(s), and that is connected to a data network (such as the Internet) for transmission of the stored video(s). An example of a computer included in computer system 250 is the product PowerEdge-R610 with 4 GB RAM, Intel Xeon E5520 processor operating at 2.26 GHz, and 160 GB hard disk, which is available from Dell, Inc.

In several illustrative embodiments, computer system 250 responds to request 301 by sending a signal 312 carrying the user-selected video 302 to an internet-enabled television 303 (FIG. 3A) that is typically located in the vicinity of handheld device 200 (e.g. co-located in a building 310, and in many embodiments co-located in a common room within building 310, such as a family room of a typical home). Internet-enabled television 303 in accordance with the invention is any normal television that includes circuitry to interface with the Internet, either internally within a housing, of which TV screen 307 is a portion, or externally in a box that is normally placed on top of the television housing. Also in accordance with the invention, television 303 executes predetermined software, referred to herein as authority-compatible set-top interface software, to display video 302 that is retrieved from the Internet in response to request 301. As noted above, video 302 is whichever one of videos 208A-208Z that has been manually selected (e.g. by the user touching handheld screen 204) for on-demand viewing on television 303 through a service of content provider N.

In the illustrative embodiments of the invention described in the immediately preceding paragraph, computer system 250 additionally responds to the same video request 301, by sending another signal 311 (FIG. 3A) carrying one or more message(s) 305 to be displayed to the user by handheld device 200 which sent video request 301. In several such embodiments, the content of at least one of message(s) 305 consists essentially of text and/or graphics automatically selected by computer system 250 to be complementary to the user-selected video 302, for example based on an attribute, such as (A) words spoken by actors in video 302, (B) items or individuals shown in various frames of video 302, (C) description 2921 of video 302, (D) a five-star rating of video 302, and (E) the number of times video 302 has been viewed, etc. In some embodiments, one such attribute of video 302 is a list of key words (in the form of a text string of one or more words in the English language for example) that have been associated therewith for matching by computer system 250 to keywords associated with the text and/or graphics to be included in one or more of message(s) 305.

Figure 3B:
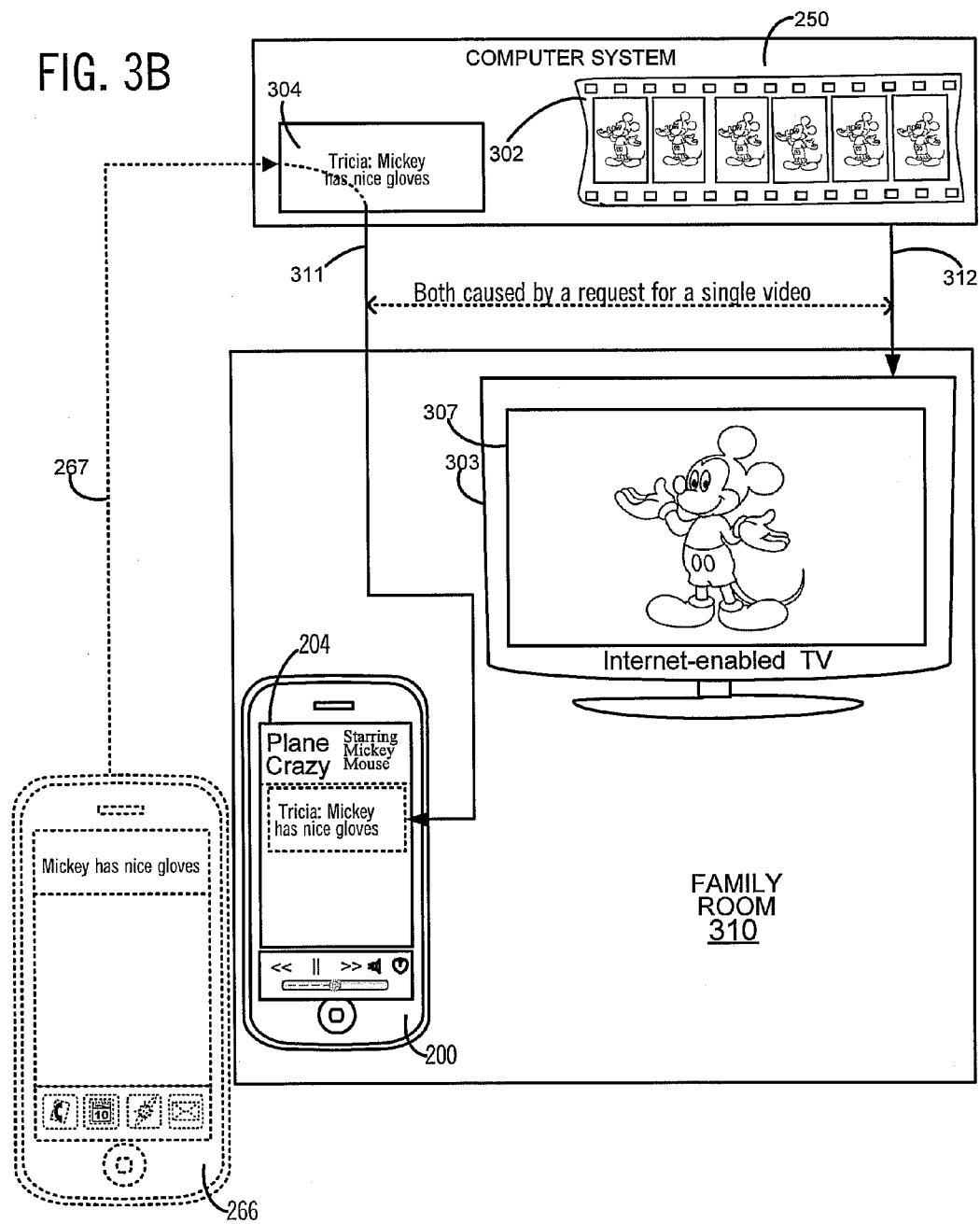

As noted above, an example of message 3051 is a string of text in a tweet signal 267 (FIG. 3B), which text has been input by another user through a tweet-client app in another handheld device 266 (FIG. 3B). An example of a tweet-client app is the software program Tweetie 2.1 (for iPhone and iPod Touch) available from the company atebits LLC. Note that tweet is just one example of a signal carrying a text string from a user, and another such example is a Short Message Service (SMS) message that is input by a user entering the text string and a published phone number (or a pre-defined name) of computer system 250 into a cellular phone. Computer system 250 of some embodiments selects one or more such text strings to be sent in signal 311, from among numerous text strings being received therein from various users, based directly or indirectly on a specific video 302 identified in request 301.

In some embodiments are text messages (such as tweets), transmitted on the Internet by a social networking and microblogging service, such as TWITTER, Inc. In an illustrative implementation, on receipt of video request 301 that explicitly identifies the user-selected primary video "Plane Crazy", computer system 250 subscribes to a feed of tweets that contain the words "Mickey" and "Minney" (e.g. these two words are stored in the form of strings of text in a storage device of computer system 250, identified as keywords that are associated with the video "Plane Crazy"). Accordingly, computer system 250 transmits any text messages received via the subscription, to handheld device 200 associated with television 303, while the user-requested video "Plane Crazy" is displayed thereon.

In an example of the type described in the immediately preceding paragraph, request 301 (not shown in FIG. 3B; see FIG. 3A) identifies a movie entitled "Plane Crazy" starring MICKEY MOUSE, and in response thereof computer system 250 automatically transmits in signal 311 to handheld device 200, a string of text embedded in tweet signal 267 that has been input by a user named Tricia, namely the text string "Mickey has nice gloves." In addition, as noted above, in response to the same video request 301, computer system 250 also transmits user-selected video 302, namely the movie "Plane Crazy" to internet-enabled television 303, for on-demand viewing.

In an example of the type illustrated in FIG. 3B and described above, signal 311 to handheld device 200 is sent after transmission of signal 312 to television 303 begins. Specifically, in this example, a display on handheld screen 204 is updated to display an EPG item in area 289 (FIG. 3A) corresponding to video 302 as soon as television 303 begins displaying video 302, but messages of supplementary information displayed in areas 290A-290Y (FIG. 3A) are not changed at this time (i.e. when video display begins). Instead, in this specific example, as soon as a tweet is received by computer system 250, computer system 250 checks if the tweet contains text matching one or more predetermined keywords associated with the movie "Plane Crazy" which is currently being transmitted. If so, computer system 250 transmits to handheld device 200, the above-described signal 311 carrying the text from the received tweet, i.e. in real time. In this particular example, if the same text string is received in a tweet before the beginning of or after the ending of display of movie "Plane Crazy" by television 303, no transmission of signal 311 occurs from computer system 250 to handheld device 200.

In certain embodiments of the type described in the immediately preceding paragraph, the text in such a real-time tweet describes an advertiser's limited-time targeted promotion (such as an offer to sell a large pizza for $5.99 within the next 10 minutes to all viewers of videos identified with predetermined keywords). In an example of other embodiments, the text in such a real-time tweet describes a dolphin being spotted in the Sacramento Delta (in California) to all viewers watching videos identified with the keyword "sea animals". In another example of such embodiments, the text in such a real-time tweet describes a company's current stock price, to all viewers watching videos identified with the keyword of that company's name.

In certain embodiments of the invention, a message 305 (in the signal 311 from computer system 250 to handheld device 200) consists essentially of information (also referred to herein, as "non-EPG" information) that is not present in an EPG item or video description. Non-EPG information is not descriptive of video 302. As noted above, such non-EPG information supplements the display of video 302 whereas EPG information itself complements the display of video 302. In several such embodiments, supplementary information is displayed in multiple messages that are automatically scrolled on handheld screen 204 whereas complementary information is displayed without automatic scrolling while the same video is being displayed on the television screen. To re-iterate, an automatically-scrolled message 3051 does not contain any EPG information on the specific video 302 selected by the user. Instead, as noted above EPG information is presented to the user in area 289 (FIG. 3A), by displaying therein an EPG item 304 (similar or identical to EPG item 291A described above in reference to FIG. 2G) that remains locked (i.e. kept unmoved) during automatic scrolling of non-EPG information in window 251.

Therefore, in an example of such embodiments, as illustrated in FIG. 3B, the text "Tricia: Mickey has nice gloves" (which is an example of non-EPG information) is included in an automatically-scrolled message displayed in window 251 and the text "Plane Crazy, Starring Mickey Mouse" (which is an example of an EPG item) is included in an EPG item displayed automatically-locked in area 289, both being displayed simultaneously or contemporaneously on screen 204 of handheld device 200. Note that the word "simultaneous" denotes at the same time as, whereas the word "contemporaneous" denotes a period of time smaller than human perception. Although only a message of text is illustrated in FIG. 3B, the message is merely illustrative, and other embodiments of computer system 250 transmit to handheld device 200, message(s) that contain graphic(s) or a combination of text and graphics, or instructions in Hyper Text Markup Language ("HTML") such as a web page. Note that a graphic in a message when displayed on screen 204 may move, e.g. a flag that waves, in embodiments wherein the graphic conforms to an animated image format, such as animated GIF (e.g. GIF89a specification commonly used on the World Wide Web).

Accordingly, two displays, one on a screen 204 in the user's hand located at a small distance (e.g. 1 foot or 2 feet from the user's eyes, within the user's personal space) and another on a screen 307 (FIG. 3A) at a larger distance from the user (e.g. 8 to 10 feet from the user's eyes, at a normal TV-viewing distance), together operating as described above in reference to FIGS. 3A and 3B provide a rich viewing experience to the user. Specifically, a display on a near-by screen 204 of a message that is caused directly or indirectly by a request for the selected video being displayed on a distant screen 307 enables a user to interact with the displayed message without interrupting a currently-occurring display of the selected video, as illustrated by the following three examples.

In a first example of such interaction, a user may review messages displayed on screen 204 in the user's hand to check on any other videos that may be of interest by using only the handheld device 200, while friends or relatives in the same room as the user (e.g. room 310 in FIG. 3B) continue to watch on screen 307 a display of user-selected video occurring without any distraction or interruption of the type normally present in picture-in-picture displays. In a second example of such interaction, a user may review locally displayed information to research details about the selected video, such as (1) the career history of, or (2) an article of clothing worn by, one of the actors while the television displays the user-selected video. In a third example of such interaction, the user may review advertisements that are discreetly shown on the handheld screen and the user may place an order for an advertised product or service (e.g. order a pizza) and even receive it while others watch without interruption a display of the user-selected video on the television. To re-iterate, in all these three examples, a user's interaction with information displayed within the user's personal space on handheld screen 204 does not interrupt the video displayed outside the user's personal space on TV screen 307.

In several embodiments of the invention, a user can view and input text on a handheld screen 204 within the user's personal space, and thus effectively perform searches, select video and review textual information in relative privacy (i.e. outside of the view of the eyes of any other people present in family room 310) while a user-selected video 302 is being played (i.e. displayed) on TV screen 307 that is located at the TV-viewing distance. In contrast, some prior art TV technologies display a keyboard and EPG on a distant TV screen, which requires the user to choose videos and choose keyboard keys by pressing arrow buttons on a handheld TV remote control.

In certain embodiments, one or more message(s) 305 being transmitted to handheld device 200 is/are received ahead of time in computer system 250, and stored therein for future transmission in signal 311, to handheld devices 200 of users requesting matching videos on respectively associated televisions 303. In such embodiments, signal 311 is transmitted by computer system 250 in response to receipt therein of video request 301 from handheld device 200 which also causes the transmission of user-selected video 302 in signal 312, as illustrated by the two arrows 311 and 312 in FIG. 3C. Therefore, in embodiments of the type described above, at least two physically separated displays occur in a single room 310 (FIG. 3B), in response to a request 301 for a single video 302.

In some embodiments, multiple users associate their respective handheld devices 241 and 200 with the same internet-enabled television 303, and therefore both devices 241 and 200 display the same EPG item 291I at the top of their respective screens, as illustrated in FIG. 3C. However, a set of messages 305 (FIG. 3C) displayed by handheld device 200 have information that is different from the information in another set of messages 243 displayed by handheld device 241, although both sets are supplementary to the video displayed by television 303 on its screen 307. Specifically, the information in the two sets of messages 305 and 243 is selected by computer system 250 (FIG. 3C) based on one or more attributes of the user, such as age or gender. In the example shown in FIG. 3C, the user of handheld device 200 is a child and accordingly the information in messages 303 (such as advertisements for a laptop, stickers, and gloves) is selected based on the child's age, whereas the user of handheld device 241 is a parent and accordingly the information in messages 243 (such as advertisements for a comforter, detergent, and batteries) is selected based on the parent's age.

Certain embodiments enable a user (such as the parent) to completely disable the display of certain types of messages on their handheld device(s). For example, social media messages are completely turned off by the parent in the embodiment of FIG. 3C, to prevent exposure of their child to inappropriate messages. Although in the embodiment of FIG. 3C, social media messages are illustrated as having been turned off in both handheld devices 200 and 241, other embodiments enable an owner of television 303 to selectively turn on/off social media messages individually for each handheld device 200, 241 associated with television 303. In one such example, the display options on social media messages are set so that handheld device 241 of a parent receives and displays social media messages, and handheld device 200 of the child does not.

Many embodiments do not allow selectively turning off the display of promotional messages from advertisers, on handheld devices 200, 241. In such embodiments, if a user does not want to view any promotional messages, the user can turn the power off in handheld devices 200, 241, in the normal manner. Note, however, that all promotional messages that were transmitted to a handheld device 200 when it is powered off are maintained in a corresponding log stored in a storage device by computer system 250. Accordingly, all promotional messages selected for the user by computer system 250 are available for display whenever in future handheld device 200 is turned on, thereby providing the user an opportunity to view any promotional messages that may be of interest and that were missed when powered off.

Figure 3D:
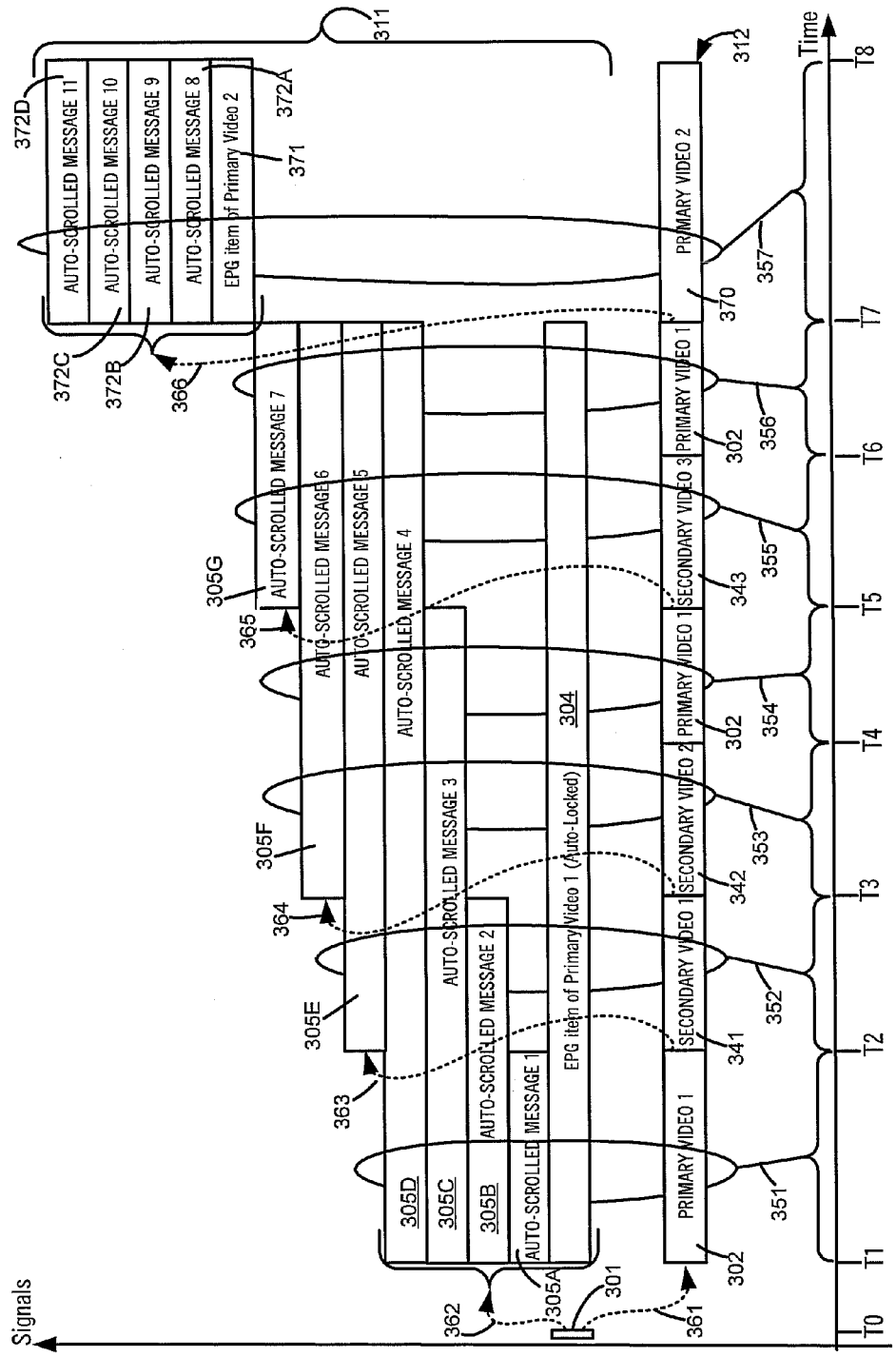
FIG. 3D illustrates timing overlaps between videos displayed on the internet-enabled television 303 of FIG. 3A and messages of information displayed on handheld device 200 in several embodiments of the invention.

In several embodiments, message display (on a handheld device 200) and video display (on television 303) occur in a timely manner relative to one another, as shown in FIG. 3D. Specifically, in FIG. 3D, at time T0, a video request 301 is sent by handheld device 200 to computer system 250. Thereafter between times T1 and T2, television 303 displays video 302 (also called primary video 1) identified in request 301, as shown by relationship 361 (shown as a dashed line in FIG. 3C). Additionally, between times T1 and T2, an EPG app 202I executing in handheld device 200 displays EPG item 304 and one or more of message(s) 305A-305D (on receipt thereof), based on the video 302 identified in request 301, as shown by relationship 362 (shown as another dashed line in FIG. 3C). As illustrated by the temporal relationship 351 shown in FIG. 3C, a duration during which the user-selected primary video 302 is displayed on TV screen 307 overlaps with the duration during which EPG item 304 and messages 305A-305D are displayed on handheld screen 204.

As noted above, multiple messages 305A-305D which are displayed on handheld screen 204 at time T1 are carried by a signal 311 transmitted by computer system 250, in response to request 301 for video 302. At time T1, signal 311 may additionally carry EPG item 304 (or an identifier thereof) to handheld device 200, e.g. if handheld device 200 did not originate video request 301. Moreover, as shown in FIG. 3C, signal 311 subsequently carries additional messages 305E and 305F at times T2 and T3, with transmission thereof being caused in computer system 250 by respective videos 341 and 342 (also called secondary videos 1 and 2), as illustrated by arrows 363 and 364 in FIG. 3C. An illustrative example is shown in FIGS. 4A-4H for the time sequence shown in FIG. 3C, starting with time T1 illustrated in FIG. 4A.

In some embodiments of the type illustrated in FIG. 3C, at a time T2, computer system 250 suspends transmission of the user-selected primary video 302 and starts transmission of another video 341 (called "secondary video 1") to television 303 (for example, see FIG. 4C). Secondary video 341 is not selected by the user and instead secondary video 341 is automatically selected by computer system 250 in different ways, depending on the embodiment. In one illustrative embodiment, the switch by computer system 250 from transmitting user-selected primary video 302 to transmitting automatically-selected secondary video 341 is performed between two frames of video being transmitted to television 303, and there is no user-perceptible delay (e.g. delay less than 1 millisecond) in the switch.

In one illustrative embodiment, a predetermined frame is repeatedly transmitted at a periodic rate (e.g. 30 frames per second) in a real-time stream carried by signal 312 to television 303 until frames of video 341 become available for transmission, although in another illustrative embodiment no frame is transmitted between frames of videos 302 and 341 and instead television 303 continues to display the last-received frame until a new frame is received. Automatically-selected secondary video 341 is transmitted to television 303 in a manner similar or identical to the transmission of user-selected primary video 302. Hence, television 303 displays automatically-selected secondary video 341 in a manner similar or identical to the display of user-selected primary video 302, starting at time T2 (for example, see FIG. 4C).

As noted above, an EPG item 304 in signal 311 is normally displayed in a top area 289 (FIG. 3E) of screen 204 that is automatically maintained non-scrolling in some embodiments of an EPG app 202I in handheld device 200 as follows. Specifically, EPG app 202I continuously displays EPG item 304 (e.g. EPG information) in top area 280 on screen 204 during the time that any portion of a given user-selected primary video 302 (identified in EPG item 304) is being displayed (and in some embodiments, is still to be displayed) by television 303. Display of EPG item 304 in an area 280 that is not automatically scrolled enables a user to visually correlate the two displays on screens 204 and 307, regardless of the automatic scrolling of messages 305 in a middle area 290 of screen 204.

As noted above, messages 305A-305D (FIG. 3C) that are displayed in message areas 290A-290Y (FIG. 3A) of window 251 are scrollable automatically over time. Specifically, as shown in FIG. 3C, at time T2 while transmitting automatically-selected secondary video 341, computer system 250 of certain embodiments is programmed to transmit a new message 305E (as illustrated by relationship 363 in FIG. 3C) to handheld device 200 that is associated with television 303 (to which video 341 is being transmitted). Hence, handheld device 200 of some embodiments displays new message 305E by automatically scrolling a preexisting display of messages 305A-305D downwards in regions 290Y, 290J, 290I and 290A respectively as shown in FIG. 3E. Note that in this example, second screen area 290 is subdivided equally into Y regions (e.g. five regions), namely regions 290A-290Y (wherein A≤I≤J≤Y) and in each region 290I the EPG app 202I displays a single automatically-scrolled message.

Figure 4A:
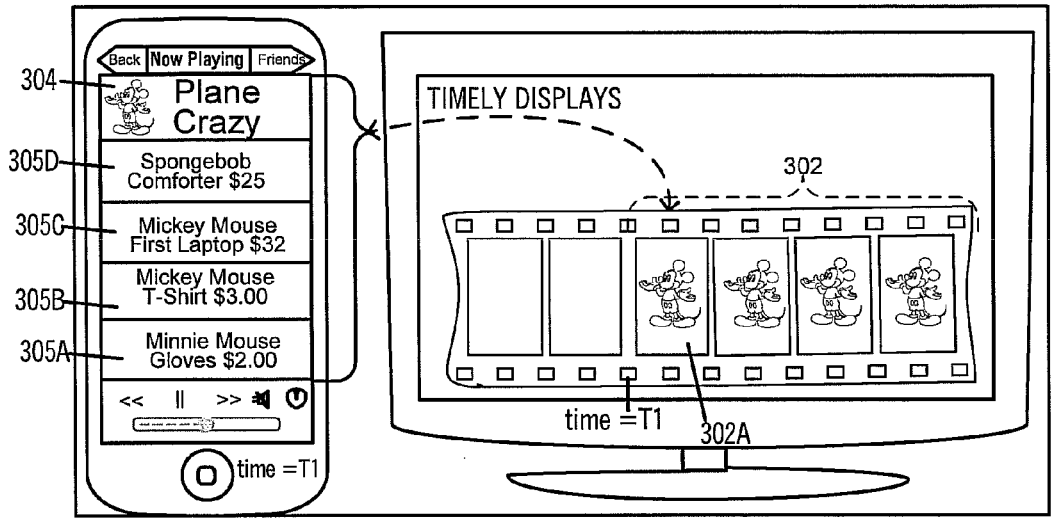
Figure 4B:
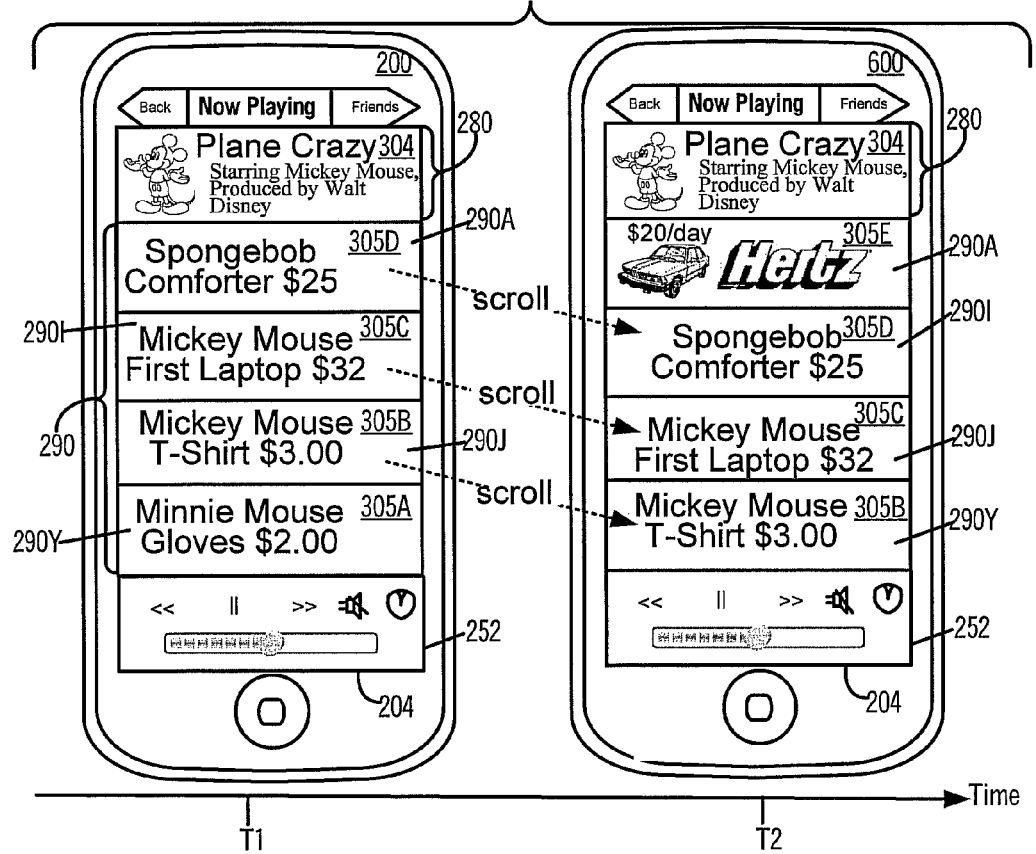

At time T2, in the just-described embodiment, an EPG app 202I automatically removes a previously-displayed message 305B (FIG. 3E) from screen 204, and shifts in the downward direction each of the remaining previously-displayed message 305C from a current region 290I to its neighboring region 290J (located immediately below the current region 290I) thereby to make region 290A available on screen 204 for displaying the new message 305E. FIG. 4B shows the scrolling of messages from time T1 to time T2 in the illustrative example shown in FIGS. 4A and 4C. In this embodiment, region 290A (FIG. 3E) is located immediately below first screen area 289 (currently displaying automatically-locked EPG item 304 which as noted above is displayed continuously, regardless of any automatic changes in the display of messages 305 in window 251).

In some embodiments, a new message 305E that is transmitted at time T2 to television 303 is identified by computer system 250 based on one or more tags associated with secondary video 341 (as illustrated by arrow 363 in FIG. 3C). Moreover, another temporal relationship 352 is formed between times T2 and T3 as shown in FIG. 3C, due to overlap between a duration for which secondary video 341 is displayed on TV screen 307 and a corresponding duration during which the new message 305E is displayed on handheld screen 204. FIG. 4D shows the messages at time T3 in the illustrative example shown in FIGS. 4A-4C. In one such embodiment, the just-described two durations are sufficiently similar or identical to one another, with a difference therebetween being less than a user-perceptible delay (e.g. delay less than 1 millisecond).

Although a message 305A disappears from screen 204 at time T2 as shown in FIG. 3D, in some embodiments such a previously-displayed message 305A merely scrolls off the display on screen 204 and is temporarily retained by EPG app 202I, in a memory 385 included in handheld device 200. Memory 385 is shown conceptually located below the handheld device at time T2 by a dashed line in FIG. 3D. Therefore message 305A is available in handheld device 200, for immediate retrieval and re-display on screen 204 by EPG app 202I in response to user input on screen 204.

In some embodiments, a user touches a touch-sensitive screen 204 in the normal manner of operation of a list of items displayed by handheld device 200, so as to manually scroll through messages 305. Specifically, in response to the user's touch, EPG app 202I responds by changing the display on screen 204 to scroll back through earlier messages that have been previously-displayed by EPG app 202I. Although information displayed in area 289 is not automatically-scrolled, EPG item 304 displayed therein does get scrolled along with messages 305 displayed in areas 290A-290Y in response to user input.

Specifically, during manual scrolling all information currently displayed on screen 204 is scrolled, regardless of whether the display areas are automatically-locked or automatically-scrolled. For example, between times T2 and T3 (FIG. 3E), manual scrolling by the user sliding a finger in an upward direction on touchscreen 204 brings into display a previously-displayed message 305A (from memory 385) into area 290Y, and a message 305E that was earlier displayed in area 290A prior to the user's touch is scrolled into automatically-locked area 289 after the user's touch. Therefore, manual scrolling on screen 204 is similar or identical to manual scrolling of any list of items typically displayed in applications that execute in a smartphone, such as an iPhone.

The above-described memory 385 is local to and contained within handheld device 200, and local memory 385 is supplemented by an additional memory (not shown in FIG. 3D) in computer system 250 that holds an identifier of each message that has been previously transmitted to handheld device 200 of each user. Hence, as a user manually scrolls backwards through their list of messages, a corresponding number of additional previously-displayed messages are transmitted from computer system 250 to local memory 385, thereby to eliminate a memory constraint (based on the size of memory 385) on the number of previously displayed messages that can be shown to the user in the absence of such additional memory.

In some embodiments of the type illustrated in FIG. 3C, at time T3, computer system 250 completes transmission of secondary video 341 and starts transmission of another secondary video 342 which is also not requested by the user. Hence, television 303 starts displaying another secondary video 342 at time T3. Additionally at time T3, computer system 250 also transmits another new message 305F to the associated handheld device 200 as illustrated by arrow 364. Hence, at time T3, handheld device 200 automatically scrolls messages 305E-305C which are currently displayed, and message 305B disappears from view. As noted above, message 305B is kept in memory 385, now with message 305A so both these messages are available for display by EPG app 202I in response to user input to scroll back the displayed list of messages. Hence, at time T3, a new message 305F is automatically displayed on handheld screen 204 in region 290A.

Figure 4E:
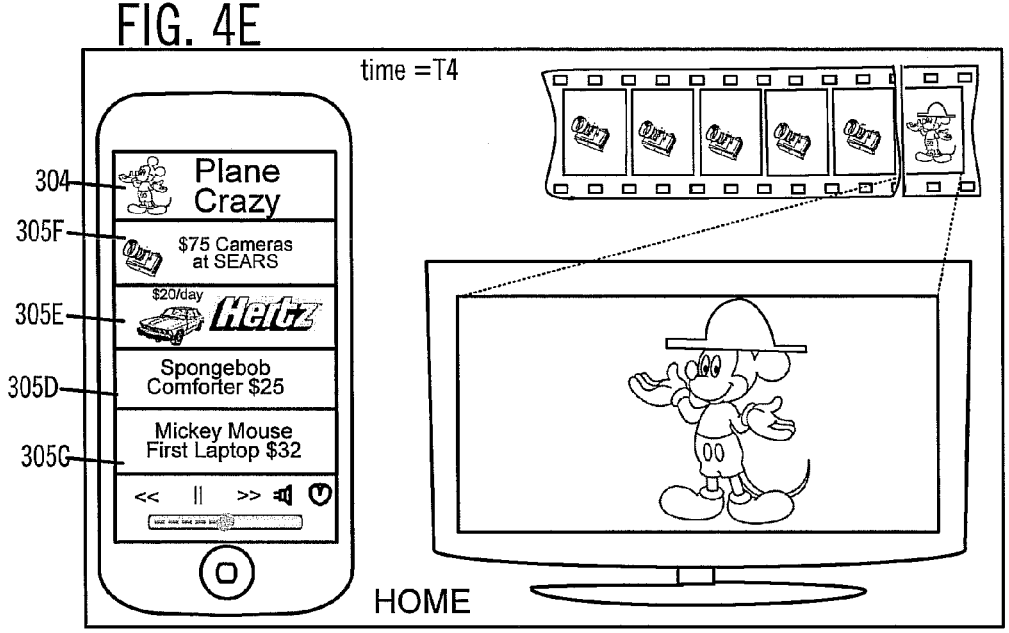

Therefore, yet another temporal relationship 353 is now formed between times T3 and T4, due to overlap between a duration for which another secondary video 342 is displayed on TV screen 307 and a duration during which the most-recently received message 305F is displayed on handheld screen 204. Subsequently, at time T4, computer system 250 returns to transmitting primary video 302. In some embodiments, at time T4 there is no change in the current display of screen 204, i.e. messages 305C-305F and EPG item 304 continue to be displayed on screen 204. FIG. 4E shows the messages 305C-305F displayed at time T4 by the handheld device 200 in the illustrative example shown in FIGS. 4A-4D. The next change on handheld screen 204 happens at time T5, when computer system 250 suspends transmission of primary video 302 and starts transmission of a third secondary video 343 to television 303 and also transmits a new message 305G to handheld device 200 as illustrated by arrow 365.

Figure 4F:
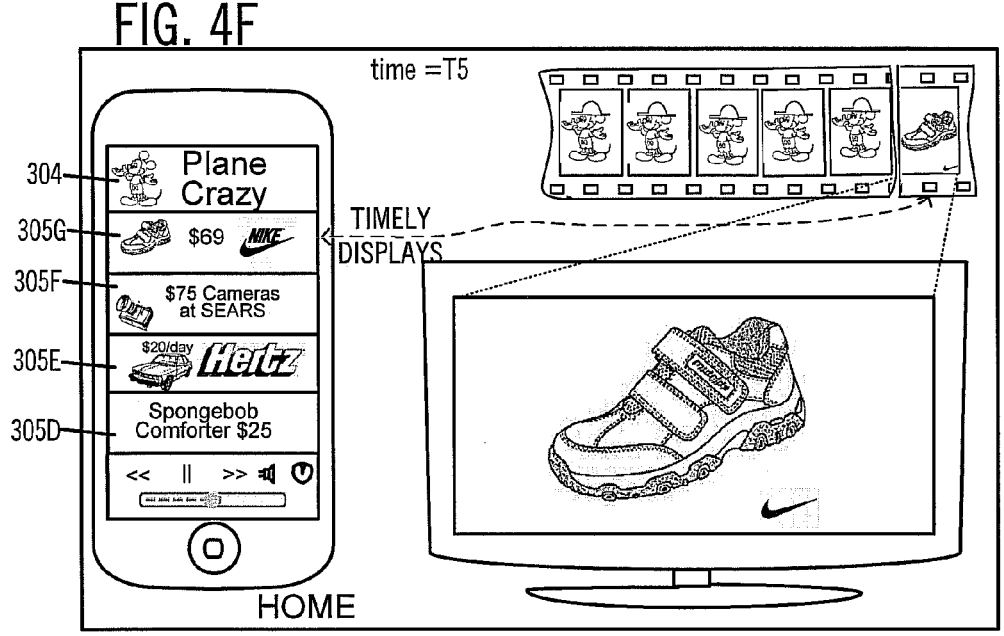

Therefore at time T5, message 305C disappears from view on screen 204 and messages 305D-305F are automatically scrolled downward on screen 204 and the new message 305G is displayed immediately below EPG item 304 (which continues to be displayed unchanged). Hence, another temporal relationship 355 is formed between times T5 and T6 as shown in FIG. 3C, due to overlap between a duration for which secondary video 343 is displayed on TV screen 307 and a corresponding duration during which the new message 305G is displayed on handheld screen 204. FIG. 4F shows the messages 305D-305G displayed at time T5 by handheld device 200 in the illustrative example shown in FIGS. 4A-4E.

Subsequently, at time T6, display of primary video 302 resumes on TV screen 307, but the display on handheld screen 204 remains unchanged, thereby resulting in another temporal relationship 356 between times T6 and T7. FIG. 4G shows the messages at time T6 in the illustrative example shown in FIGS. 4A-4F.

At time T7, the display of primary video 302 is completed (i.e. video 302 has reached the end), and in some embodiments computer system 250 automatically begins transmission of another primary video 370 to television 303, as illustrated in FIG. 3C. In such embodiments, computer system 250 automatically selects primary video 370, e.g. based on attributes of the user. Additionally at time T7, in conjunction with transmission of video 370 to television 303, computer system 250 also transmits to handheld device 200, a new EPG item 371 that identifies video 370 and additional messages 372A-372D. At time T7, television 303 begins the display of video 370 and at about the same time (e.g. within a few seconds), handheld device 200 replaces previously-displayed EPG item 304 with newly-received EPG item 371 and further replaces previously-displayed messages 305D-305G with newly-received messages 372A-372D. In this manner, a handheld screen 204 that is associated with television screen 307 is updated by computer system 250 with new supplementary and complementary information, whenever a corresponding primary video is changed. FIG. 4H shows the messages 372A-372D displayed by handheld device 200 at time T7 in the illustrative example shown in FIGS. 4A-4G.

Although in the embodiments illustrated in FIG. 3D there are no changes on screen 204 when the video being displayed on screen 307 changes, e.g. from secondary video 342 to primary video 302 at time T4 and from secondary video 343 to primary video 302 at time T6, in other embodiments a new set of messages are displayed on screen 204 at such times, in a manner similar to time T7. Moreover, although in some embodiments, messages 305A-305D are all of the same type (e.g. all promotional messages), in other embodiments messages of two types alternate among each other, e.g. a promotional message, a social media message, another promotional message, another social media message.

Figure 5A:
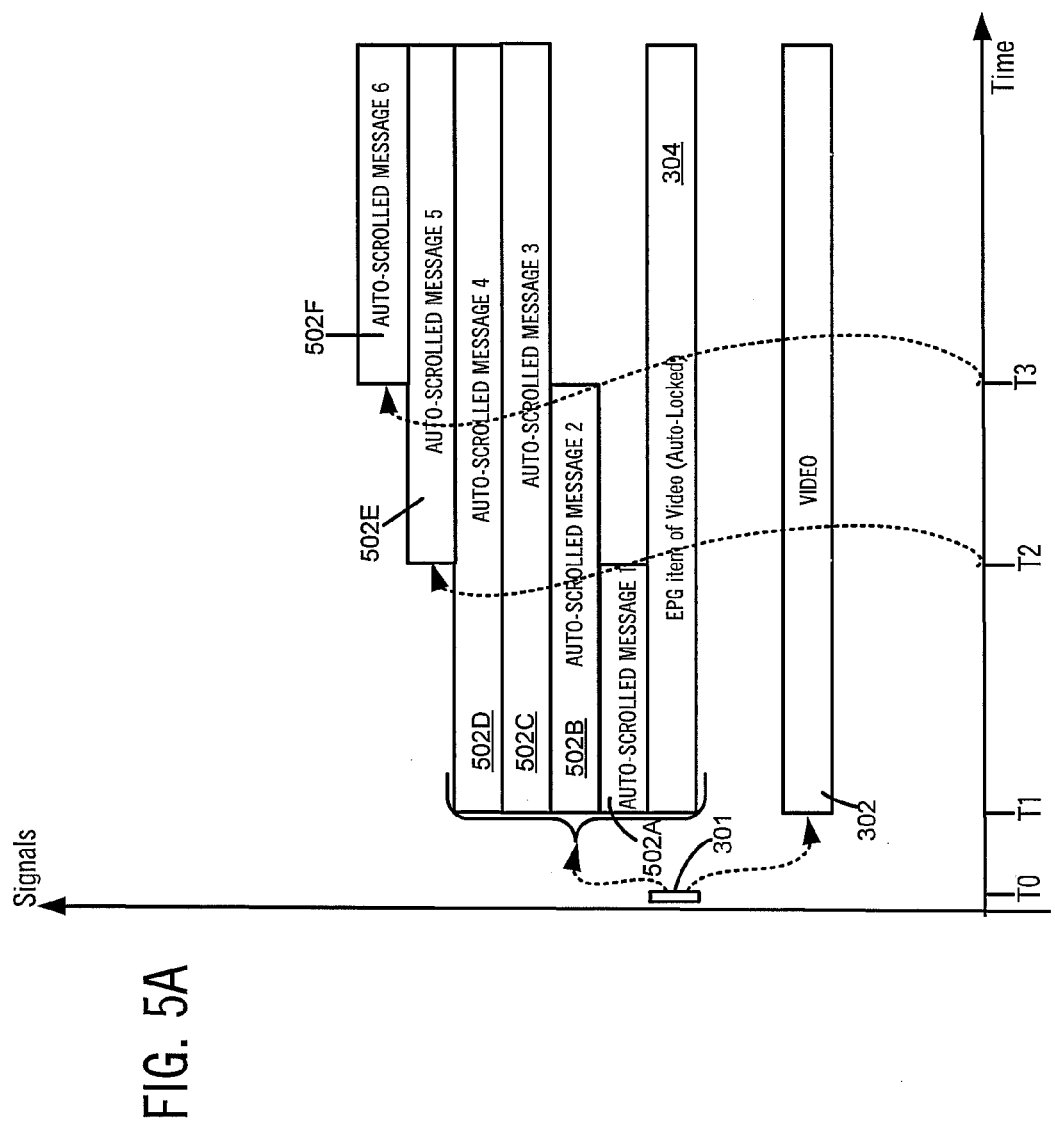
FIG. 5A illustrates, in a timing diagram, automatic scrolling of messages 502A-502D on a handheld device 200 in response to predetermined trigger events at times T2 and T3 while display of an EPG item 304 by handheld device 200 remains unchanged (auto-locked) during the display of the identified video 302 by a television 303.
Figure 5B:
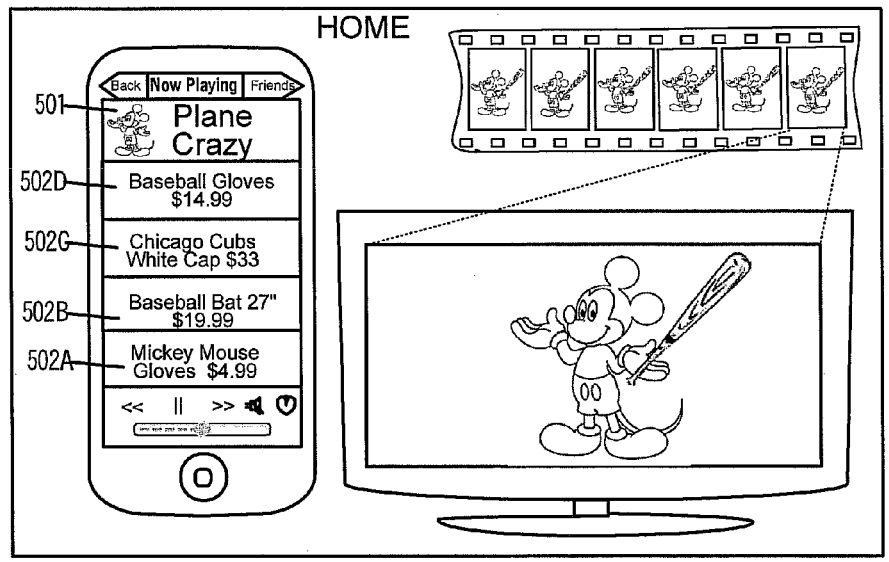
FIGS. 5B and 5C illustrate the operation of dual displays of coordinated media in an exemplary sequence of time illustrated in FIG. 5A.

Handheld device 200 of several embodiments in accordance with the invention displays a message of the type described above in response to a trigger event, such as a predetermined frame number in the video 302 displayed on screen 307, a predetermined time of the day (e.g. noon every day), or a predetermined signal from the Internet. In one such embodiment illustrated in FIG. 5A, when the display of video 302 begins at time T1 on screen 307, messages 502A-502D are displayed on screen 204 (see FIG. 5B). Thereafter, a predetermined trigger event occurs at time T2, and the display on handheld device 200 is updated by scrolling messages 502B-502D downward and a new message 502E is displayed (and message 502A disappears). In some embodiments, handheld device 200 simply displays a list of messages 502A-502D as received from computer system 250 at time T1, and thereafter handheld device 200 replaces the currently displayed list, with a new list of messages 502B-502E as received from computer system 250 at time T2. In several such embodiments, handheld device 200 simply displays on its screen 204 all information as received from computer system 250, and therefore computer system 250 transmits the EPG item 501 to handheld device 200 twice, i.e. with each message list transmitted at each of the two times T1 and T2.

Figure 5C:
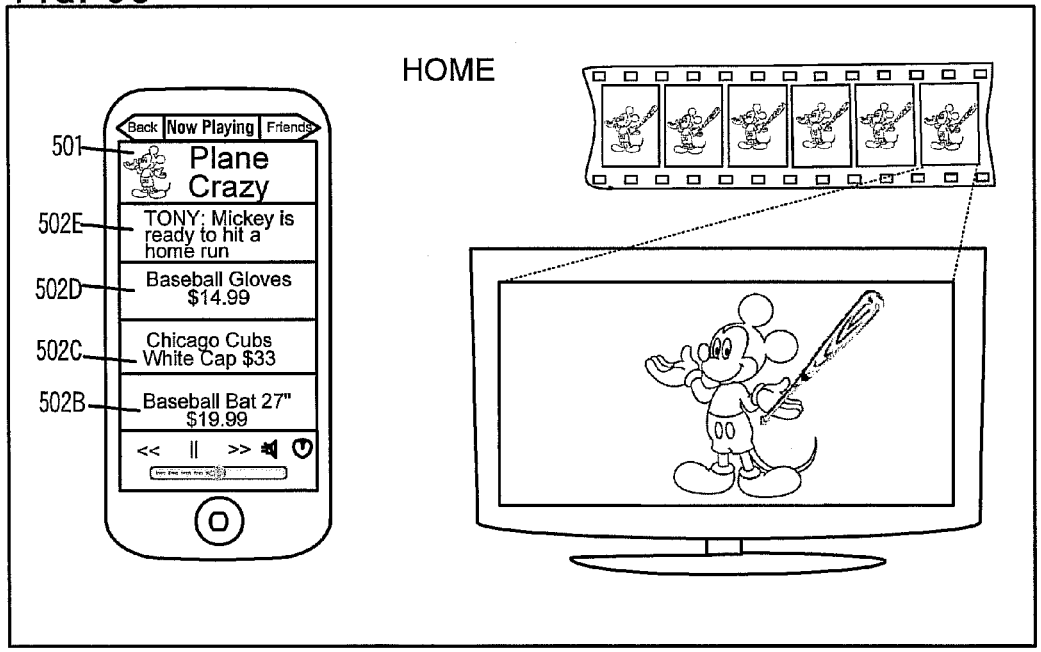

In the example illustrated in FIG. 5C, new message 502E is a social media message that has been selected, e.g. based on an attribute (such as a list of friends) of the user of handheld device 200 or based on video 302 currently being displayed on screen 307. Although a social media message 502E is illustrated in FIG. 5C as being generated in response to a trigger event (such as repeated occurrence of a predetermined duration of time), other embodiments use other messages, e.g. a promotional message or use other trigger events (such as a predetermined frame number in the video being displayed), or any combination thereof. In some embodiments, computer system 250 uses filter criteria set by the user of handheld device 200 to exclude messages that match the filter criteria. An example of a filter criterion is the age of a message, e.g. the user may filter out all messages that are more than 1 day old. In the example illustrated in FIG. 5B, computer system 250 searches a message repository periodically, e.g. every 5 minutes, for messages that match predetermined criteria (such as keywords to be used in matching), and the finding of a matching message by computer system 250 constitutes a predetermined trigger event that occurs at time T2. The matching message 502E is then displayed by handheld device 200, as shown in FIG. 5C.

Figure 5D:
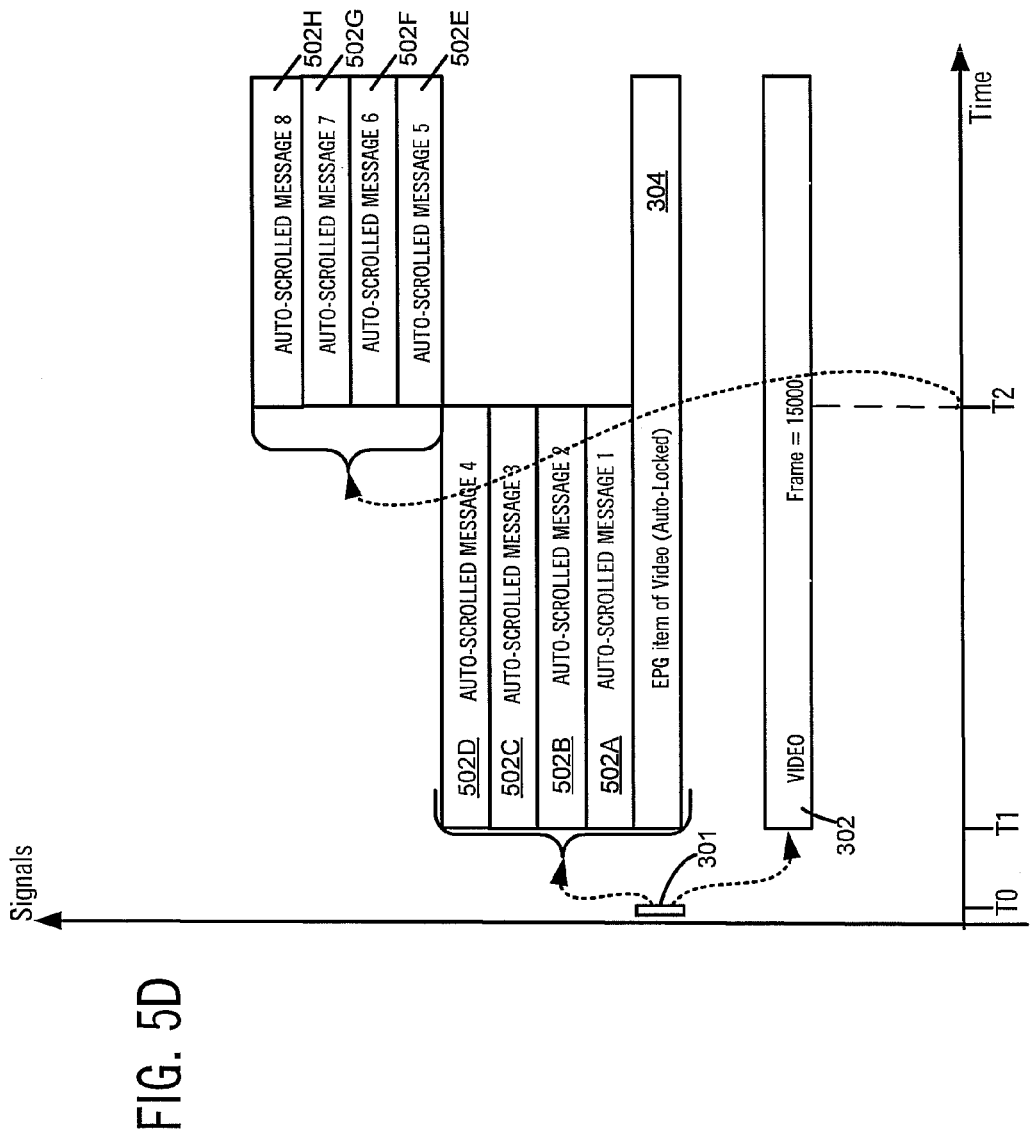
FIG. 5D illustrates, in a timing diagram, automatic scrolling of messages on a handheld device 200 in response to display of a predetermined frame at time T2 while display of an EPG item 304 by handheld device 200 remains unchanged (auto-locked) during the display of the identified video 302 by television 303.
Figure 5E:
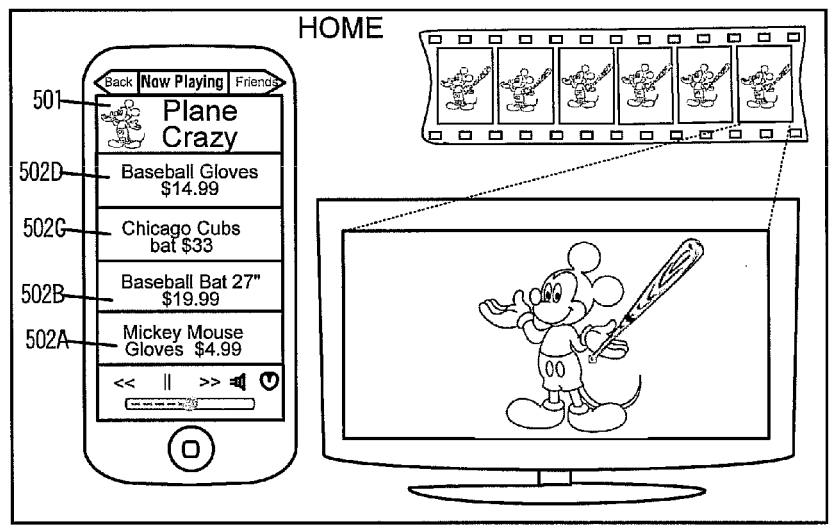
FIGS. 5E and 5F illustrate the operation of dual displays of coordinated media in an exemplary sequence of time illustrated in FIG. 5A.
Figure 5F:
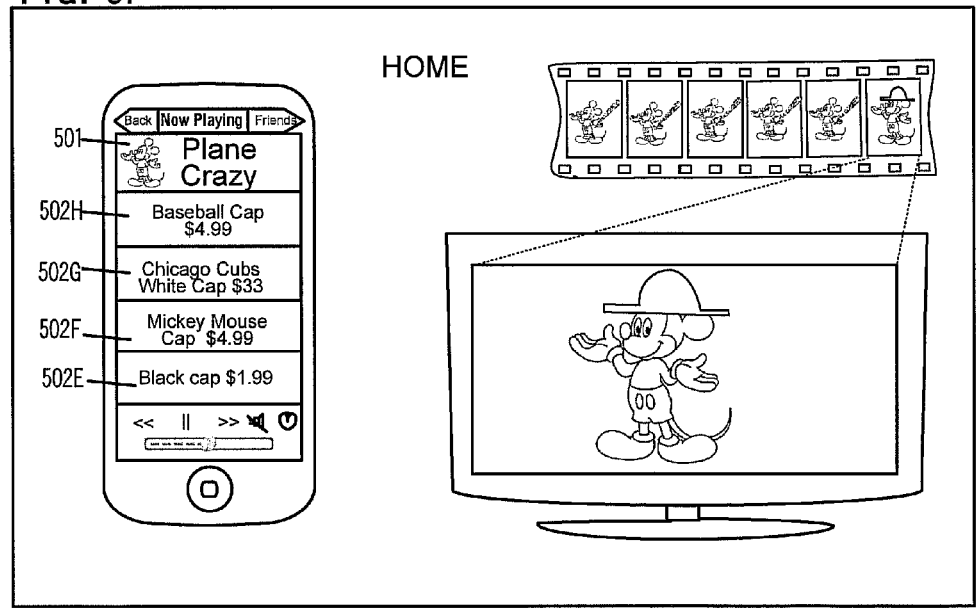

In another example illustrated in FIG. 5D, a list of predetermined frame numbers constitute trigger events for the display of new messages by handheld device 200. Specifically, a predetermined frame number 15000 occurs during the display of video 302, at a time T2 in FIG. 5D, and accordingly computer system 250 searches its message repository for messages that match the predetermined criteria (such as a set of keywords associated with each predetermined frame number in the list). A predetermined number of matching messages are then displayed by handheld device 200. For example, on handheld screen 204, EPG item 501 and messages 502E-502H are displayed at time T2 (FIG. 5F), replacing the entire display of EPG item 501 and messages 502A-502D displayed earlier at time T1 (FIG. 5E).

In some embodiments, a message ("secondary message") that is transmitted at the same time as the start of transmission of a secondary video is prepared by computer system 250 to include certain features, such color and graphic that are excluded from another message ("primary message") that is transmitted at the same time as the start of transmission of a primary video. In one such embodiment, each secondary message and a corresponding secondary video originate from a single entity, such as an advertiser. In one specific example, primary messages from an advertiser are referred to herein as "KRADs" while secondary messages from an advertiser are also referred to herein as "CRADs" and "GRADs". Note that KRADs, CRADs, and GRADs are three types of promotional messages from advertisers, also called remote advertisements ("RADs").

In some embodiments, each of the messages is stored in a computer file in a file system on a disk, whereas in other embodiments each of the messages is stored in a record in a database on a disk, and in still other embodiments a portion of each message (e.g. text) is stored in the database and another portion of each message (e.g. graphic) is stored in a computer file. In such embodiments, the information transmitted by computer system 250 to handheld device 200 includes only text in a list of messages to be displayed in window 251 and a URL of any graphic image associated with the text. Accordingly, in such embodiments, handheld device 200 initially displays the text first on handheld screen 204 and the graphic (e.g. see graphic 256J in FIG. 2G) is displayed after handheld device 200 downloads the graphic using the URL from the Internet. Such a two-step display of the text and graphic individually reduces the latency in the initial display of the text of the messages in window 251.

In one such example, an advertiser (such as The Proctor & Gamble Company) prepares a TV commercial for detergent (such as TIDE) as a secondary video, and additionally also prepares a corresponding secondary message containing an advertisement of the same detergent (e.g. offering to sell 70 oz for $9.99—see FIG. 3C). Accordingly, in this example, a secondary video in the form of a TV commercial for TIDE on TV screen 307 is supplemented by a secondary message in the form of an advertisement for TIDE on handheld screen 204. The just-described secondary message is matched by computer 250 to the just-described secondary video, e.g. by use of a globally unique identifier as the key word associated with each of the secondary message and the secondary video.

Figure 6A:
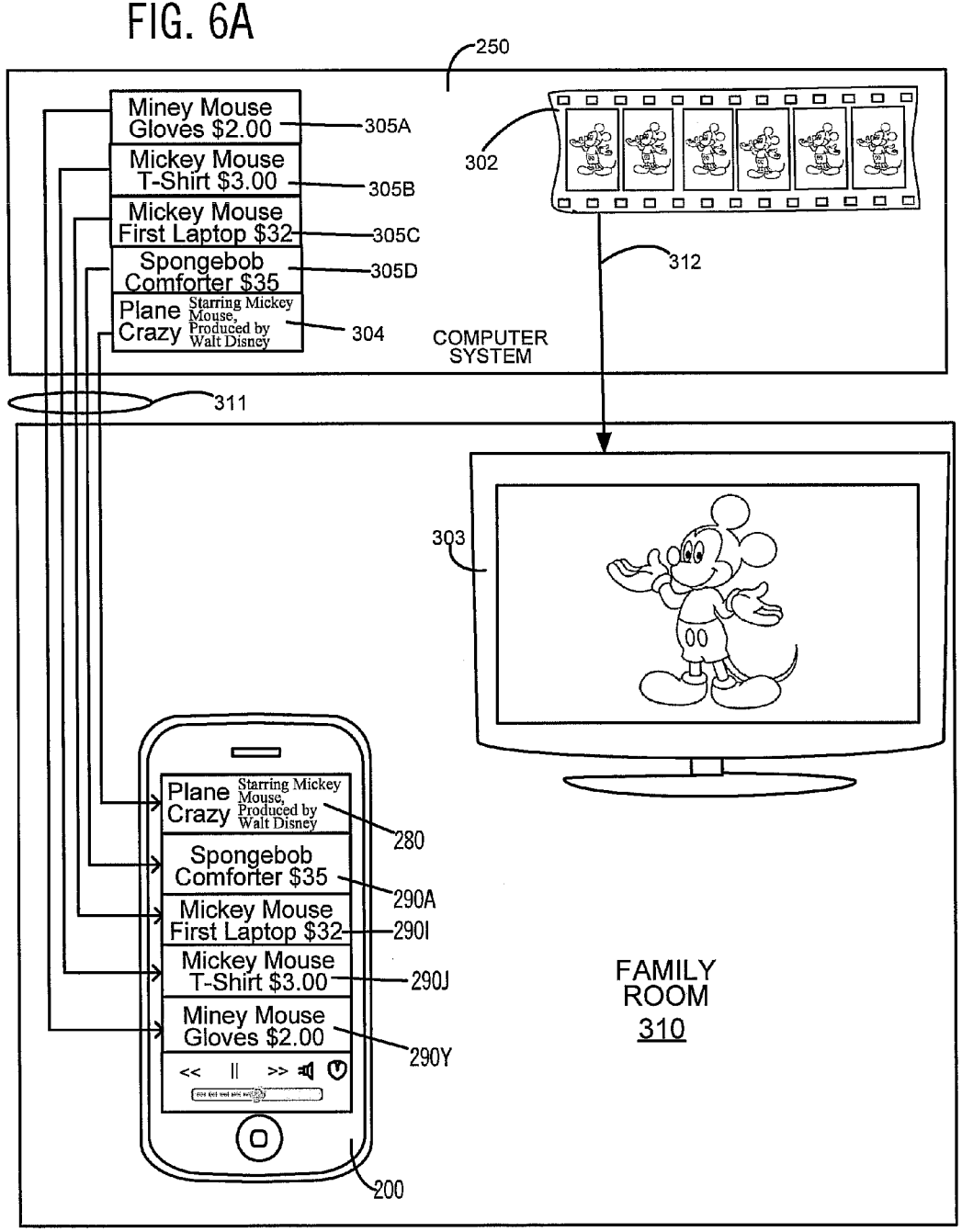
FIG. 6A illustrates, in a high level block diagram, transmission of signals 311 and 312 by computer system 250 to handheld device 200 and internet-enabled television 303 respectively, in order to generate dual displays of coordinated media that overlap in time in user's family room 310, in accordance with the invention.

An example of the above-described embodiments is shown in FIG. 6A, wherein a user has previously touched on handheld device 200, an EPG item 304 of a cartoon movie entitled "Plane Crazy" (e.g. displayed by EPG app 202A supplied by content provider A) starring Mickey Mouse, produced by Walt Disney, in the manner described above. Following the user's touch, computer system 250 is shown in FIG. 3B as responding by transmitting: (1) to television 303, a primary video 302 which constitutes an initial sequence of frames of the "Plane Crazy" movie (e.g. 27000 frames to be displayed at 30 frames/second, over 15 minutes) and (3) to handheld device 200, a signal which includes the text "Miney Mouse Gloves $2.00" as an automatically-scrolled message 305A. In this example, the text "Miney Mouse Gloves $2.00" is a string of characters of text that is to be displayed by handheld device 200, containing an advertisement for gloves on sale by an advertiser which can be a department store, e.g. TARGET, or WALMART, or a specialized store, e.g. TOYSRUS.

Hence, in one specific illustrative embodiment shown in FIG. 6A, handheld device 200 displays the "Miney Mouse Gloves $2.00" message 305A in area 290Y during the time that television 303 is simultaneously displaying any frame in the movie "Plane Crazy." (in alternative embodiments, contemporaneously displaying instead of simultaneously displaying). As noted above, transmission of signal 312 carrying a sequence of frames of movie "Plane Crazy" is directly caused by video request 301, and transmission of signal 311 carrying one or more messages 305A-305D is also directly caused by video request 301 in some embodiments of computer system 250. In other embodiments transmission of one or more of messages 305A-305D in signal 311 is indirectly caused (in computer system 250) by transmission of a predetermined frame within user-selected video 302 (in turn caused by receipt of video request 301).

An overlap between a display of "Miney Mouse Gloves $2.00" message 305A by handheld device 200 and a display of the movie "Plane Crazy" by television 303 depends on a specific implementation of the invention, as follows. Specifically, a precise moment when the display of EPG item 304 and messages 305 begins on handheld device 200 (at time T1 in FIG. 3C) and a corresponding moment when a display of video 302 begins on television 303 depends on multiple factors as follows: (A) when the two signals 311 and 312 are respectively transmitted by computer system 250, (B) delays in propagation through respective networks to respective destinations, and (C) processing time required to parse the respective signals on receipt. For example, an illustrative implementation in accordance with the invention is designed to ensure that a display of automatically-scrolled message 305A by handheld device 200 overlaps (in time) a corresponding display of video 302 by television 303, for at least one minute.

Figure 6B:
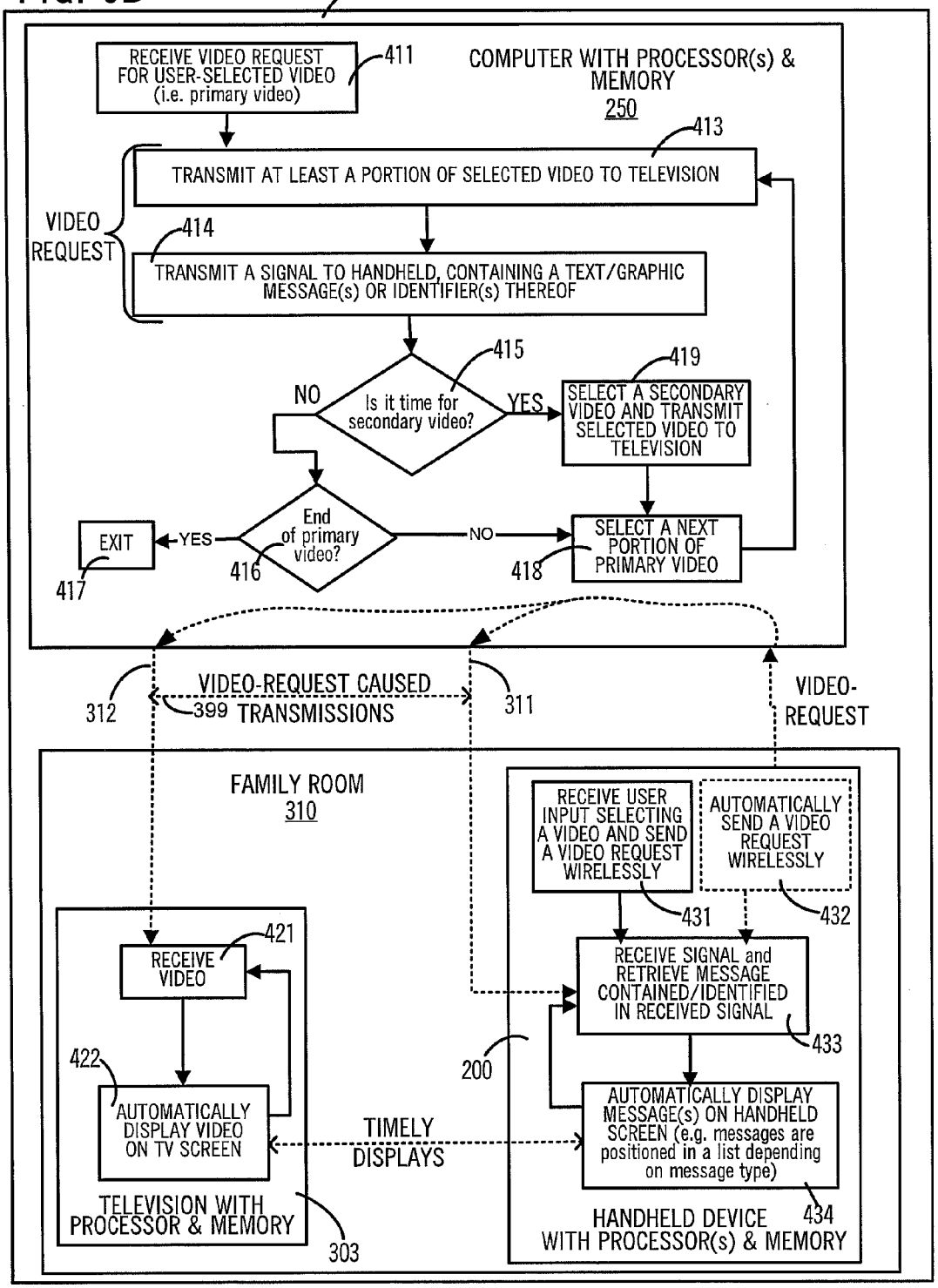
FIG. 6B illustrates, in an intermediate level flow chart, acts performed by computer system 250, handheld device 200 and television 303 of FIG. 6A, in illustrative embodiments of the invention.

Referring to FIG. 6B, a method 400 in accordance with the invention is performed by a combination of computer system 250, a handheld device 200, and a television 303. Specifically, acts 431-433 (see bottom right corner of FIG. 6B) are performed in some embodiments of the invention by handheld device 200 located in a family room 310, while executing an EPG app 202I of the type described above, as follows. In act 431, handheld device 200 receives user input via its touch screen 204, identifying a user's selection of a specific video, e.g. primary video 302. Handheld device 200 then responds to the user input by sending video request 301 wirelessly to computer system 250. In one illustrative embodiment, video request 301 includes a UPC code that uniquely identifies video 302 which has been selected by the user. In an alternative embodiment, video request 301 includes an identification of the video, such as a uniform resource locator (URL) address that identifies a specific computer uniquely on the Internet, and further identifies a directory path therein at which is located a file containing video 302.

Video request 301 is received by computer system 250 located outside family room 310 in an act 411 (see top of FIG. 6B). In some embodiments, as shown by act 413 in FIG. 4A computer system 250 responds to receipt of video request 301 by transmitting a signal 312 (see FIG. 3B) carrying at least a portion of the user-selected video 302 identified in video request 301. Depending on the embodiment, in act 413 the entirety of user-selected video 302 may be transmitted in signal 312, e.g. if primary video 302 is only 5 minutes long in duration (δT) when displayed on television 303. Additionally, as shown by act 414 in FIG. 6B, also in response to receipt of the same video request 301, computer system 250 transmits a signal 311 (see FIG. 3B) to handheld device 200. Signal 311 includes a message 305 of the type discussed above, to be displayed by handheld device 200 on its own screen 204. Hence, in response to the same video request 301, multiple signals are transmitted by computer system 250 programmed as described in the current paragraph, namely signal 311 and signal 312 to the respective devices namely television 303 and handheld device 200 that are associated with one another and in some embodiments physically co-located relative to one another, for example in room 450 (see FIG. 6A) of a user's home.

In act 413 of some embodiments, computer system 250 transmits signal 312 in a real-time stream of data and frames therein are recovered by a processor in television 303 on receipt thereof and displayed on TV screen 307. In such embodiments, only a portion (e.g. of 15 minute duration) of user-selected video 302 (also called "primary video") is streamed initially in order to switch to transmitting (in the real-time stream) a secondary video as per act 414 (described above) before transmitting (in the real-time stream) a next portion (e.g. also of 15 minute duration) of the primary video (thereby to continue transmission of the user-selected video). Accordingly, act 413 is initially performed directly in response to a video request, and subsequently repeated after act 418 (described below) as an indirect response to the same video request.

Hence in such embodiments, after performing act 414, computer system 250 performs act 415 to check if it is now time for secondary video, and if so computer system 250 selects a secondary video in act 419 and then begins transmission of the selected secondary video to television 303 and then goes to act 418. In act 418, computer system 250 selects a next portion of the primary video and then returns to act 413 described above. In act 415 if the answer is no, computer system 250 goes to act 416 and checks if the display of the primary video has ended and if so computer system 250 exits in act 417. If the display of the primary video has not ended in act 416, computer system 250 goes to act 418 (described above). Note that act 414 may be performed initially but skipped during iteration in the loop (from act 418), depending on the embodiment.

In act 413 of alternative embodiments, computer system 250 transmits signal 312 to download the user-selected video 302 to television 303. Hence, in the alternative embodiments, if transmission of the primary video (e.g. user-selected video 302) is not completed at the end of act 413 (e.g. if only a first 15 minute portion of an hour long video has been downloaded), then as per act 416 computer system 250 waits for a duration δT which is needed by a television to display the transmitted portion of the primary video at normal speed, e.g. at a frame rate that is normally used for display of videos on TV 303. As noted above, an example of δT is 15 minutes. Then, computer system 250 goes to act 417 (described above).

In act 414, in response to receipt of a video request 301, computer system 250 of certain alternative embodiments does not transmit a message 305 in signal 311 (FIG. 3B), and instead computer system 250 transmits an identifier of the message (e.g. identifier of non-EPG information) in signal 311. In the just-described alternative embodiments (of the current paragraph), computer system 250 has already transmitted to handheld device 200 a catalog containing non-EPG information likely to be displayed, and this catalog is used on receipt of the identifier to retrieve the message to be displayed. Hence, at this stage, when signal 311 is being transmitted, handheld device 200 includes a catalog of non-EPG information in a non-volatile memory of handheld device 200, such as a flash memory or a hard disk.

In the embodiment illustrated in FIG. 6B, on receipt of signal 312, television 303 retrieves one or more frames of video 302 contained in signal 312, as per act 421 and goes to act 422. In act 422, television 303 automatically displays the retrieved frames of video 302 on TV screen 307, and then returns to act 421 (described above). Moreover, in the embodiment illustrated in FIG. 6B, on receipt of signal 311, handheld device 200 programmed with EPG app 206I retrieves one or more message(s) 305 contained in or identified in signal 311, as per act 433 and goes to act 434. In act 434, handheld device 200 automatically displays the retrieved message(s) 305 on its screen 204, and then returns to act 433 (described above). Note that handheld device 200 in the embodiment illustrated in FIG. 6B includes at least a processor coupled to memory and the memory stores an EPG app 202I with the related EPG data including one or more descriptions 206A-206Z of corresponding videos 208A-208Z (see FIG. 2B) as described above.

In some embodiments, there are no changes to a display on handheld screen 204 when a user rewinds (or fast forwards) a display of user-selected video 302. Specifically, in these embodiments, even when a signal is sent from handheld device 200 to computer system 250 to rewind or fast-forward video 302, no new messages for display by handheld device 200 are sent by computer system 250 so that any messages currently displayed on screen 204 continue to be displayed even if the currently-displayed messages would normally change on screen 204 when video 302 is displaying on TV 303 at normal speed, In the embodiment illustrated in FIG. 6B on receipt of signal 311, a processor in handheld device 200 when programmed with an EPG app 202I retrieves a message 305 that is contained in or identified in signal 311, as per act 433 and goes to act 434. In act 434, the processor of handheld device 200 automatically displays the retrieved message 305 on handheld screen 204, and then returns to act 433 (described above).

Transmission of video request 301 and display of video-request caused message(s) 305A-305D and an EPG item 304 by handheld device 200 is implemented in many embodiments by certain software that is used by each EPG app 202I to interact with computer system 250. Specifically, in some embodiments, a common piece of software called "authority-compatible handheld interface" 209I (FIG. 2B) is included in (and integrated into) each EPG app 202I that is otherwise implemented independently by the corresponding content provider I, among multiple providers A-N. To summarize, in many embodiments, there are a N number of EPG apps 202A-202N in handheld device 200 used to browse N corresponding video libraries of N content providers, and the N interfaces 209A-209N included in the N different EPG apps 202A-202N are all identical to one another, supplied by a single computer also referred to herein as an "authority server". Interfaces 209A-209N being identical to one another ensures that computer system 250 interacts with handheld device 200 in an identical manner, regardless of which EPG app 202I is currently being used.

In many embodiments of the type described herein, television 303 is a normal television 313 (FIG. 7) that modified by including therein a data network interface circuit 392 (i.e. TV 313 and circuit 392 are together enclosed in a housing to form internet-enabled television 303). Data network interface circuit 392 can be external to the TV housing, e.g. included in a separate housing of either a set-top box or a player of an optical disk, depending on the embodiment. In several embodiments in accordance with the invention, TV screen 307 (FIG. 3A, FIG. 7) is an external surface (e.g. formed of glass) on which an electronically created picture or image is normally formed, such as a large end of a cathode-ray tube of a television, or a glass plate of a liquid crystal display (LCD) or a plasma display. In many embodiments, such a TV screen 307 is several times (e.g. 4 or 5 times) larger when measured along a diagonal than handheld screen 204. In one illustrative example, TV 303 has a screen 307 that is 15.6 inches in size (measured diagonally) more than four times larger than the 3.5-inch screen 204 of a handheld device 200. Two illustrative examples of normal television 313 are the products (1) KDL-52V5100, which is a BRAVIA V series HDTV with a 52-inch LCD flat panel and a digital video processor, available from Sony Corporation and (2) SV370XVT which is also a HDTV, available from Vizio, Inc.

Figure 7:
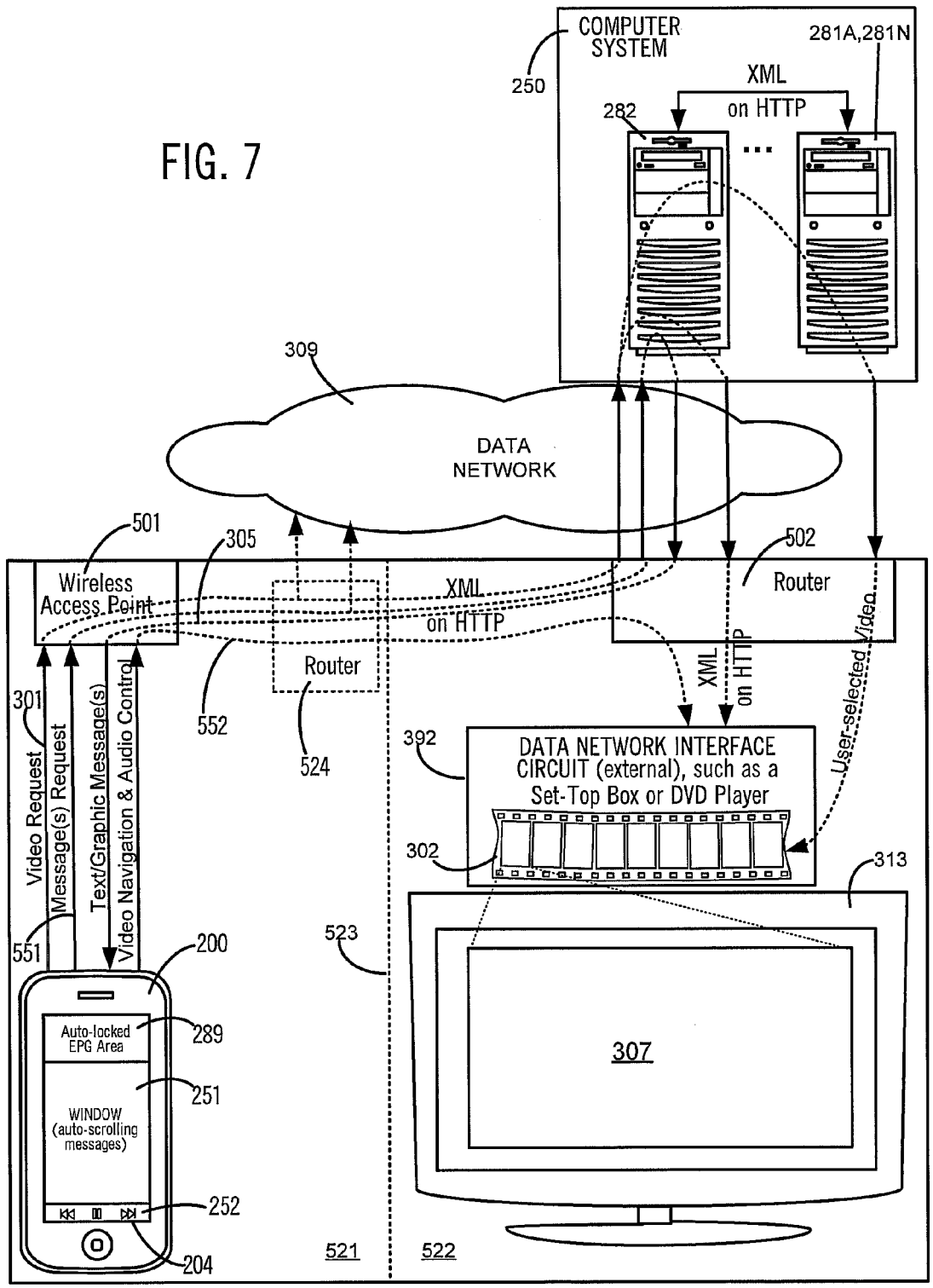
FIG. 7 illustrates, in a high level block diagram, flow of signals among a handheld device a wireless access point and a television, all located physically in the same building in several embodiments of the invention.

Although in embodiments of the type illustrated in FIG. 3A, a message 305 transmitted by computer system 250 is in response to receipt therein of a video request 301, in alternative embodiments of the type illustrated in FIG. 7, message 305 is transmitted by computer system 250 in response to an additional request 551 (see FIG. 7) from handheld device 200 explicitly requesting one or more messages. Also depending on the embodiment, video 302 that is selected for display by television 303 (FIG. 3A) is either explicitly identified by user input selecting one of descriptions 206A-206Z displayed on the screen 204 of handheld device 200 as described above (e.g. in reference to acts 411 and 413 in FIG. 6B), or alternatively video 302 is automatically selected by computer system 250 in some embodiments of act 412.

In a number of alternative embodiments, a handheld device 200 does not use a wireless network 308, as shown in FIG. 3A and instead handheld device 200 uses a wireless access point 501 (FIG. 7) that in turn is coupled to a router 502. In several such alternative embodiments, router 502 is coupled to data network 309 (described above) and therefore, the video request 301 is transmitted through data network 309 instead of wireless network 308. Moreover, in certain alternative embodiments, a television 303 of the type illustrated in FIG. 3A is not co-located within the same room as handheld device 200. In one such alternative embodiment illustrated in FIG. 7, a handheld device 200 is located in a room 521 that is separated by a wall 523 from another room 522 in which is located a normal television 313 that is similar or identical to above-described television 303 described herein. In one example of just-described embodiment, rooms 521 and 522 are in the same building, e.g. a parent working in study room 522 and a child viewing television 313 in family room 521.

Note that in another alternative embodiment of the type described above, rooms 521 and 522 are located in two different buildings that are physically separated from each other, e.g. a parent operates handheld device 200 at a room 521 in the parent's office which is located several miles distant from room 522 in that parent's home wherein a child is watching television 303. In such an embodiment, wireless access point 501 is coupled to a router 524 that in turn is coupled to data network 309 as shown in FIG. 7. Moreover, in some embodiments, a handheld device 200 uses wireless access point 501 (FIG. 7) with one or more router(s) 502 and optionally 524 to transmit a signal 552 to data network interface circuit 392 locally, i.e. within the user's building thereby to minimize latency in the response of television 303. In some embodiments, signal 552 is used by handheld device 200 essentially to transmit video navigation and audio control commands to data network interface circuit 392 that is connected to television 303. In other embodiments, signal 552 is used exclusively to transfer all information between handheld device 200 and computer system 250, i.e. video request 301 and messages 305 are transferred to and from computer system 250 only via circuit 392. In alternative embodiments, signal 552 is not used at all, and in these embodiments video navigation information is transmitted from handheld device 200 to computer system 250 directly, and then transmitted from computer system 250 to television 303.

In some alternative embodiments, a request 551 is transmitted by handheld device 200 in response to a pre-specified event occurring in handheld device 200, such as periodically every 15 minutes from the time an EPG app 202J is opened. In such alternative embodiments, TV programs are unicast to television 303 in signal 312, in response to a TV-program request (instead of a video request) in signal 301 from handheld device 200. In such alternative embodiments, act 412 is performed by computer system 250 in response to a TV program request (not shown) from handheld device 200 that does not identify any video on demand. Instead, as soon as an EPG app 202I is opened on handheld device 200, an act 432 is performed by a processor of handheld device 200 to transmit a TV program request that identifies a scheduled TV program. The scheduled TV program is implemented in some embodiments by a table in a memory of computer system 250, wherein one column has start time and another column has the name of a TV program to be transmitted in response to TV program requests (at the start time).

Television 303 of FIG. 3A can be, for example, an Internet-enabled television that includes a processor, a memory (including an authority-compatible set-top interface) and a receiver (including a tuner) in conformance with a specification published by the Advanced Television Systems Committee, such as the ATSC standard A/53 that was adopted by the Federal Communications Commission in the United States (US) in 1996 and has now replaced the NTSC television system in the US. Hence, in an embodiment of the type illustrated in FIG. 3A, television 303 is coupled to a router 502 that in turn is coupled to a data network 309 (e.g. Internet or an internal network of a cable TV service provider such as COMCAST). Note that in certain alternative embodiments, the user views video 302 on a normal television 313 that is externally coupled to data network interface circuit 392 (FIG. 7). In normal operation, data network interface circuit 392 is coupled by router 502 to a data network 309.

Moreover, in some embodiments, computer system 250 as illustrated in FIG. 3A includes a single computer that performs acts 411-417 described above in reference to FIG. 6B, although in other embodiments computer system 250 (see FIG. 7) includes multiple computers 281A-281N and 282 that are interconnected to one another. In several embodiments, computer 282 is operated as an authority server that authorizes the release of videos to internet-enabled televisions in users homes, and computers 281A-281N are operated by content providers that maintain repositories of videos to be authorized by computer 282 ("authority server"). Accordingly, in several illustrative embodiments shown in FIG. 7, authority server 282 performs act 414 (FIG. 6B) and another computer 281I ("content provider server") performs act 413. In several such embodiments, only a video request 301 (and no message request 551) is sent by handheld device 200 to authority server 282, and authority server 282 in turn sends another message to content provider server 281I, e.g. identifying a video 302 to be transmitted, and also identifying a specific television 303 as the destination for the identified video 302. In one example, computer system 250 is implemented by computers 282 and 281A-281N (FIG. 7) in a server farm operated by a data-center service provider, such as Amazon.com.

In some embodiments illustrated in FIG. 7, a handheld device 200 sends data to and receives data from authority server 282 using XML (extensible markup language) data format although in other embodiments the data may be transferred using other formats, such as JSON (javascript object notation), serialized objects in binary, and any custom format or public format. In several embodiments, handheld device 200 communicates with authority server 282 (e.g. to transfer data and/or commands) using the communication protocol HTTP (hyper text transfer protocol), although in other embodiments the following communication protocols are used: sockets, UDP (user datagram protocol), and any custom protocol or public protocol. Similarly, in several such embodiments, television 303 receives data from authority server 282 using XML data format over HTTP protocol although in other embodiments, commands are transmitted over sockets using an API of the authority-compatible set-top interface in television 303. Moreover, in several such embodiments, television 303 receives a sequence of frames of video from a content provider 281I using any one of various protocols such as RTSP (real time streaming protocol), HTTP, UDP and any custom format or public format.

In some embodiments illustrated in FIG. 8A, an authority server 282 performs acts 801-809, a content provider server 282I performs acts 811-818, and third computers 283 ("message client") and 838 ("message server") perform one or more of acts 821-826, as discussed below to implement a computer system 250 described above. Specifically, in act 801, computer 282 receives an identifier of a video 302 in a video request 301 (FIG. 8B) from a handheld device 200. In embodiments that support multiple content providers, computer 282 may also receive, in act 801, an identifier of the content provider that maintains a repository 834I (FIG. 8B) in which a file containing video 302 is available. Repository 834I is physically present in a storage device (such as a hard disk) of a computer 281I of content provider I.

In several such embodiments, an identifier of each content provider computer 281I and an identifier of each video 208J available therefrom (see FIG. 2B) are combined into (e.g. by concatenation to form) a single globally unique identifier (GUID) in computer system 250. A number of GUIDs, of videos 302 that are available for on-demand download from computer system 250, are transmitted by computer 282 to handheld device 200 prior to act 801, e.g. during initialization of one or more lists in an EPG app therein (such as a favorites list described above). Accordingly, one such GUID, which was previously supplied to handheld device 200, is now returned in video request 301, and is received in act 801.

Subsequently, in act 802 (FIG. 8A) computer 282 uses an identifier of handheld device 200 (that originated video request 301) to perform a table look up in a database 831 (FIG. 8B) to find an identifier of a television 303 that has been previously associated with handheld device 200 (e.g. via signal 832 shown in FIG. 8B, during initialization of the EPG app therein). In such embodiments, database 831 supports association of only one television 303 with each handheld device 200, in a many to one relationship, i.e. multiple handheld devices can be associated with a single television but not vice versa. In some embodiments, in act 802 a television 303 is authorized by computer 282 using a table in database 831 that holds an association between handheld device 200 and television 303, and optionally holds additional information on television 303, e.g. identity of one or more module(s) in television 303 to be used to enforce digital rights management (DRM) on video 302 to be supplied by the content provider.

Thereafter, in act 803 (FIG. 8A), computer 282 transmits to computer 281I, an authorization 836 including the identifier of television 303 which is now authorized to receive the identified video 302 and additionally an identifier of video 302 (or a portion thereof, e.g. if video 302 is subdivided into multiple 15 minute portions). Depending on the embodiment, the identifier of video 302 which is transmitted in authorization 836 can be same as or different from the above-described GUID of video 302 which is received in act 801. In embodiments wherein an identifier of video 302 ("content provider's video identifier") that is transmitted to computer 281I is different, computer 282 additionally performs in act 802 a look up of a translation table in database 831 to obtain the content provider's video identifier from the above-described GUID. Such a translation table is populated in database 831 during initialization of computer 281I. In certain embodiments, in act 803, computer 282 optionally generates a unique number ("DRM token") that is also transmitted in authorization 836 and the same DRM token is used in act 804 as discussed in the next paragraph. The DRM token can be generated in any manner, e.g. using a pseudo-random number generator in computer 282.

Subsequently, in act 804 (FIG. 8A) computer 282 transmits to television 303 an identifier of the video 302 to be downloaded and also an identifier of a source of the video, such as an identifier of the content provider. In one illustrative embodiment shown in FIG. 8B, in act 804 computer 282 transmits a URL of a file located on computer 281I in a signal 833 to television 303 (which is associated with handheld device 200). Depending on the embodiment, the URL may or may not be encrypted (e.g. using the HTTPS protocol of the World Wide Web). In certain embodiments, in act 804 computer 282 additionally transmits in signal 833 the same DRM token that is also transmitted to computer 281I. In these embodiments, television 303 uses the DRM token when requesting a download of video 302 from computer 281I of the content provider.

Thereafter, in act 805 (FIG. 8A), computer 282 automatically selects a predetermined number of messages from one or more message repositories, such as message repository 835 (FIG. 8B) and message repository 839, based either directly or indirectly on user-selected video 302 or an attribute thereof and/or an attribute of the user. In one illustrative example, each video has associated therewith a list of keywords ("video keywords") e.g. in a table of database 831, and in this particular example computer 282 searches message repository 835 to find any promotional messages with text that matches the video keywords associated with the user-selected video 302. Similarly, computer 282 may issue a search request to computer 838 to find any social media messages that match the video keywords. Note that in some embodiments, each promotional message is itself associated with a list of keywords ("message keywords") and computer 282 matches the video keywords to the message keywords, in order to find matching promotional messages. In such embodiments, the text of a promotional message does not necessarily contain the message keywords, and instead is simply associated therewith in repository 835.

In act 805 (FIG. 8A), computer 282 of some embodiments sorts the results of the keyword search to form a list of matching messages, and identifies from the top of the list, the predetermined number of messages (e.g. four messages or five messages) in act 805. In several such embodiments, each message in repository 835 (FIG. 8B) has associated therewith, a criterion ("ranking criterion") whose value used in sorting the list of search results. In one such embodiment, the ranking criterion has a value set by an author of the message, e.g. an advertiser that originates a promotion message to sell a product or service may set as a value of the ranking criterion a price (also called "bid") that the advertiser is willing to pay for the message to be selected for display to the user, in act 805. Depending on the embodiment, computer 282 may use other criteria, such as the user's profile (e.g. age, or gender) to select messages in act 805.

Subsequently, in act 806 (FIG. 8A) computer 282 of many embodiments transmits to handheld device 200, a signal 311 (FIG. 8B) containing a sorted list of the messages selected in act 805, e.g. ranked by size of advertisers bids. In alternative embodiments, messages themselves are not transmitted in act 806 and instead only identifiers of the selected messages are transmitted in signal 311 at this stage. The identifiers in signal 311 are used within handheld device 200 to look up a local copy of a message repository 835 that is stored therein (either in whole or in part). Hence, in one such embodiment, as set of messages that are likely to be displayed are identified and transmitted by computer 282 to handheld device 200 ahead of time, prior to act 806. In this particular embodiment, the likely-to-be-displayed messages are maintained by handheld device 200 in a local memory 385 (FIG. 3E), and one or more such messages are subsequently displayed in response to receipt of corresponding message identifiers, selected by performance of act 805 in computer 282 as described above.

Thereafter, in act 807 (FIG. 8A), computer 282 automatically checks whether transmission of the user-selected video has been completed. Depending on the embodiment, an event indicating completion of transmission of the user-selected video is received in computer 282 either from computer 281I or from television 303. Accordingly, in act 807, computer 282 waits for such an event, and on occurrence thereof, computer 282 performs act 808. In act 808, computer 282 selects another portion of the user-selected video 302 (in those cases wherein video 302 is subdivided into multiple portions), and alternatively selects another video to be displayed on television 303 and then returns to act 803 (discussed above).

In some embodiments, in an act 811 (FIG. 8A), computer 281I receives an authorization 836 (FIG. 8B) from authority server 282 to transmit video 302 to television 303 each of which is specifically identified in the authorization 836. As noted above, in certain embodiments, a first DRM token is included in authorization 836. Subsequently, in act 812, computer 281I receives a video fetch 837 from television 303, and in certain embodiments a second DRM token is included in video fetch 837. Thereafter, in act 813, computer 281I checks if the video 302 identified in video fetch 837 is protected with DRM and if not protected goes to act 814 (FIG. 8A). In act 814, computer 281I retrieves the video from video repository 834I (FIG. 8B), and goes to act 818. In act 818, computer 281I transmits the video the authorized television 303, and on completion of transmission notifies computer 282 (i.e. authority server). As noted above, computer 282 of some embodiments waits for this notification in act 807.

In act 813, if computer 281I finds that the video 302 to be downloaded is protected with DRM, then computer 281I goes to act 815 to check if the television 303 to receive this video has available therein, a DRM module (e.g. DRM decryption software of a specific version from a specific vendor) that matches the encryption of video 302, in order to be able to decrypt the video. Depending on the embodiment, computer 281I checks for the configuration of television 303 either directly by interacting with television 303 or indirectly by interacting with computer 282 that holds configuration information on television 303 in its database 831.

If computer 281I finds in act 815 that television 303 that is to receive video 302 does not have the matching DRM module, then act 817 is performed to transmit an error message to computer 282 (i.e. authority server), followed by returning to act 811 (described above). If computer 281I finds in act 815 that television 303 does have a matching DRM module, then computer 281I goes to act 816 to check if the DRM token received in video fetch 837 is valid. For example, in one illustrative embodiment, computer 281I simply compares the DRM token received in act 811 from computer 282 is equal to the DRM token received in act 812 from television 303, and if so goes to act 814. If there is no match in act 816, computer 281I returns to act 817 (described above).

Message repositories 835 and 839 (FIG. 8B) can be populated in different ways depending on the embodiment. In some embodiments, computers 838 and 283 ("message server" and "message client" respectively) perform one or more of acts 821-826 as follows. Specifically, in act 821, computer 838 receives a message, which may be of a specific type, such as a social media message from a user. In some embodiments of act 821, computer 282 retrieves a social media message from a computer 838 on the Internet at a predetermined address, e.g. at the address identified by the string www % twitter % com after replacing % with the period ".". In other embodiments of act 821, computer 282 receives a promotional message from a computer 283 on the Internet of an advertiser. Computer 838 of some embodiments stores messages in repository 839, based on type, i.e. only social media messages are stored in repository 839 and they are made accessible to computer 282 via a public API.

Next, in some embodiments computer 282 performs an act 822 to automatically generate message keywords that are to be used in matching message of a specific type (e.g. social media messages) received in act 821 with the video keywords. The message keywords are generated, for example, by automatically parsing the received message (such as a social media message), to identify words therein, followed by filtering out predetermined words (such as "the", "he", "she", "it" etc) and using the results of filtering to generate additional words (e.g. using a thesaurus). In other such embodiments, in act 822 computer 282 receives message keywords to be associated with the received message (such as a promotional message), from a human (e.g. an advertiser) user of computer 283.

Next, in several embodiments, computer 282 performs act 823 to receive from the human user of computer 283, a value of a criterion to be used with messages of a specific type (e.g. promotional messages) received in act 821 at a future time, when computer 282 ranks matching messages in act 805. As noted above, in some embodiments, the value is a price (in dollars) that an advertiser is willing to pay for their promotional message to be selected in act 805. Next, in act 824, computer 282 stores a promotional message received in act 821, the keywords in act 822 and the value in act 823 in a message repository 835. Eventually, in act 825, computer 283 receives a report from computer 282 (e.g. in response to a query) containing statistics on selection of the promotional message, and displays the report to the advertiser in act 826.

Figure 9A:
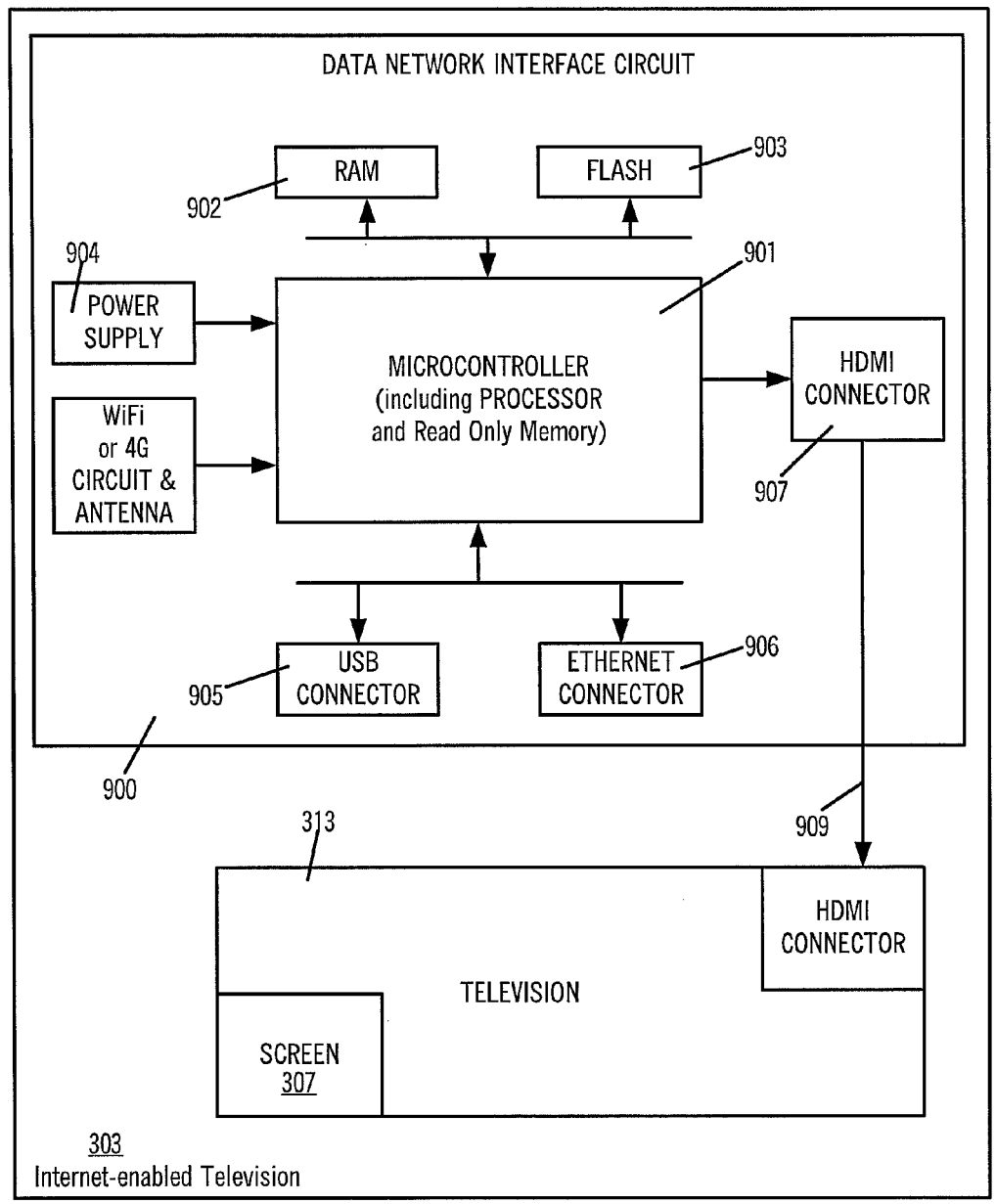
FIG. 9A illustrates, in a high level block diagram, an internet-enabled television of the prior art, for use in some embodiments of the invention.

FIG. 9A illustrates, in a high level block diagram, an internet-enabled television of the prior art, for use in some embodiments of the invention. Specifically, in FIG. 9A, a data network interface circuit 900 is externally coupled to a normal television 313, using a HDMI cable 909. Data network interface circuit 900 includes a microcontroller 901 which, in an illustrative example, is a single chip that includes a processor, a read-only memory, a random-access memory (RAM), a television interface circuit, a USB interface circuit and an Ethernet interface circuit. An example of microcontroller 901 is the product ST-7105 available from STMicroelectronics. Microcontroller 901 is typically mounted on a printed circuit board 900 and connected therethrough to an external RAM 902, an external FLASH memory 903, a power supply 904, a USB connector 905, an Ethernet connector 906, and an HDMI connector 907 and the resulting combination (data network interface circuit 392) may be included in a set-top box, or a player of an optical disk (such as a DVD player, or a Blue-ray player), or an Internet-enabled TV. One illustrative embodiment of a television 303 in accordance with the invention uses BDP-N460HP Blu-ray DVD player available from Sony Corporation to display video 302 on TV screen 307 (described above).

Figure 9B:
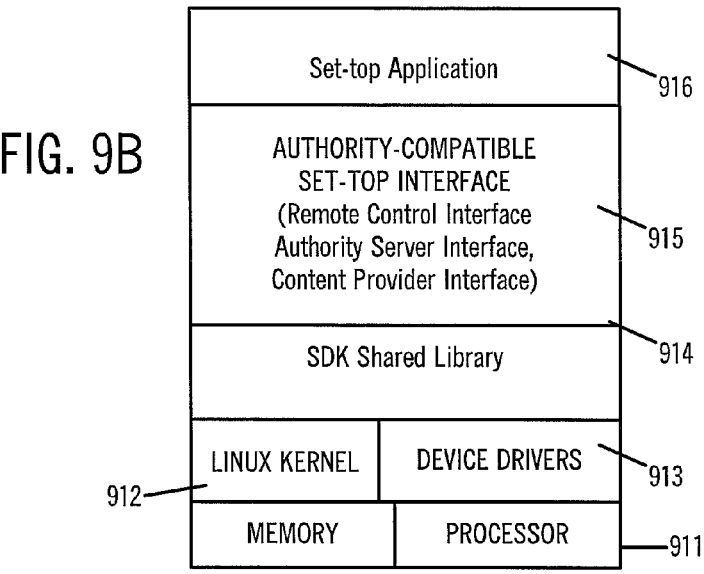
FIG. 9B illustrates a software stack executed by a processor in an internet-enabled television, in the implementation of FIG. 8B.
Figure 9C:
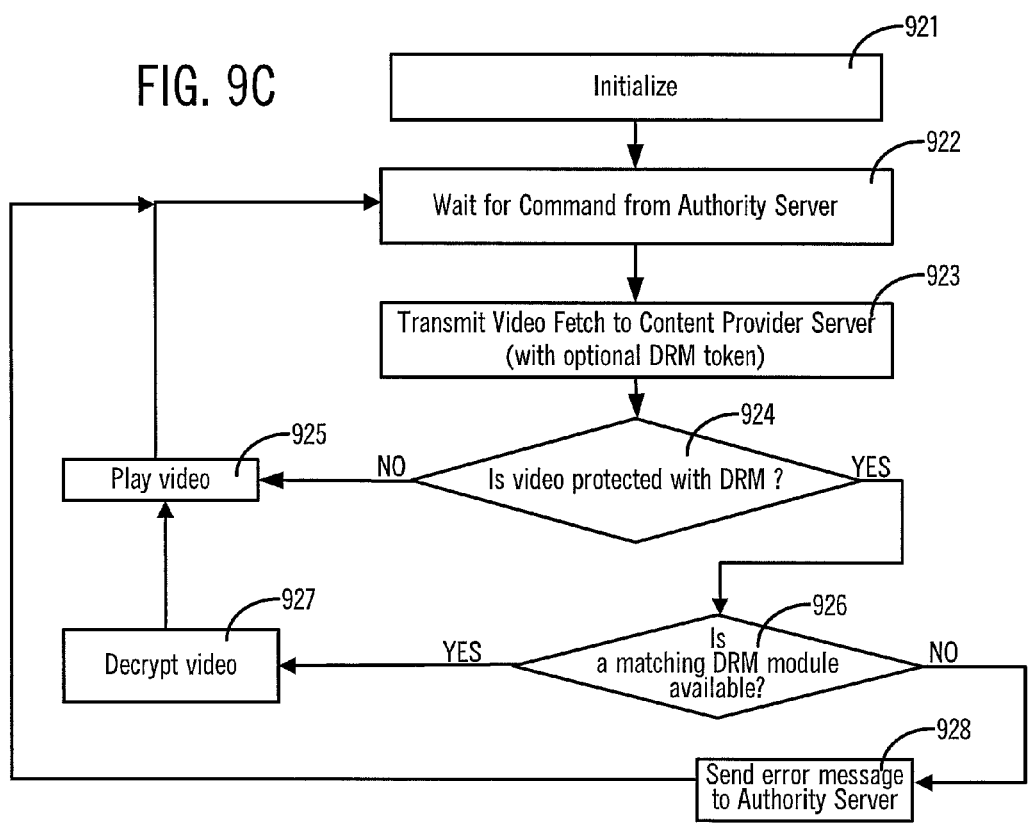
FIG. 9C illustrates acts performed by the processor of FIG. 9B in the implementation of FIG. 8B.

Microcontroller 901 typically includes a processor 911, such as the SuperHitachi RISC running software stored in memory. The software executed by processor 911 in some embodiments of the invention is illustrated in FIG. 9B, and typically includes a Linux Kernel 912, one or more device drivers 913 (e.g. for USB, Ethernet, and HDMI interfaces), and a software development kit (SDK) shared library 914 for media control of audio and video streams, such as RTSP, multi-cast, UDP and DVB. One example of the just-described SDK software is available from STMicroelectronics as STAPI. Processor 911 additionally executes predetermined software 915 that provides an interface between microcontroller 901 and computer system 250 (also called "authority-compatible set-top interface", or simply "set-top interface") by supporting various services, such as discovery, authentication, security, and video and audio streaming.

Set-top interface 915 is several embodiments of the invention is invoked by a set-top application 916 (FIG. 9B) that is executed by processor 911 as follows. Specifically, in a setup mode, set-top application 916 causes circuit 900 to display on screen 307 a number of choices from which the user can use a normal remote control of television 313 to select a specific choice. One of the displayed choices is a logo that is associated with authority-compatible set-top interface 915. Therefore, on receipt of user input selecting the just-described logo, set-top application 916 invokes execution of authority-compatible set-top interface 915, which performs acts 921-928 discussed below.

In act 921, microcontroller 901 performs initialization operations, such as configuring an Ethernet port and an IP address for connector 906 coupled to data network 309 and communicates with computer system 250 to identify itself, e.g. with a unique name and password supplied by the user to set up television 303 on initial activation by connection to computer system 250. The just-described name and password are hereinafter referred to as TV-name and TV-password. Next, in act 922 microcontroller 901 waits for computer system 250 to provide a command. Thereafter, in act 923, when a command is received from computer system 250, microcontroller 901 executes the received command. For example, the command may be to navigate a currently playing video (such as fast forward, rewind, pause, play), to increase/decrease volume, to turn on/off the television, to read or store information in the memory of microcontroller 901 (such as user name and password).

On receipt of a command from computer system 250 to play a specific video from a specific content provider, in act 924 microcontroller 901 checks if the video is protected with a DRM (digital rights management) encryption scheme, such as a scheme available from Verimatrix, Inc. If the video is unprotected, then microcontroller 901 plays the video on TV screen 307 without any decryption, as per act 925. If the video is protected, then microcontroller 901 checks if the video can be decrypted in act 926 (e.g. if decryption software is present in memory) and if so uses a decryption scheme corresponding to the encryption scheme as per act 927 to decrypt the video and then plays the video on TV screen 307 as per act 925. As per act 926, if the video is found to be not authorized to be played by the DRM encryption scheme, then in act 927 microcontroller 901 transmits an error message to computer system 250 that in turn transmits the error message to handheld device 200 (and optionally microcontroller 901 additionally displays an error message on television 303). Then microcontroller 901 returns to act 922 (described above).

Figure 10A:
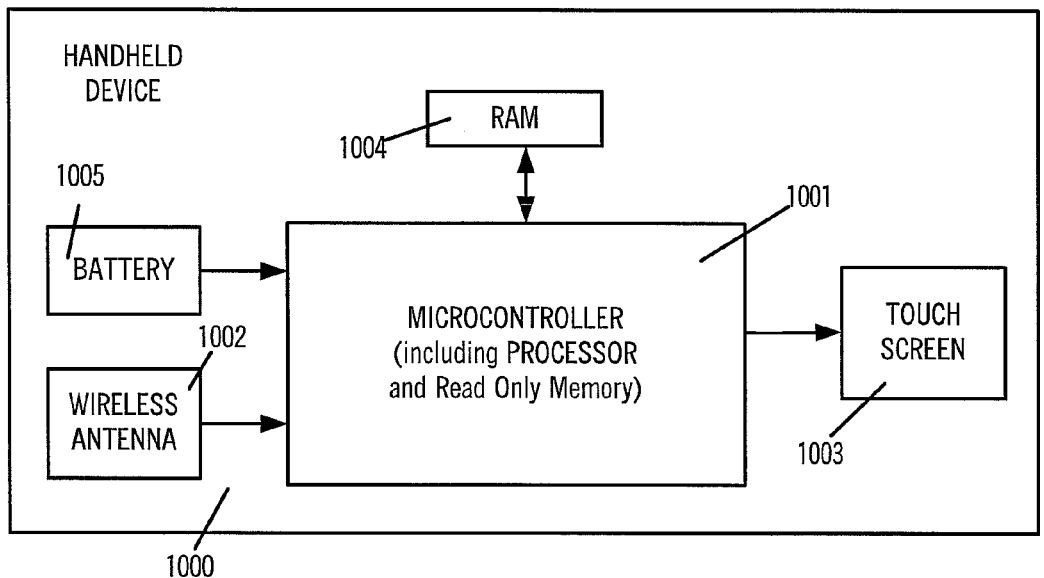
FIG. 10A illustrates, in a high level block diagram, a handheld device of the prior art, for use in some embodiments of the invention.
Figure 10B:
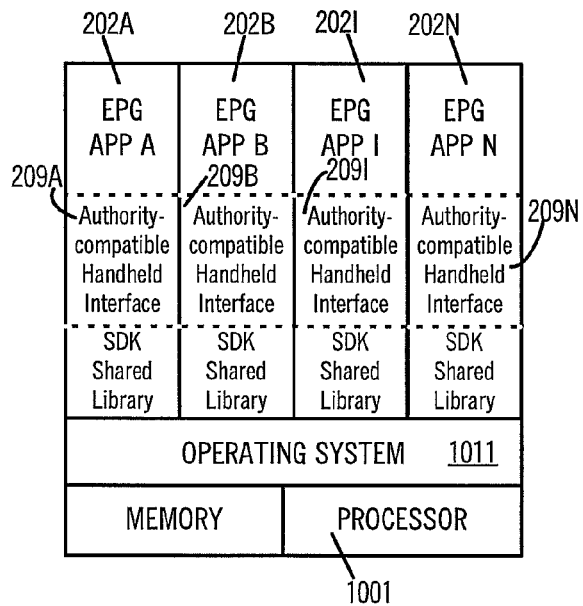
FIGS. 10B and 10C illustrate software stacks executed by alternative embodiments of a processor in a handheld device, in the implementation of FIG. 8B.
Figure 10C:
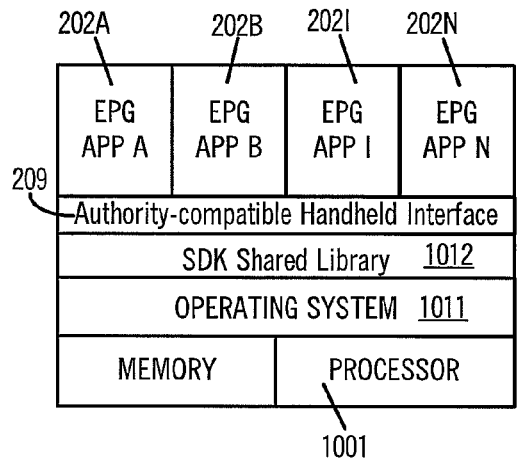
Figure 10D:
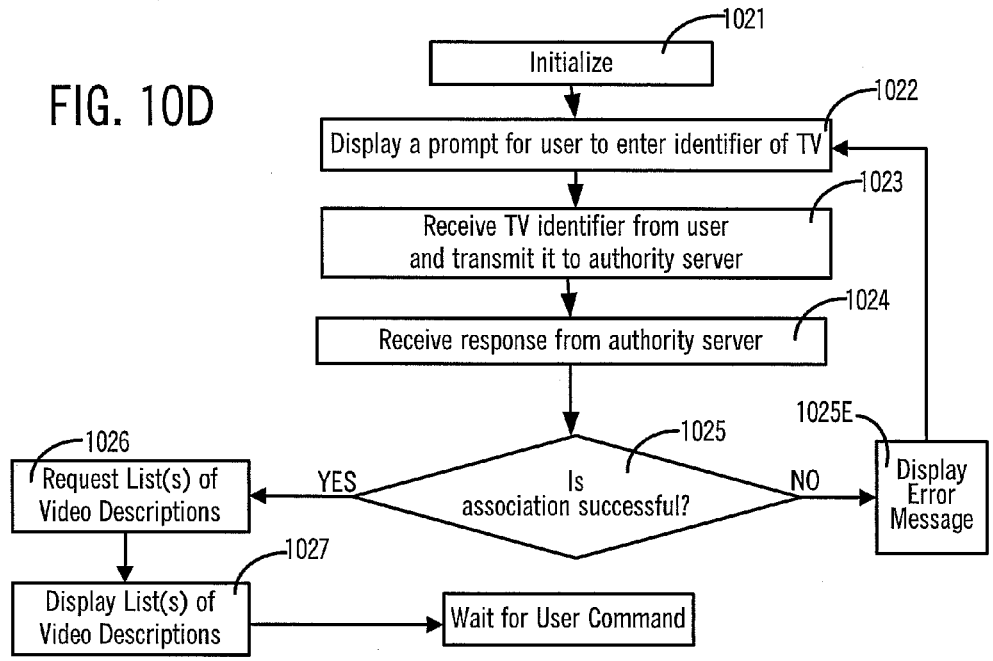
FIGS. 10D and 10E illustrates, in flow charts, acts performed by the processor of FIG. 10B (and also of FIG. 10C) in the implementation of FIG. 8B.
Figure 10E:
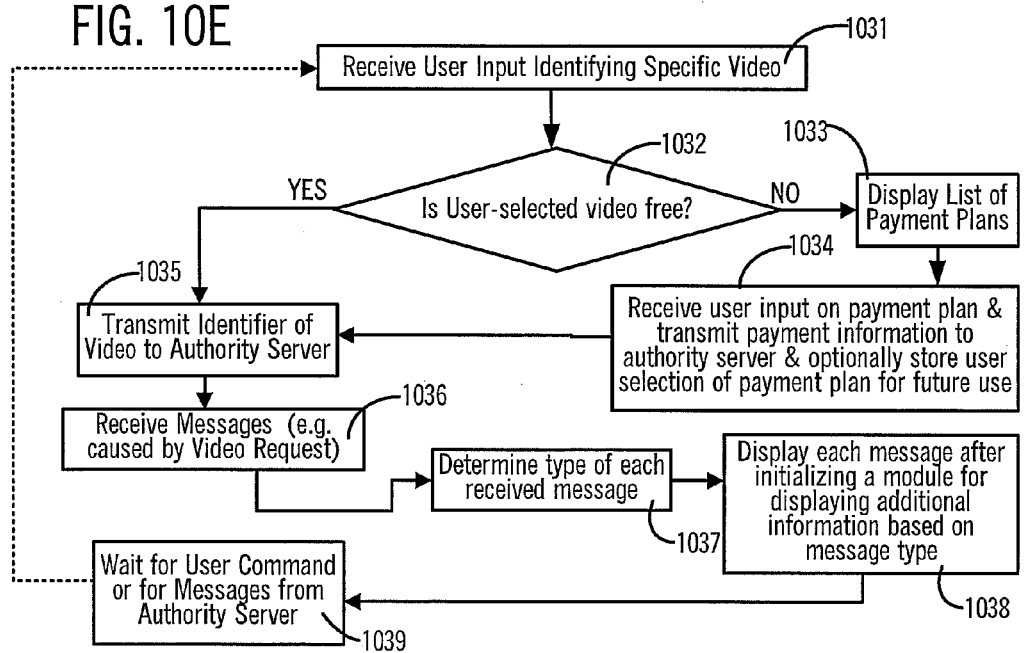

FIG. 10A illustrates, in a high level block diagram, a handheld device of the prior art, for use in some embodiments of the invention. Specifically, as shown in FIG. 10A, a handheld device includes a microcontroller 1001. Microcontroller 1001 in an illustrative embodiment of handheld device 200 is a single chip that includes a microprocessor, a read-only memory, a random-access memory (RAM), and an Ethernet interface circuit. An example of microcontroller 1001 is the product S5PC100 ARM Cortex-A8 available from Samsung Corporation, and used in the iPhone available from Apple, Inc. Microcontroller 801 is typically mounted on a printed circuit board and connected therethrough to an external memory 1004, a re-chargeable battery 1005, a wireless antenna 1002 and a touch-screen 1003. One illustrative embodiment in accordance with the invention uses a touch-screen of 320×480 pixels, 3.5 in (810 mm), 2:3 aspect ratio, 18-bit (262,144-color) LCD with 163 pixels per inch (ppi).

Microcontroller 1001 in some embodiments of handheld device 200 executes an operating system software 1011 stored in its memory 1004, such as the iPhone OS 3.1.2 (build 7D11), released Oct. 8, 20010 by Apple, Inc. Additionally, microcontroller 1001 of several such embodiments executes one or more EPG apps 202A, 202B, 202I, 202N also stored in memory 1004, each of which includes an authority-compatible handheld interface 2010I (FIG. 10B) in accordance with the invention and a SDK shared library that is specific to handheld device 200, and typically released by a manufacturer of handheld device 200. In alternative embodiments, an authority-compatible handheld interface 2010 is used in a shared manner similar to (or is included in) an operating system of handheld device 200. In the alternative embodiments, each of EPG apps 202A, 202B, 202I, 202N dynamically invokes execution of a function in the shared authority-compatible handheld interface 2010 (FIG. 10C) that in turn may dynamically invoke a function in the shared SDK library 1012.

In some embodiments, microcontroller 1001 is programmed by an authority-compatible handheld interface to perform acts 1021-1028 and 1031-1037 as follows. Specifically, in act 1021, microcontroller 1011 performs initialization operations, such as configuring an IP address for a wireless connection using antenna 1002 coupled by a cellular base station 308C to a wireless network 308. Also in act 1021, microcontroller 1001 communicates with computer system 250 to identify itself, e.g. by using an IP address of handheld device 200 used for the wireless connection. Next, in act 1022 microcontroller 1001 displays on the above-described handheld screen 204 (i.e. screen 1003 in FIG. 10A), a prompt for the user to enter an identifier of the TV, i.e. a TV-ID. In response to receipt of input from the user, in act 1023 microcontroller 1001 transmits the TV-ID to computer system 250. Note that a user's entry of a TV identifier is not required subsequently by certain embodiments that store the TV identifier locally within handheld device 200 or store such TV ID remotely in a database in computer system 250.

Thereafter, in act 1024 microcontroller 1001 receives a response from computer system 250, and checks the response in act 1025. If the response indicates failure, in act 1025E microcontroller 1001 displays an error message to the user on screen 204 (i.e. screen 1003). In act 1025, if the response is success, in act 1026 microcontroller 1001 sends a request to computer system 250 for lists of video descriptions. In act 1027, microcontroller 1001 receives and displays a video list and then waits in act 1028 for the user's command.

In several embodiments of the type described above, the user can navigate to a set up function in handheld device 200 at any time, or go back to a home screen of the EPG app 202I. The user can then select a video to be played from a list of videos, for example from a favorites screen. In act 1031, microcontroller 1001 receives input from the user which identifies a specific video. In some embodiments, in an act 1032 microcontroller 1001 checks an attribute of the user-selected video to identify a payment procedure to be followed. For example, if the attribute indicates that the user-selected video is free, microcontroller 1001 transmits (in act 1035) an identifier of the user-selected video in a video request 301 to computer system 250 and otherwise in act 1033 microcontroller 1001 displays on screen 204 (i.e. screen 1003 in FIG. 10A) a list of payment plans. In this example, the list of payment plans includes (a) free with commercials and (b) a predetermined amount (e.g. $1.10) without commercials.

In certain embodiments, the user's response (a) or (b) is received in act 1034 and saved as a default in handheld device 200, for use in future when the user selects another video. After act 1034, in act 1035 microcontroller 1001 transmits to computer system 250 an identifier of the user-selected video and the user's response (a) or (b) as to the payment procedure to be followed. Next, in act 1036 microcontroller 1001 receives from computer system 250 and displays on screen 204 a set of messages, such as multiple automatically-scrolled messages 305 (and optionally automatically-locked EPG item 304 depending on the embodiment). Thereafter, microcontroller 1001 determines the type of each received message in act 1037 and displays each received message after initializing (in act 1038) a specific module to be used for displaying additional information (in response to user selection of the received message) based on message type, and then goes to act 1039. Note that each specific module for displaying additional information is not invoked in act 1038 at this stage and instead invoked in response to user selection of the corresponding message displayed in window 251. In act 1039, microcontroller 1001 waits for a command from the user, and for additional messages from computer system 250. Computer system 250 additionally responds to the video request 301 as noted above, and the user-selected video starts to play, on whichever television 303 was identified by a TV identifier earlier received by computer system 250 from the same handheld device 200 and associated therewith (in act 1023 discussed above).

Figure 11A:
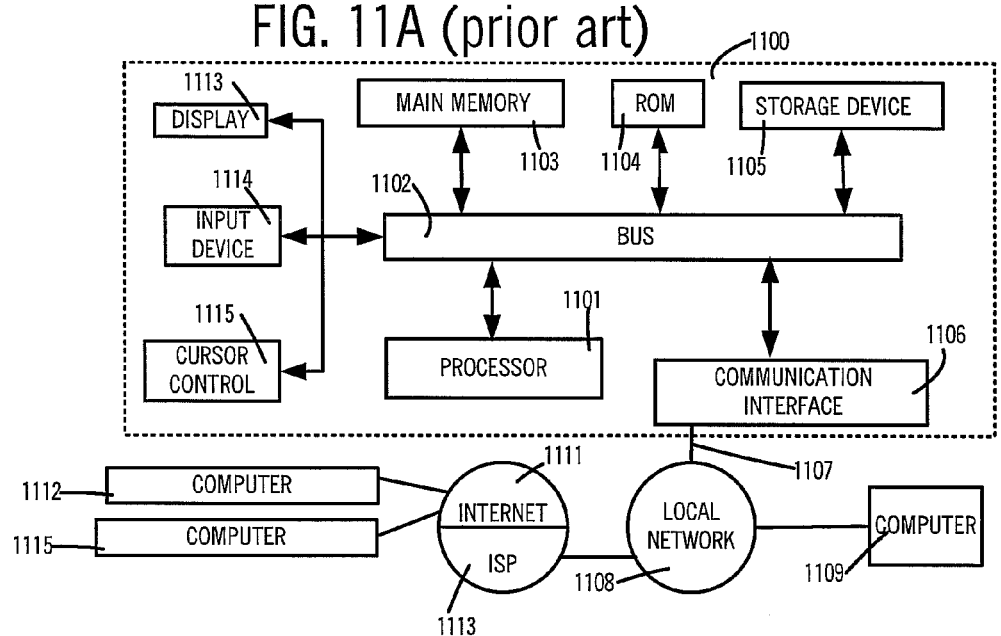
FIG. 11A illustrates, in a high level block diagram, a computer of the prior art, for use in some embodiments of the invention, as an authority server, a content provider server, and a message server (or message client).
Figure 11B:
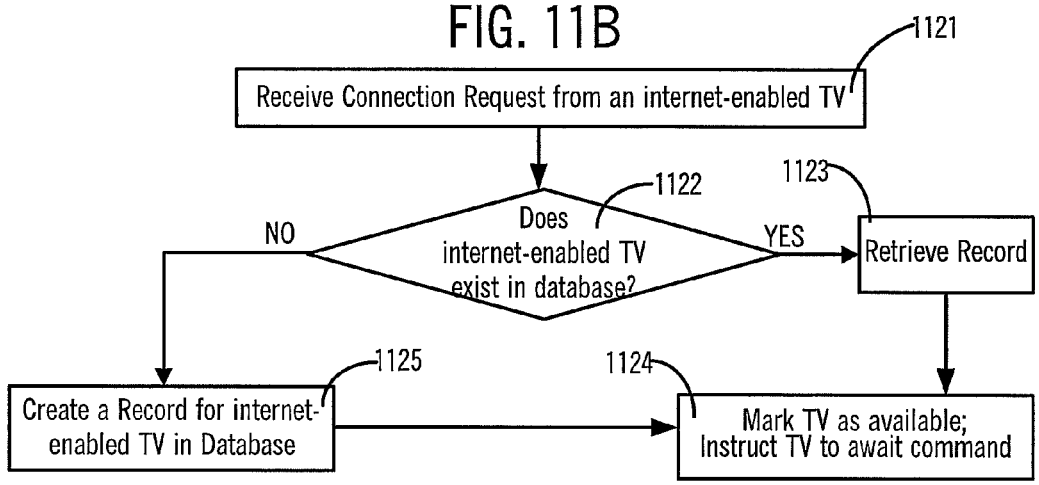
Figure 11C:
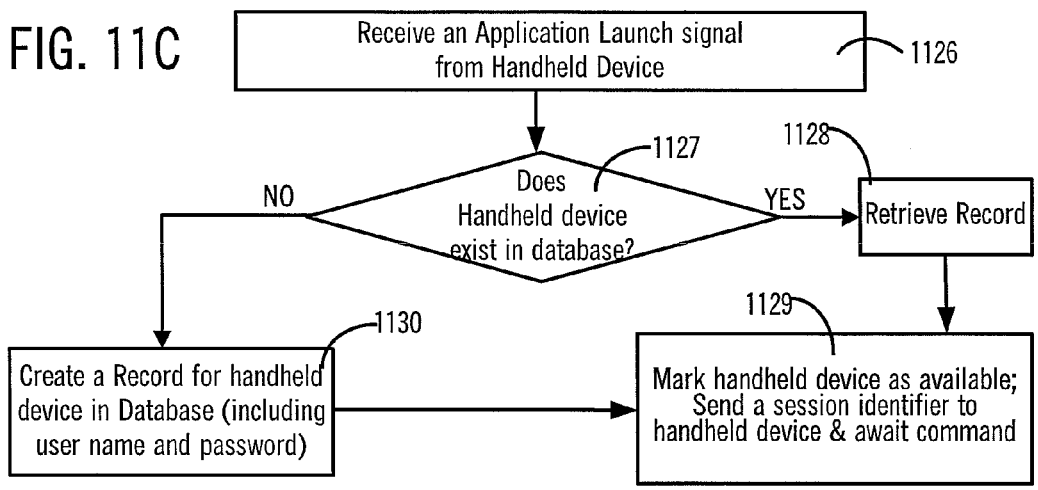
Figure 11D:
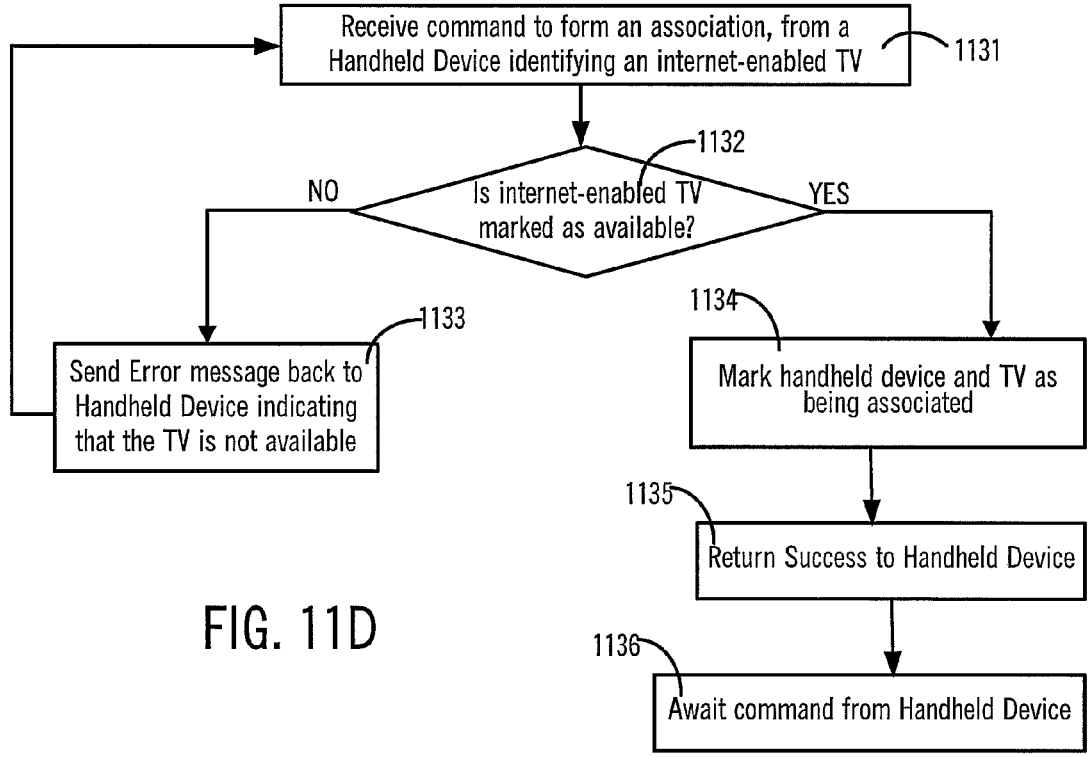
Figure 11E:
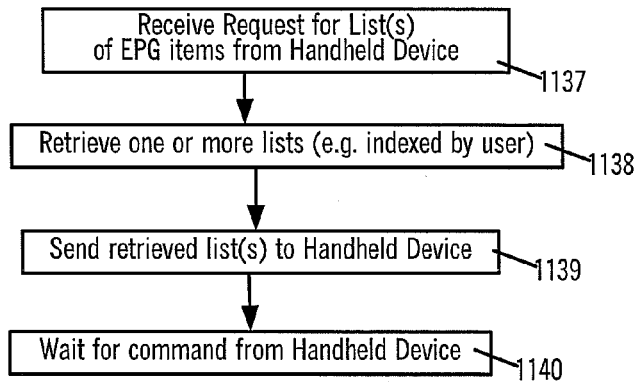
Figure 11F:
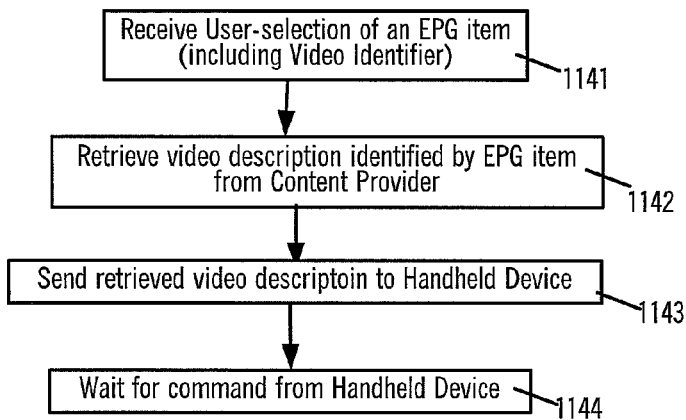
Figure 11G:
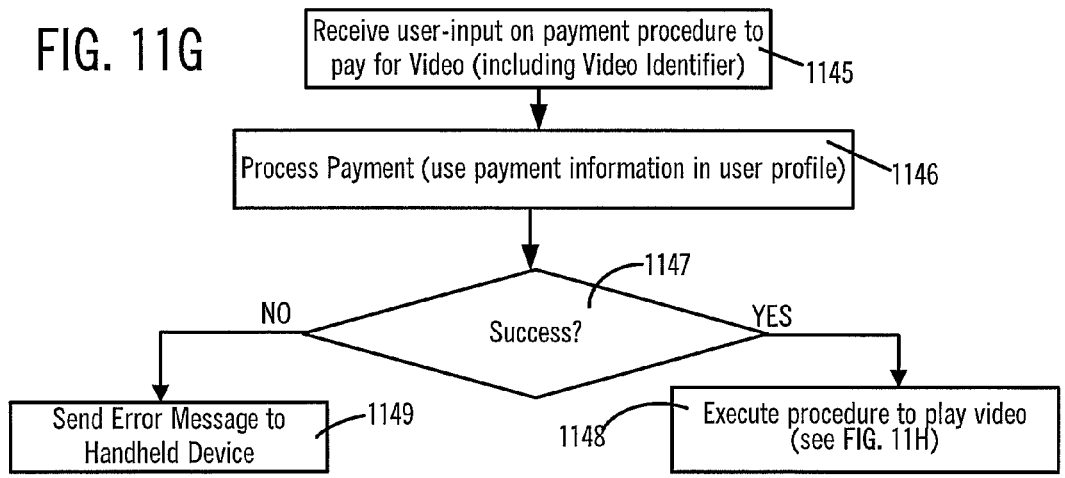
Figure 11I:
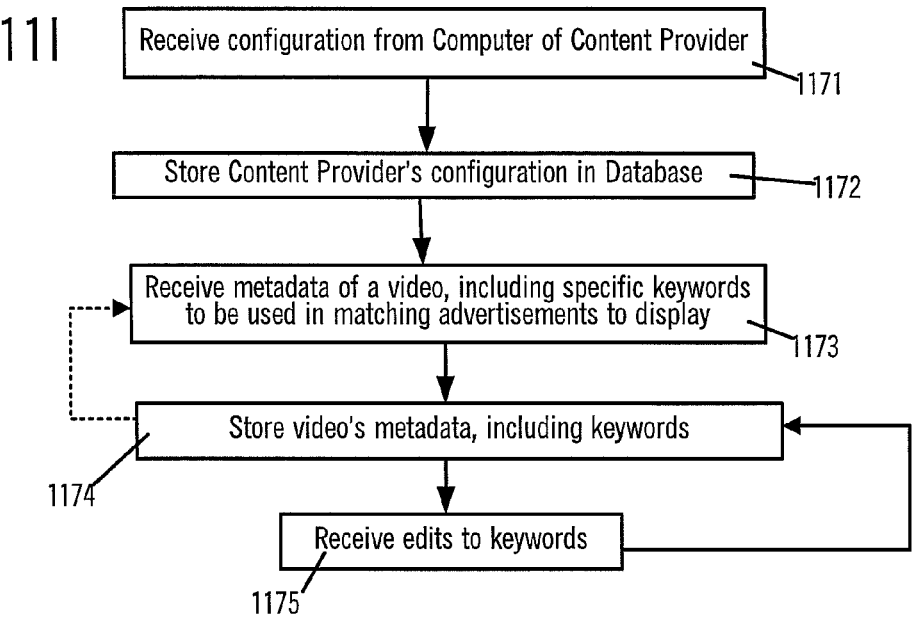
Figure 11J:
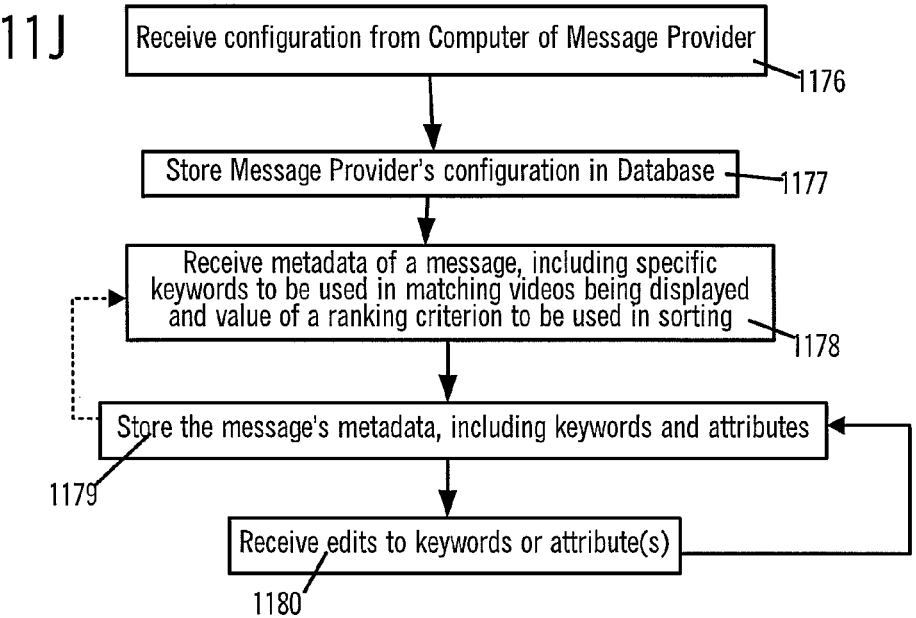

The three methods of FIG. 8A may be used to program three copies of a computer 1100 of the type illustrated in FIG. 11A as discussed next, to create an authority server, a content provider computer, and a message server (or message client). Specifically, computer 1100 includes a bus 1102 or other communication mechanism for communicating information, and a processor 1101 coupled with bus 1102 for processing information. Computer 1100 includes a main memory 1103, such as a random access memory (RAM) or other dynamic storage device, coupled to bus 1102 for storing information and instructions (e.g. for the method of FIG. 2A) to be executed by processor 1101.

Main memory 1103 also may be used for storing temporary variables or other intermediate information (such as a DRM token of the type described above) during execution of instructions to be executed by processor 1101. Computer 1100 further includes a read only memory (ROM) 1104 or other static storage device coupled to bus 1102 for storing static information and instructions for processor 1105, such as the software to implement acts illustrated in FIG. 8A. A storage device 1105, such as a magnetic disk or optical disk, is provided and coupled to bus 1102 for storing information and instructions.

Computer 1100 may be coupled via bus 1102 to a display device or video monitor 1113 such as a cathode ray tube (CRT) or a liquid crystal display (LCD), for displaying information to a human, e.g. information in database 831 (FIG. 8B) may be displayed on display 1113. An input device 1114, including alphanumeric and other keys (e.g. of a keyboard), is coupled to bus 1102 for communicating information and changes to processor 1101. Another type of user input device is cursor control 1115, such as a mouse, a trackball, or cursor direction keys for communicating information and command selections to processor 1101 and for controlling cursor movement on display 1113. This input device typically has two degrees of freedom in two axes, a first axis (e.g., x) and a second axis (e.g., y), that allows the device to specify positions in a plane.

Figure 8A:
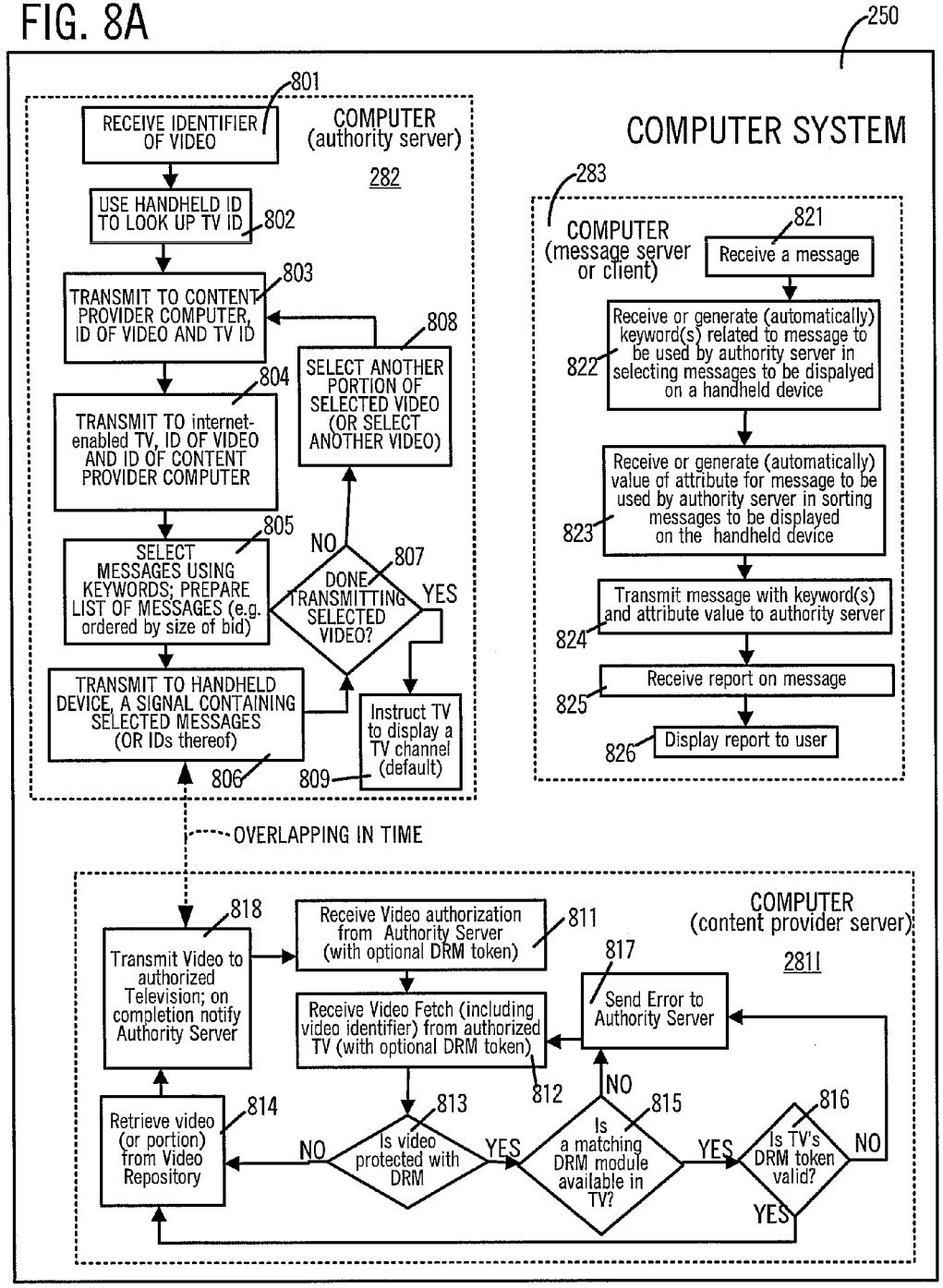
FIG. 8A illustrates acts performed by three computers included in a computer system 250 in an implementation illustrated in FIG. 8B, namely an authority server, a content provider server, and a message server (or message client).

As described elsewhere herein, the acts illustrated in FIG. 8A are performed in some embodiments in response to processor 1101 executing one or more sequences of one or more instructions that are contained in main memory 1106. Such instructions may be read into main memory 1103 from another computer-readable storage medium, such as storage device 1105. Execution of the sequences of instructions contained in main memory 1103 causes processor 1101 to perform the acts illustrated in FIG. 8A. In alternative embodiments, hard-wired circuitry may be used in place of or in combination with software instructions to implement the invention. Thus, embodiments of the invention are not limited to any specific combination of hardware circuitry and software.

The term "computer-readable storage device" as used herein refers to any storage device that participates in providing instructions to processor 1101 for execution therein, or data for processor 1101 to operate on. Such a storage device may take many forms, and may include, for example one or more of the following: (1) non-volatile storage media, and (2) volatile storage media. Common forms of non-volatile storage media include, for example, a floppy disk, a flexible disk, hard disk, optical disk, magnetic disk, magnetic tape, or any other magnetic medium, a CD-ROM, any other optical medium, punch cards, paper tape, any other physical medium with patterns of holes, a PROM, and EPROM, a FLASH-EPROM, any other memory chip or cartridge that can be used as storage device 1105. Volatile storage media include dynamic memory, such as main memory 1103 which may be implemented in the form of a random access memory or RAM.

Instead of or in addition to a storage device 1105, transmission link may be used to provide instructions to processor 1101. A transmission link includes coaxial cables, copper wire and fiber optics, including the wires that comprise bus 1102. A transmission link can also take the form of acoustic or light waves, such as those generated during radio-wave and infra-red data communications, any of which can be used to implement a carrier wave as described herein.

Accordingly, instructions to processor 1101 can be provided by a transmission link or by a storage device from which a computer can read information, such as data and/or code. Specifically, various forms of transmission link and/or storage device may be involved in providing one or more sequences of one or more instructions to processor 1101 for execution. For example, the instructions may initially be comprised in a storage device, such as a magnetic disk, of a remote computer. The remote computer can load the instructions into its dynamic memory (RAM) and send the instructions over a telephone line using a modem.

A modem local to computer 1100 can receive information on a telephone line and use an infra-red transmitter to transmit the information in an infra-red signal. An infra-red detector can receive the information carried in the infra-red signal and appropriate circuitry can place the information on bus 1102. Bus 1102 carries the information to main memory 1103, from which processor 1101 retrieves and executes the instructions. The instructions received by main memory 1103 may optionally be stored on storage device 1110 either before or after execution by processor 1101.

Computer 1100 also includes a communication interface 1106 coupled to bus 1102. Communication interface 1106 provides a two-way data communication coupling to a network link 1107 that is connected to a local network 1108. Local network 1108 may interconnect multiple computers (as described above). For example, communication interface 1106 may be an integrated services digital network (ISDN) card or a modem to provide a data communication connection to a corresponding type of telephone line. As another example, communication interface 1106 may be a local area network (LAN) card to provide a data communication connection to a compatible LAN. Wireless links may also be implemented. In any such implementation, communication interface 1106 sends and receives electrical, electromagnetic or optical signals that carry digital data streams representing various types of information.

Network link 1107 typically provides data communication through one or more networks to other data devices. For example, network link 1107 may provide a connection through local network 1108 to a local computer 1109 or to data equipment operated by an Internet Service Provider (ISP) 1111. ISP 1111 in turn provides data communication services through the world wide packet data communication network 1111, commonly referred to as the "Internet". Local network 1108 and network 1124 both use electrical, electromagnetic or optical signals that carry digital data streams. The signals through the various networks and the signals on network link 1107 and through communication interface 1106, which carry the digital data to and from computer 1100, are exemplary forms of carrier waves transporting the information.

Computer 1100 can send messages and receive data, including program code, through the network(s), network link 1107 and communication interface 1106. Computer 1100 might transmit information related a television 303 or a video 302 retrieved from a distributed database system in storage device 1105 through Internet 1111, ISP 1113, local network 1108 and communication interface 1106. The instructions for performing the operations of FIG. 8A may be executed by processor 1101 as they are received, and/or stored in storage device 1105, or other non-volatile storage for later execution.

FIGS. 11B-11J illustrate, in flow charts, acts performed by computer 282 operating as an authority server in the illustrative implementation. Specifically, in some embodiments, authority server 282 receives a connection request from an internet-enabled TV 303 in act 1121 (FIG. 11B) and goes to act 1122. In act 1122, authority server 282 checks if a record exists in database 831 (FIG. 8B) for internet-enabled TV 303 and if not goes to act 1125. In act 1125, authority server 282 creates a new record in database 831 using the information received in act 1121, and then goes to act 1124. In act 1124, authority server 282 marks TV 303 as being available and sends an instruction to TV 303 to await its next command. Then authority server 282 waits for a signal from handheld device 200 to be used to display video on TV 303. In act 1122 if authority server 282 finds that a record already exists in database 831, authority server 282 retrieves the record in act 1123 and then goes to act 1124 (described above).

In some embodiments, authority server 282 receives an application launch signal from a handheld device 200 in act 1126 (FIG. 11C) and goes to act 1127. In act 1127, authority server 282 checks if a record exists in database 831 (FIG. 8B) for handheld device 200 and if not goes to act 1130. In act 1130, authority server 282 creates a new record in database 831 using the information received in act 1126, and goes to act 1129. In act 1129, authority server 282 marks handheld device 200 as being available and sends a session identifier to handheld device 200, and then waits for any command from handheld device 200. The session identifier can be any number that uniquely identifies a session with a handheld device 200, e.g. from a counter that is sequentially incremented each time act 1129 is performed. In act 1127 if authority server 282 finds that a record already exists in database 831, authority server 282 retrieves the record in act 1128 and then goes to act 1129 (described above).

In some embodiments, in an act 1131 (FIG. 11D), authority server 282 receives a command to form an association, from a handheld device 200 identifying an internet-enabled TV, and goes to act 1132. In act 1132, authority server 282 checks if the identified TV has been marked as available and if not goes to act 1133. In act 1133, authority server 282 sends an error message to the handheld device 200 indicating that the identified TV is not available, and then returns to act 1131 (described above). In act 1132, if authority server 282 finds that the identified TV is marked available, then authority server 282 goes to act 1134. In act 1134, authority server 282 marks handheld device 200 as being associated with TV 303, e.g. identified by a session identifier. Next, authority server 282 goes to act 1135 and sends a signal to handheld device 200 indicating the command was successfully executed. Next, in act 1136, authority server 282 awaits a command from handheld device 200.

In some embodiments, in an act 1137 (FIG. 11E), authority server 282 receives from handheld device 200, a request for one or more list(s) of EPG items. Next, in act 1138, authority server 282 retrieves the requested list(s) from database 831 that contains a table of lists, indexed by user. Then, in act 1139, authority server 282 sends the retrieved list(s) to handheld device 200, and goes to act 1140. In act 1140, authority server 282 waits for a next command from handheld device 200.

In some embodiments, in an act 1141 (FIG. 11F), authority server 282 receives from handheld device 200, the identity of an EPG item that has been selected by the user, e.g. including a video identifier and an identifier of a content provider. Next, in act 1142, authority server 282 retrieves from a computer 281I of content provider, a video description identified by the EPG item selected by the user. Next, in act 1143, authority server 282 sends the retrieved video description to the handheld device 200. Thereafter, in act 1144, authority server 282 waits for another command from handheld device 200.

In some embodiments, authority server 282 receives the user's selection to pay for a video including a video identifier, in an act 1145 (FIG. 11G) and goes to act 1146. In act 1146, authority server 282 processes a payment for the video, e.g. using payment information in a profile of the user and then goes to act 1147. In act 1147, authority server 282 checks if the payment transaction completed successfully, and if not goes to act 1149. In act 1149, authority server 282 sends an error message to handheld device 1149, indicating that payment failed. In act 1147 if the answer is yes, then authority server 282 goes to act 1148 and invokes a procedure to play the video ("committed play"), illustrated in FIG. 11H and described next.

In some embodiments, authority server 282 receives a command to play a video in an act 1151 (FIG. 11H) and goes to act 1152. In act 1152, authority server 282 retrieves from database 831, an identifier of the TV 303 which is associated with the handheld device 200 and goes to act 1153. In act 1153, authority server 282 sends a command to play the video to computer 281I of the content provider and goes to act 1154. The command transmitted in act 282 includes an identifier of video 302 and an identifier of the TV 303 and optionally a DRM token of the type described above. In act 1154, authority server 282 sends to TV 303 a URL of a file containing the video at computer 281I, and optionally the same DRM token. Next, in act 1155, authority server 282 retrieves from database 831, a list of frames in the video 302 that are to trigger messages to be sent to handheld device 200 and thereafter sends the list to TV 303. Next, in act 1156, authority server 282 retrieves a list of keywords that are associated with the current frame number and goes to act 1157. Note that during a first iteration at the start of video 302, the current frame number is zero and on successive iterations the current frame number is received by authority server 282 from TV 303 as discussed below in reference to act 1163.

In act 1157, authority server 282 matches the retrieved keywords (at the current frame number), with keywords associated with messages in repository 835 (FIG. 8B) and goes to act 1158. During matching in act 1157, authority server 282 may use one or more attributes of the user of handheld device

200, depending on the embodiment. In act 1158, authority server 282 sorts messages resulting from act 1157, using a ranking criterion (e.g. if each message is associated with a value of a ranking criterion) and goes to act 1159.

Depending on the embodiment, the messages are sorted to be displayed at different positions in window 251 (FIG. 2G) relative to one another based on type, including two types namely a social media message and a promotional message. In one embodiment of act 1157, computer system 250 prepares a list of social media messages interspersed between promotional messages for display by handheld device 200, so that social media messages are displayed in areas 251A and 251J in FIG. 2G and promotional messages are displayed in areas 251I and 251M. In one such embodiment, the promotional messages are positioned in the list prepared by computer system 250 so that they are displayed in a specified order in the vertically downward direction on screen 204, the specified order being decided by computer system 250 based on bids by the corresponding advertisers in descending order.

In act 1159, authority server 282 sends to handheld device 200, a predetermined number of messages (e.g. four or five messages) from the top of the list of sorted messages and goes to act 1160. In act 1160, authority server 282 checks if all handheld devices that are associated with TV 303 have been messaged and if not returns to act 1157. If the answer in act 1160 is yes, then authority server 282 goes to act 1161. In act 1161, authority server 282 waits for a command from TV 303, and on receipt of the command goes to act 1162.

In act 1162, authority server 282 checks whether the display of video 302 has ended, and if so goes to act 1164 and otherwise goes to act 1163. In act 1163, authority server 282 checks whether a frame number has been received from TV 303 and if not goes to act 1161 (described above) and alternatively goes to act 1156 (described above). In act 1164, authority server 282 automatically selects a TV channel and transmits the channel number to TV 303. Accordingly, in such embodiments, on completion of video 302, TV 303 receives a channel number from authority server 282 and automatically tunes to the received channel number to display the TV program being received therefrom.

An alternative embodiment of authority server 282 performs the method illustrated in FIG. 11K instead of the method illustrated in FIG. 11H. In the method illustrated in FIG. 11K, acts 1151-1154 are performed in a manner identical to the method illustrated in FIG. 11H. In the method of FIG. 11K, after act 1154, authority server 282 goes to act 1155A to check if an event denoting a trigger has been received (e.g. from computer 281I of the content provider), and if not received loops back to again perform act 1155A (e.g. after a predetermined time period of waiting, such as 1 minute). In act 1155A of FIG. 11K, if the answer is yes, then authority server 282 goes to act 1155B to check if the trigger denotes the end of the video. If in act 1155B, authority server 282 finds that the display of the video has ended (e.g. as notified by computer 281I of a content provider), authority server 282 goes to act 1164 (and act 1164 is performed identical to the same act in FIG. 11H).

If in act 1155B, authority server 282 finds that the display of the video has not ended, then authority server 282 performs act 1156. In act 1156, authority server 282 retrieves keywords associated with the trigger received in act 1155A, and goes to act 1157A. In act 1157A, authority server 282 matches the trigger keywords (from act 1155A) with keywords associated with messages in the message repository and goes to act 1158. In performing the matching, authority server 282 may optionally use various attributes of the user of the handheld device, such as age and gender. Next, in act 1158, authority server 282 sorts the matching messages in a manner identical to the same act in FIG. 11H, followed by acts 1159 and 1160 also identical to FIG. 11H. If the answer in act 1160 is no in FIG. 11K, authority server 282 returns to act 1157A (described above), and alternatively if the answer is yes authority server 282 goes to act 1155A (also described above).

In several embodiments, in an act 1171 (FIG. 11I), authority server 282 receives configuration information (such as a URL) from computer 281I of a content provider and goes to act 1172. In act 1172, authority server 282 stores the received configuration information in database 831 and goes to act 1173. In act 1173, authority server 282 receives metadata of each video 302 that is accessible via computer 281I, including specific keywords that are to be used by authority server 282 in matching messages and goes to act 1174. In act 1174, authority server 282 stores the metadata and the keywords in its database 831 and goes to act 1175. In act 1175, authority server 282 receives edits (i.e. changes) to the keywords of a message in database 831, and goes to act 1174 (described above).

In certain embodiments, in an act 1176 (FIG. 11J), authority server 282 receives configuration information (such as a URL) from computer 283 of a message provider (e.g. an advertiser) and goes to act 1177. In act 1177, authority server 282 stores the received configuration information in database 831 and goes to act 1178. In act 1178, authority server 282 receives metadata of each message that is to be displayed, including specific keywords that are to be used by authority server 282 in matching videos and a value of a ranking criterion, and goes to act 1179. In act 1179, authority server 282 stores the message in repository 835 and the keywords in its database 831 and goes to act 1180. In act 1180, authority server 282 receives edits to the keywords of a message or an edit to the value of the ranking criterion and goes to act 1179 (described above).

Figure 12:
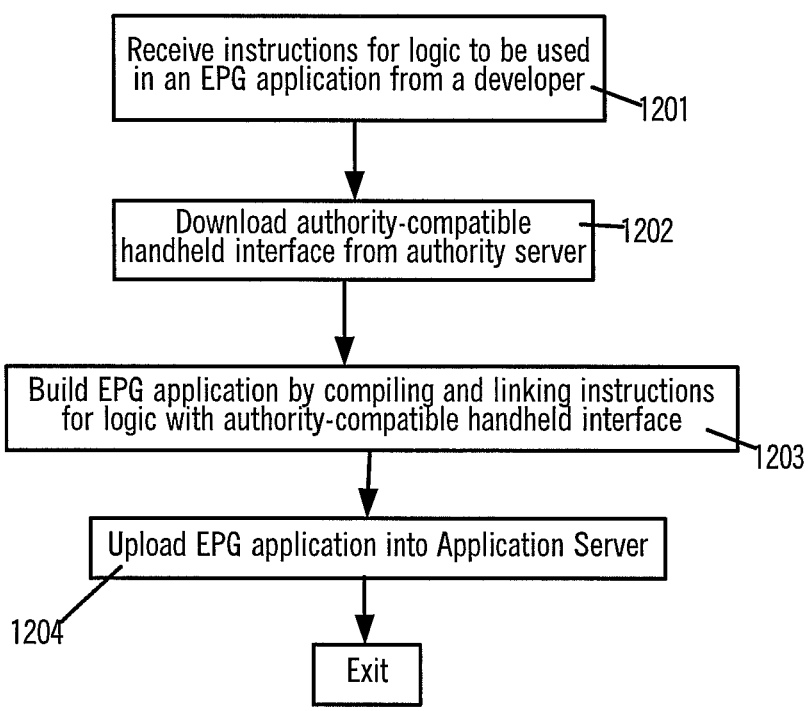
FIG. 12 illustrates, in a flow chart, acts performed by the content provider server of FIG. 8B, to create and upload an EPG app to the app server of FIG. 8B in an illustrative implementation of one embodiment of the invention.

In many embodiments, in an act 1201 (FIG. 12), computer 281I of a content provider receives instructions for logic to be used in an EPG app, from a human ("app developer") and goes to act 1202. In act 1202, computer 281I downloads from authority server 282, a most-current version of authority-compatible handheld interface software of the type described above and goes to act 1203. In act 1203, computer 281I builds an EPG app by compiling and linking instructions for the logic received from the developer, with the authority-compatible handheld interface software. Next, in act 1204, computer 281I uploads the EPG app to an app server (see top left corner of FIG. 8B), thereby to make it available for download into handheld device 200.

In certain illustrative embodiments of the invention, authority-compatible handheld interface software is implemented as an implementation library specific to the circuitry in handheld device 200. For example on the APPLE iPhone the implementation library for the authority-compatible handheld interface software is built on top of iPhone SDK (current version 3.1) and is referred to below as the iLook iPhone SDK. Note that the word "iLook" is used herein to denote one specific illustrative embodiment, and other embodiments will be readily apparent in view of this detailed description. In such embodiments, an EPG app 202I connects with computer system 250 using the iLook iPhone SDK. The following commands are supported on the iLook iPhone SDK. The typical invocation of commands using the iLook iPhone SDK API, is an invocation of a "sendCommand" function, with the appropriate command and its optional associated data (required for the command). The data is a dictionary (with Key and Value pairs) structure. Note that the word Key is used in the following description, synonymously with the word Name (e.g. Name and Value pairs).

In the iLook iPhone SDK API, RequestEPG is a command to request an electronic program guide i.e. a list of videos. The input data for this command contains the list type keyword with value of either "featured", "mostviewed", "favorite", "search". The return data is a list of videos in XML format contains text and graphics. RequestMessages is a command to request RADs (i.e. promotional messages from advertisers). The input data for this command contains the keyword VideoID with value of the video ID. The return is a list of messages in XML format contains text and graphics. SetVolume is a command to set the volume level. The input data for this command contains the volume level key word and the value of the volume. The return is the volume level set.

In the iLook iPhone SDK API, SetVideoRate is a command to set the video rate of play. Useful for fast forward and rewind. A positive value indicates fast forward and a negative values is rewind. Values can range from −16 to 16. The input data for this command contains the keyword VideoRate and the value has the video rate. The return is the video rate set. PlayVideo is a command to play video on the TV. The input data for this command contains the key VideoID and has value the Video ID. The return is success or failure. MessageSelected is a command to select a message and receive details about the message. The input data for this command contains a key for message and the value is the identifier of the message. The return is the message expressed in XML data, containing text and graphics.

In the iLook iPhone SDK API, BuyNowSelected is a command to purchase a selected product described in the promotional message. The input data for this command contains key for the message and the value is the identifier of the message, key for the product with value being the product ID, key for Quantity and the value of quantity, key for price and the value is the price. The return is either a success with transaction ID or a failure with message. RequestAssociation is a command to associate the iPhone with a television. The input data for this command contains an identifier of the television (e.g. in the form of a nickname previously registered with the authority server) and optionally a password for the TV. The return is success or failure.

In the iLook iPhone SDK API, SetVideoPosition is a command to set the position of the video. A position from 0 to the length of the video can be set. The return is the position of the video set. SaveFavorite is a command to save a video as a user favorite. The video id is added to the favorites list. The return is success or failure. PauseStream is a command to pause the video at the current play time. The return is success or failure. ResumeStream is a command to resume the video (usually a paused video). The return is success or failure. GetStatus is a command to get the status such as video play or pause, volume level, current location in video, video rate. The return is status message in XML format that contains text.

In several embodiments, in addition to using the iLook iPhone SDK API, the above-described EPG app 202I additionally uses the following functions of the iPhone SDK, after registering as a callback listener with event handling software in the iPhone SDK. A Volume Control key function that allows a user to use increase/decrease volume by pressing a physical key provided at the side of the handheld device, e.g. the APPLE iPhone. Every key press received from the iPhone SDK is tied to SetVolume function in the iLook iPhone SDK API. Wake up key—this key allows a user to wake up a program after sleep. When no activity is detected then the iPhone automatically shuts down the application in sleep mode. Invoking the wake up key reactivates the program display. Several embodiments of handheld device 200 support a Dismissing Application Key whereby EPG app 202I can be dismissed (closed down) by invoking the "dismiss" key function. The authority-compatible handheld interface software supports the dismissal of the EPG app with this key.

The above-described EPG app 202I also uses the following event keys of the iPhone SDK. A touch event key of the iPhone is generated whenever the user touches a certain area on the display. The touch event key is tied to various above-described actions performed by the EPG app 202I, such as scrolling a list of displayed items in response to flicking the finger up and down, or displaying additional detailed information in response to touching on a displayed message. For example, when an icon of EPG app 202I is touched, EPG app 202I is automatically launched, and when an EPG item in a list of EPG items is touched a video description is displayed. A button press event key of the iPhone invokes the action embodied behind the button in the EPG app 202I. Expansion using two fingers allows increasing the zoom into level, the opposite action of decrease reduces the zoom level.

In certain illustrative embodiments of the invention, authority-compatible set-top interface software is implemented as an implementation library specific to the circuitry in a data network interface circuit 392. Authority-compatible set-top interface software provides a common set-top API (called iLook set-top SDK API) for any chip vendor implementation of set top functionality. The iLook set-top SDK API is implemented in some embodiments using the existing chip vendor API functions. The iLook set-top SDK API includes a set of C code Bindings provided in a shared library (e.g. named iLookClient.so) that any developer of a set-top application can dynamically link and call in their application code. Since the iLook set-top SDK API is dependent on the chip vendor API implementation, several C Bindings are wrappers to existing functions in the chip vendor API. In some cases multiple DRM solutions are integrated in the end product by the developer. The following functions are supported by the iLook set-top SDK API in some embodiments of the invention.

In the iLook set-top SDK API, a function Init allows for initialization. Typically, the initialization function in the chip vendor API is invoked first. Next a series of initializations for iLook set-top SDK API are carried out, e.g. the authority server configuration parameters, IP settings, initialization of supported DRM modules, initialization of supported protocols for streaming. The return is success or failure. The function Terminate terminates the session and disconnects from the authority server. All associated resources are free-ed up, and processes, threads, state machines, etc. are shut down in an orderly manner. The return is success or failure. The function Connect connects to the authority sever and presents its credentials. During this process an authentication scheme is invoked to identify the set top with the authority server. After successful connection a connection handle is established with the authority server. The return is success or failure.

In the iLook set-top SDK API, a function VideoPlay allows a video content to be played. The current video streaming protocols supported are RTSP, UDP and HTTP Streaming. The later is preferred since this an established standard. RTSP, even though a standard has varying implementation depending on the content provider and service. To support various RTSP players there could be several implementations of VideoPlay. The parameters for video play function include the handle of the video (URL in HTTP Streaming), video handle ID and optionally video PIDs, audio PIDs, synch PIDs. The performance of the video play is highly dependent on the chip vendor's supported video formats, streaming buffer size/and its management, real time video codecs and video display layers. The return is success or failure.

In the iLook set-top SDK API, a function VideoPause pauses the video handle ID. The video stops play and the last frame is frozen on the TV screen. The return is success or failure. The function VideoResume resumes the video handle ID. The video resume to play from the last frozen frame on the TV screen. The return is success or failure. The function VideoSeek allows the user to seek anywhere within the length of the video. Video lengths are expressed in total number of frames of the entire content. Any number from 0 to the length of the video can be set at random. Seek values outside the range would result in a failure. The video resumes play after positioning at the seek value. The return is success or failure. The function VideoFastforward allows for fast forward of the video content. Supported fast forward speeds include 1×, 2×, 4×, 8× and 16×. During fast forward, selected in-between video frames are shown briefly on the TV display. If fast forward is not stopped the video will stop at the end of the video. The return is success or failure. The function VideoRewind allows for rewind of the video content. Supported rewind speeds include 1×, 2×, 4×, 8× and 16×. During fast forward, selected in-between video frames are shown briefly on the TV display. If rewind is not stopped the video will stop at the beginning of the video. The return is success or failure.

In the iLook set-top SDK API, a function SetAudioLevel sets the audio level. Audio levels are usually between 0 and 1. Some chip vendor may implement the scale differently and may choose logarithmic scales. The implementation of the function may include corrections to scales, such that the user experience appears to be linear. The return is success or failure. The function SetAudioMute mutes the audio, e.g. in response to touching button 252D illustrated in FIG. 2G. This is a convenience function and preserves the current volume level when unmute is called. The return is success or failure. The function SetAudioUnmute un-mutes the audio. This is a convenience function and preserves the volume level when mute was invoked. The return is success or failure. The function GetAudioLevel returns the current audio level. Audio levels are usually between 0 and 1. Some chip vendor may implement the scale differently and may choose logarithmic scales. The implementation of the function may include corrections to scales, such that the user experience appears to be linear. The return is success or failure.

A set-top application 916 (FIG. 9B) of some embodiments uses several underlying normal functions for the set top chip, in conjunction with the iLook Set top SDK API described above. The chip vendor usually implements user chip control by porting an existing Operating System such as Linux. A base chip instruction set is mapped to the operating system calls. Device drivers also use the base chip instruction set. Certain custom device drivers are implemented by the chip vendor to exercise the chip functions like codecs. Usually, the chip vendor publishes a standard API, implemented in C language code. Higher level functions that perform video play are usually supplied by the chip vendor or a 3rd party source. The iLook set-top SDK API uses existing implementations provided by the chip vendor or $3^{rd}$ party to control video. However, the iLook set-top SDK API is agnostic with respect to the underlying chip set and base applications running on the chip. The implementation code for the iLook set-top SDK API resides in chip flash memory and is referred to as firmware. It is possible to periodically re-flash the contents in chip flash memory, thereby updating the firmware to the latest revision of the implementation of the iLook set-top SDK API.

In some embodiments, a startup screen displayed upon power up by an internet-enabled television 303 includes a list of icons, and one of the icons in this list is an iLook icon. The iLook icon, when invoked, displays on the television screen, a graphical user interface (GUI) for the user to interact with the television using a normal infrared remote control ("IR remote"). A set-top application that displays the graphical user interface uses the iLook set-top SDK API. A set-top chip's vendor-supplied graphical user interface implementation libraries are used by set-top application to paint the TV screen with a predetermined GUI layout for the iLook set-top SDK API. In several embodiments, a user pressing any button on the IR Remote invokes the iLook set-top SDK API, which in turn displays the iLook GUI on the television screen. In alternative embodiments, the iLook GUI is displayed on the television screen only in response to the user pressing a specific predetermined button on the IR Remote.

In certain embodiments of the type described in the immediately preceding paragraph above, if the iLook set-top SDK API is controlled by the IR remote (e.g. EPG items share television screen 307 with video), when the user operates an EPG app in handheld device 200, the iLook set-top SDK API automatically changes the display on the television screen (e.g. moves the EPG items from the TV screen 307 to handheld screen 204). If the iLook set-top SDK API is controlled by the handheld device 200 (e.g. EPG items are shown on handheld screen 204 and only video is displayed on TV screen 307), when the user operates an IR remote, the iLook set-top SDK API automatically changes the display on the television screen (e.g. moves the EPG items from handheld screen 204 to the TV screen 307).

Such interactions with TV screen are supported in the iLook set-top SDK API using standard up, down, left, right, enter buttons on the IR remote, although selection using the IR remote is a cumbersome two step process. For example a keyboard display using the IR remote requires navigation to a specific key and requires the enter button to be invoked. iLook set-top SDK API makes the TV Screen and its interaction with the IR remote consistent with the corresponding interaction with handheld device 200. In some embodiments, software included in a handheld device contains the following: a list of commands, and lists of data relevant to each command (used by a program that communicates with authority server).

In one embodiment, a minimal configuration of the handheld device is limited to only an identifier of the handheld device, whereas other embodiments maintain in local storage a list of messages, that were recently displayed, and additional information for each message such as: (a) unique identifier of message (b) graphics or text content of the message. Other embodiments of the handheld device maintain certain configuration information either locally or within a data base of the authority server as follows: user's name and password, TV-name and TV-password, multiple lists of videos that may be of interest to the user, such as (A) featured, (B) most-viewed, (C) search and (D) favorites, wherein each video is described by an EPG item in each video list. Specifically, one embodiment of a video list maintains the following metadata for each EPG item in the list: a) title of the movie, (b) ratings, (c) number of times viewed globally by all users in the world (d) description of the movie, (e) pricing (free or specific price), (f) a globally unique video identifier, (g) thumbnail logo image of the movie, (h) an identifier of the content provider and (i) logo of the content provider—these are a sequence of EPG items in the EPG app.

In some embodiments, a handheld device 200 locally maintains in its own memory 385, certain video navigation information, such as (a) current status of display: such as play, fast forward, rewind, pause (b) length of currently playing movie (c) currently-playing movie—globally unique id (d) current location within the currently playing movie, (e) current volume level.

In some embodiments, software included in an internet-enabled television 303 in accordance with the invention contains a list of commands, and list of data relevant to each command (used by a program that communicates with authority server). Such a television 303 also maintains configuration information, either locally or within a database in the authority server as follows: identifier of the data network interface circuit of the TV, IP address, optionally DRM information such as a private encryption key supplied by a DRM vendor like Verimatrix.

In some embodiments, an authority server in accordance with the invention maintains in its database, the following information. Association information (also called "pairing") includes: identifier of the handheld device, user's name, Identifier of the data network interface circuit of the TV, IP address, TV-name and TV-password. USER INFORMATION—user's name and password, credit card information, user profile information (such as user's age, user's gender, user's height and weight, user's default preference of payment procedure for video display, user's education, user's salary, user's home address, shipping address, billing address, user's preference of movie ratings such as PG-13), Log of messages (optionally all messages historically displayed to the user), Log of videos played to user. MESSAGE (RADS) INFORMATION—database of messages (including author, amount of money paid by the author for the message to be displayed, date of submission, date of expiry, number of times shown to users, identity of each user to whom the message has been shown, identity of each user who has purchased a product or service identified in the message, keywords).

In some embodiments, an authority server in accordance with the invention maintains in its database, the following information on each content provider: name of content provider, URL of content provider, metadata to access videos at the content provider (such as identifier of video, rating of video, name of the DRM vendor (such as Verimatrix), and content provider's API for searching videos. In some embodiments, an authority server in accordance with the invention maintains in its database, the following information on each video: a temporary list of video descriptions including (a) title of the movie, (b) ratings, (c) number of times viewed globally by all users in the world (d) description of the movie, (e) pricing (free or specific price), (f) a globally unique video identifier, (g) thumbnail logo image of the movie, (h) an identifier of the content provider and (i) logo of the content provider and (j) keywords. Note that keywords are not sent to the user—and they can be static or they can be replaced periodically as the movie is played (i.e. dynamic).

In some embodiments, an authority server in accordance with the invention maintains in its database, the following information on each user: user's name and password, credit card information, user profile information (such as user's age, user's gender, user's height and weight, user's default preference of payment procedure for video display, user's education, user's salary, user's home address, shipping address, billing address, user's preference of movie ratings such as PG-13), Log of messages (optionally all messages historically displayed to the user), Log of videos played to user.

In some embodiments, an authority server in accordance with the invention maintains in its database, the following information on each message: repository of messages (including author, amount of money paid by the author for the message to be displayed, date of submission, date of expiry, number of times shown to users, identity of each user to whom the message has been shown, identity of each user who has purchased a product or service identified in the message, keywords).

In some embodiments, an authority server in accordance with the invention receives the following information from a handheld device: identifier of the handheld device, user's name and password, TV-name and TV-password, credit card information, user profile information (such as user's age, user's gender, user's height and weight, user's default preference of payment procedure for video display, user's education, user's salary, user's home address, shipping address, billing address, user's preference of movie ratings such as PG-13). VIDEO REQUEST includes: a globally unique video identifier, an identifier of the content provider, identifier of the handheld device, SEARCH REQUEST includes: a string of text to be used in searching videos.

In some embodiments, an authority server in accordance with the invention receives the following information from a handheld device for each purchase: identifier of product to be purchased, quantity, payment method, and a unique identifier of the transaction, all of which except for quantity originate from a message server computer. Moreover, each social media message received from the handheld device includes: a string of text, a destination identifier (such as a TWITTER ID).

In some embodiments, an authority server in accordance with the invention receives the following information from a handheld device: a social media message including: a string of text, a source identifier (such as a TWITTER ID)—e.g. from the TWITTER database, as a result of a search.

In some embodiments, an authority server in accordance with the invention transmits the following information to a handheld device: a social media message including: string of text, a source identifier (such as a TWITTER ID)—comes in real time from a person as a response to the user's text message, a promotional message including: a globally unique advertisement identifier, text and/or graphics, a product identifier, text string description of product and a list of EPG items, each EPG item including: text string of title, rating, number of views, text string description of video, a globally unique video identifier, and an identifier of the content provider. In some embodiments, an authority server in accordance with the invention receives the following information from a television: REGISTRATION information including an IP address, identifier of a chip in the set-top device, TV-name and TV-password. Moreover, the authority server transmits the following information to the television: a VIDEO STREAM including video and optionally a public encryption key, and COMMANDS including start, play, pause, stop, fast forward, change volume, turn on/off. In an iLook embodiment, computer system 250 supports three types of promotional messages ("RADs") whose placement on screen 204 changes depending on predetermined events, pricing mechanisms and targeting criteria. The three supported RAD types are: (1) associated with keywords (KRAD), (2) TV Commercials (CRAD) and (3) guaranteed placement (GRAD), as described below.

Computer system 250 of some embodiments selects each of the three types of RADs using a predetermined technique, e.g. using keywords associated with each RAD that are received from the RAD's advertiser. As noted above, in one predetermined technique, the RAD keywords are matched by authority server 282 to video keywords received from a content provider, e.g. in a list of video keywords ranked by relevance. Specifically, video keywords of a secondary video are matched by authority server 282 to keywords of a CRAD, whereas video keywords of a primary video are matched to a KRAD. Moreover, in some embodiments authority server 282 selects a RAD using another predetermined technique, independent of the user-selected video being played on television 303, and instead uses a keyword associated with a trigger event (e.g. 8 PM every day a RAD of a specific advertiser, such as COKE is displayed). Additionally, in some embodiments authority server 282 selects a RAD using yet another predetermined technique, independent of any keywords (and also independent of the video being played on television 303) and simply uses a size of each bid in selecting a RAD in response to a trigger event (e.g. 8 PM every day a RAD of the highest bidding advertiser, such as COKE is displayed).

A list of the first type of RADs, namely KRADs is created (e.g. see act 1302 in FIG. 13A) by computer system 250 based on matches between keywords associated with messages (also called "RADWords") that are paid for by advertisers (e.g. via an automatic auction mechanism implemented by computer system 250, also called "RADAuction") and a combination of keywords associated with videos (also called "RADSense") that are provided by Content Providers, and additional keywords associated with users (also called Profile keywords). This list of KRADs is sorted according to the size of each bid (e.g. a dollar amount) from each advertiser (which is an example of a ranking criterion, as described above) as illustrated by act 1304 in FIG. 13A and a new list containing the top five KRADs is prepared as illustrated by act 1306, and the new list is transmitted for display on handheld device 200 as illustrated by act 1307. In this list, the cost of a current KRAD charged to each advertiser is equal to the bid of the advertiser of a next KRAD located immediately below the current KRAD in the list. In some embodiments, advertisers only pay this cost when a KRAD is clicked by a user on a handheld device 200.

Content providers may associate RADSense keywords with specific frames of a video 302 (i.e. the video to be selected by the user for display on their television) in the list received in act 1301. In some embodiments, these RADSense keywords are associated with video frames at least 30 seconds apart in video 302. As a user watches their selected video on television 303 and during the video play clicks on RADs, the authority server (called iLook Back-end) accumulates matching RADSense and RADWord keywords, respectively, in the user's profile in database 831. This data is used to enhance the accuracy of matches between RADWords and Profile keywords in order to more effectively target KRADs.

As used below, a TV program is any video (such as a primary video described above) other than a TV commercial. A TV commercial is a video (such as a secondary video) that is transmitted on behalf of an advertiser. In some embodiments, when a Content provider inserts a TV commercial into a TV program, computer system 250 is notified, and computer system 250 provides the advertiser of the TV commercial with an opportunity to transmit to handheld screen 204, a second type of RAD namely a CRAD, at the same time the associated TV commercial is playing on TV screen 307.

Figure 13A:
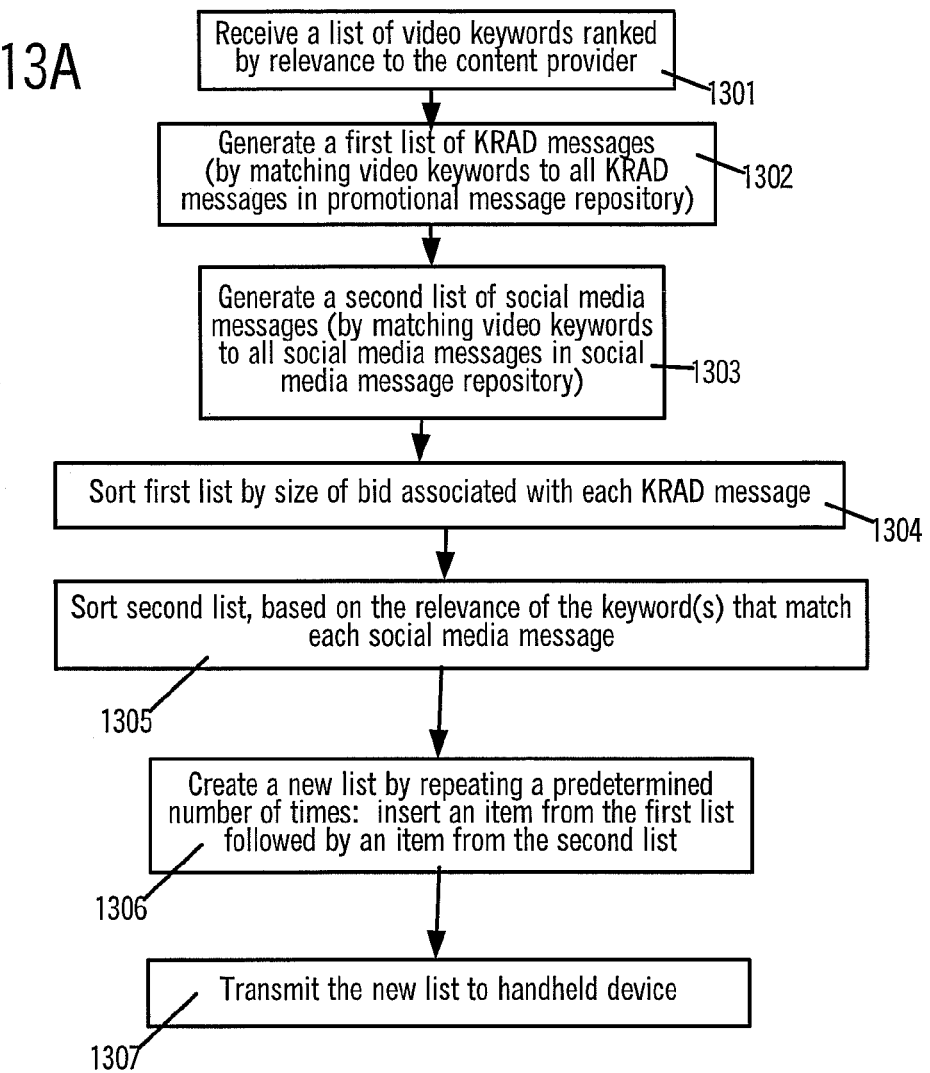

Several CRADs are typically transmitted by various advertisers via a message sever computer to the message repository used by computer system 250. These advertisers also submit, a bid for each CRAD and a number of keywords to be used by computer 250 in matching each CRAD to a video, e.g. as illustrated in act 1312 (FIG. 13B). Computer 250 sorts all matching CRADs (for a given video) based on the size of the advertiser's bid as illustrated in act 1313. The top-most CRAD in the sorted list is selected by computer 250 as illustrated by 1314, and the bid of the selected CRAD is used to decide whether or not to display the CRAD on the handheld device 200. As illustrated by act 1315 in FIG. 13B, in making this decision, computer 250 uses a KRAD list prepared as described above in reference to act 1302 of FIG. 13A. Specifically, in act 1316, computer system 250 sorts the KRAD list, by size of the advertisers bids for each KRAD in the list.

Next, computer 250 checks if the CRAD bid is higher than the highest bid for a KRAD (see act 1318 in FIG. 13B), and if yes computer system 250 prepares a new list including the CRAD (see act 1320) and transmits the new list to handheld device 200 as illustrated by act 1321. In act 1318 if the answer is no, then no message is transmitted by computer 250 to handheld device 200. In some embodiments, only one CRAD is served by computer system 250, for each TV commercial inserted by the content provider. In some embodiments, when a user clicks on a CRAD on their handheld device 200, computer system 250 charges the advertiser of the CRAD for an amount of the top KRAD bid (selected as per act 1317 in FIG. 13B) plus half of the difference between the CRAD bid and the top KRAD bid. In other embodiments, when a user clicks on a CRAD on their handheld device 200, computer system 250 charges the advertiser of the CRAD for the exact amount of the top KRAD bid. The top KRAD bid is the highest amount that has been bid for any KRAD currently displayed on handheld device 200. When the CRAD bid does not exceed the top KRAD bid, the CRAD is not displayed by handheld device 200 (i.e. the KRADs displayed on handheld screen 204 remain unchanged as illustrated by act 1319). The just-described difference splitting approach provides benefits in such embodiments of the invention, from added value that advertisers realize in their campaigns when their CRADs are displayed on handheld devices overlapping in time with their TV commercials being displayed on televisions.

In several of the above-described embodiments, an advertiser is charged whenever the KRAD or CRAD is touched by ("clicked by") a user of handheld device 200. In contrast, an advertiser of a third type of RAD, namely GRAD is charged in two different ways in combination with each other. Firstly, the GRAD advertiser is charged based on the total number of handheld devices 200 on which the GRAD has been displayed by computer system 250. Secondly, the GRAD advertiser is further charged whenever the GRAD is touched ("clicked") on handheld device 200. As used herein, a "CPM bid" is the amount an advertiser is willing to pay to have their GRAD displayed on one thousand (1000) handheld devices 200. Hence, the GRAD advertiser supplies computer system 250 with two bids for each GRAD, which are used as discussed next.

In some embodiments, GRADs are transmitted to handheld device 200 by computer system 250, based on the size of two bids: a first bid based on click-throughs to compete with the top KRAD, and a second bid to compete with other GRADs in an auction as follows. If the GRAD click-through bid is found during auction to be higher than the top KRAD's bid, and the GRAD's CPM bid is higher than CPM bids of other GRADs, the GRAD is transmitted to handheld device 200 by computer system 250. Identical to CRADs, the GRAD advertiser is charged the amount of the top KRAD bid plus half of the difference between the GRAD bid and the top KRAD bid each time the user clicks the GRAD. In addition, GRAD Advertisers are charged 1/1000 of their CPM bid each time their GRAD is transmitted. The transmission of GRADs is limited by computer system 250 of some embodiments using the same keywords that are used to filter the transmission of KRADs. For example, the transmission of a GRAD can be limited by computer system 250 to the display of a Super-bowl game (depending on the embodiment, either during an on-demand display or during a live broadcast). In another example, a GRAD can be transmitted by computer system 250 only to handheld devices 200 of women who are known to be pregnant (as per their user profile in database 831).

In some embodiments, computer system 250 is coupled to and uses multiple message repositories, for example a first message repository 835 maintained locally by computer 282 to hold promotional messages, and a second message repository 839 holding social media messages and made accessible by computer 838. Accordingly, in such embodiments, second message repository 839 is used by computer system 250 as illustrated by act 1303 in FIG. 13A, to generate a list of social media messages by matching video keywords to the keywords of all messages in the second message repository 839. Computer system 250 then sorts messages in this list, based on relevance of the video keywords that match each social media message as illustrated in act 1305 in FIG. 13A. The sorted list resulting from act 1305 is used with the sorted list from act 1304 to generate a new list as discussed above in reference to act 1306.

Note that act 1303 searches for social media messages using keywords that were automatically generated as noted above, for example, by automatically parsing. For this reason, the relevance of social media messages in the list generated in act 1303 is improved, by use of relevance of video keywords which is provided by a content provider, e.g. in a sorted list discussed above in reference to act 1301 in FIG. 13A. Moreover, the relevance to a user of handheld device 200 is further improved because only the top few (e.g. only two or three) social media messages at the top of the sorted list resulting from act 1305 are included in the new list created in act 1306.

In some embodiments, a user's selection ("first user input") of an EPG item 291A identifying a video 208A (FIG. 2B) on a handheld device 200 results in the video 208A being displayed on an associated television 303, and additionally also results in the following information being displayed on the handheld device 200: the same EPG item 291A identifying the now playing video 208A, and a window 251 (FIG. 2G) of one or more messages, such as promotional messages and/or social media messages (any of which is hereinafter "first information"). In these embodiments, when the user touches ("second user input") on the touch-sensitive screen 204 of the handheld device 200 in the area displaying a message (i.e. first information) in window 251, the handheld device 200 displays additional information ("second information") that is related to the displayed message (i.e. first information). Examples of additional information are illustrated in FIG. 2F for an EPG item, FIG. 2M for a promotional message, and FIG. 2H for a social media message. In these embodiments, when the user touches ("third user input") on the touch-sensitive screen of the handheld device 200 in the area displaying the additional information ("second information"), the handheld device 200 transmits a signal to the computer system 250, e.g. to buy an advertised product or to send a text message to a tweeter. Although only one display of additional information is shown in FIGS. 2F and 2M for EPG items and promotional messages, other embodiments may display further additional information ("third information") in response to third user input during the display of the second information, as illustrated for a social media message shown in FIGS. 2J and 2K, and still more additional information ("fourth information") as illustrated in FIG. 2L in response to another user input, e.g. touching of an area labeled "Friends" in the top right corner of FIG. 2K.

In some embodiments, in response to user selection ("first user input") of a video 302 in a list of EPG items displayed on a handheld screen 204, the handheld device 200 automatically displays a video description of the user-selected video 302 as illustrated in FIG. 2F. As noted above, the user may provide additional input ("second user input") by touching one of areas 276 or 278 during the display of the video description. In this example, handheld device 200 transmits to computer system 250 an identifier of the user-selected video 302 only in response to receipt of the second user input. In other embodiments, e.g. if a user-selected video 302 is free, the handheld device 200 does not display the video description of user-selected video 302 and instead directly responds to receipt of the first user input by transmitting the identification of the user-selected video 302 to computer system 250.

Numerous modifications and adaptations of the embodiments described herein will become apparent to the skilled artisan in view of this disclosure.

Numerous modifications and adaptations of the embodiments described herein are encompassed by the scope of the invention.

What is claimed is:

1. A method of displaying video on a television and displaying information on a handheld device, using a computer system coupled to at least the television, the computer system comprising a computer, each of the computer, the handheld device and the television comprising at least a processor and a memory, the method comprising:
    the handheld device displaying a plurality of items in an electronic program guide, of a corresponding plurality of videos available for display on the television via a network;
    the handheld device receiving user input indicative of an item selected from among the plurality of items in the electronic program guide, corresponding to a video comprised in the plurality of videos available for display;
    the handheld device transmitting to the computer system, an identification of the video;
    in response to receipt of the identification, the computer system transmitting to the television, a sequence of frames in the video;
    in response to receipt of the identification, the computer system additionally transmitting to the handheld device, a signal comprising at least one of (a) information to be displayed or (b) an identifier of said information;
    the television automatically displaying on a television screen therein, the sequence of frames on receipt thereof from the computer system; and
    the handheld device automatically displaying on a handheld screen therein, said information on receipt of the signal from the computer system.

2. The method of claim 1 wherein said user input is hereinafter "first user input", and said information to be displayed is hereinafter "first information", the method further comprising:
    the handheld device receiving a second user input during the display of said first information;
    in response to the second user input, the handheld device automatically displaying second information related to said first information; and
    the handheld device transmitting to the computer system, another signal based on receipt of a third user input.

3. The method of claim 1 further comprising:
    the computer system using a keyword associated with the video to select said information to be displayed.

4. The method of claim 1 further comprising:
the computer system using a keyword associated with a frame comprised in the sequence of frames in the video, to select from a storage device, said information to be displayed.

5. The method of claim 1 further comprising:
the computer system additionally transmitting to the television, an additional series of frames in an additional video;
the television automatically displaying on the television screen, the additional series of frames; and
the computer system using a keyword associated with one of the video and the additional video, to select from a storage device, said information.

6. The method of claim 1 further comprising:
the computer system using a criterion associated with the handheld device to filter said information prior to transmission to the handheld device.

7. The method of claim 1 further comprising:
the computer system selecting said information independent of the video, from a repository.

8. The method of claim 1 wherein:
the video is associated with a first keyword;
at least a portion of said information is associated with a second keyword; and
the method further comprises the computer system matching the first keyword and the second keyword to one another.

9. The method of claim 1 further comprising:
the computer system automatically identifying a subset of computer files from among a plurality of computer files using a predetermined technique;
the computer system automatically sorting identifiers of computer files in the subset into a sorted list based on a ranking criterion; and
the computer system automatically identifying a computer file from the top of the sorted list;
wherein at least a portion of said information is comprised in the computer file.

10. The method of claim 1 wherein:
a first computer comprised in the computer system performs the transmitting of the signal to the handheld device;
a second computer comprised in the computer system performs the transmitting of the sequence of frames to the television;
the first computer transmits to the second computer, another signal comprising the identification of the video and an identification of the television; and
the second computer comprises a storage device and said storage device comprises the video.

11. The method of claim 1 further comprising:
at least one of the television or the handheld device transmitting to the computer system an association between an identification of the handheld device and an identification of the television.

12. The method of claim 1 wherein:
the handheld device comprises a cellular phone;
said identification is transmitted by the cellular phone to a cellular base station outside a building comprising the television.

13. The method of claim 1 wherein:
the handheld device comprises a cellular phone;
the method further comprises downloading into the cellular phone an application comprising the electronic program guide.

14. The method of claim 1 wherein said user input is hereinafter "first user input", the method further comprising:
in response to the first user input, the handheld device automatically displaying a description of the video; and
the handheld device receiving a second user input during the display of said description;
wherein the handheld device performs said transmission of the identification of the video in response to receipt of the second user input.

15. The method of claim 1 wherein the handheld device performs said transmission of the identification of the video in response to receipt of said user input.

16. The method of claim 1 wherein:
said information comprises a plurality of messages;
a first message in said plurality of messages is a social media message comprising a user name and a string of text input by a user having said user name; and
a second message in said plurality of messages is a promotional message comprising a name of a product.

17. The method of claim 1 wherein:
the handheld device comprises a wireless antenna;
said identification is transmitted by the wireless antenna to a wireless access point inside a building comprising the television.

18. The method of claim 1 further comprising:
the computer system maintaining in a database, additional information in which the television and the handheld device are associated with one another.

19. The method of claim 1 wherein:
the computer is hereinafter first computer;
the signal is transmitted by the first computer; and
the sequence of frames are transmitted by a second computer in the computer system.

20. The method of claim 1 wherein:
said information is matched to the sequence of frames by use of a globally unique identifier associated with each of said information and the sequence of frames.

21. The method of claim 1 wherein:
said information is transmitted from the computer system, through a data network, to the handheld device.

22. The method of claim 1 wherein:
said identification is transmitted from the handheld device, through a data network, to the computer system.

23. The method of claim 22 wherein:
said identification is transmitted from the handheld device, via a data network interface circuit, to the data network; and
the data network interface circuit is comprised in an Internet-enabled television.

24. A system for displaying video on a television and displaying information on a handheld device, the system comprising a computer system coupled to at least the television, each of the computer system, the handheld device and the television comprising at least a processor and a memory, wherein:
the handheld device comprises means for displaying a plurality of items in an electronic program guide, of a corresponding plurality of videos available for display on the television;
the handheld device comprises means for receiving user input indicative of an item selected from among the plurality of items in the electronic program guide, corresponding to a video comprised in the plurality of videos available for display;
the handheld device comprises means for transmitting to the computer system, an identification of the video;

the computer system comprises means, responsive to receipt of the identification, for transmitting to the television, a sequence of frames in the video;

the computer system further comprises means, responsive to receipt of the identification, for additionally transmitting to the handheld device, a signal comprising at least one of (a) information to be displayed or (b) an identifier of said information;

the television comprises means for automatically displaying on a television screen therein, the sequence of frames on receipt thereof from the computer system; and the handheld device comprises means for automatically displaying on a handheld screen therein, said information on receipt of the signal from the computer system.

25. The system of claim 24 wherein:

the computer system comprises means for using a keyword associated with the video to select said information to be displayed.

26. The system of claim 24 wherein:

the computer system comprises means for using a keyword associated with a frame comprised in the sequence of frames in the video, to select from a storage device, said information to be displayed.

27. The system of claim 24 wherein:

the means for transmitting is comprised in a first computer in the computer system; and the means for additionally transmitting is comprised in a second computer in the computer system.

28. One or more non-transitory computer-readable storage media comprising a plurality of instructions to cause displaying of video on a television and to cause displaying of information on a handheld device, using a computer system coupled to at least the television, the computer system comprising a computer, each of the computer, the handheld device and the television comprising at least a processor and a memory, the plurality of instructions comprising:

instructions to the handheld device to display a plurality of items in an electronic program guide, of a corresponding plurality of videos available for display on the television via a network;

instructions to the handheld device to receive user input indicative of an item selected from among the plurality of items in the electronic program guide, corresponding to a video comprised in the plurality of videos available for display;

instructions to the handheld device to transmit to the computer system, an identification of the video;

responsive to receipt of the identification, instructions to the computer system to transmit to the television, a sequence of frames in the video;

responsive to receipt of the identification, instructions to the computer system to additionally transmit to the handheld device, a signal comprising at least one of (a) information to be displayed or (b) an identifier of said information;

instructions to the television to automatically display on a television screen therein, the sequence of frames on receipt thereof from the computer system; and instructions to the handheld device, to automatically display on a handheld screen therein, said information on receipt of the signal from the computer system.

29. The one or more non-transitory computer-readable storage media of claim 28 wherein said user input is hereinafter "first user input", and said information to be displayed is hereinafter "first information", wherein the plurality of instructions further comprise:

instructions to the handheld device to receive a second user input during the display of said first information;

instructions to the handheld device, responsive to the second user input, to automatically display second information related to said first information; and instructions to the handheld device to transmit another signal based on receipt of a third user input.

30. The one or more non-transitory computer-readable storage media of claim 28 wherein the plurality of instructions further comprise:

instructions to the computer system to use a keyword associated with the video to select said information to be displayed.

31. The one or more non-transitory computer-readable storage media of claim 28 wherein the plurality of instructions further comprise:

instructions to the computer system to use a keyword associated with a frame comprised in the sequence of frames in the video, to select from a storage device, said information to be displayed.

32. The one or more non-transitory computer-readable storage media of claim 28 wherein the plurality of instructions further comprise:

instructions to the computer system to additionally transmit to the television, an additional series of frames in an additional video;

instructions to the television to automatically display on the television screen, the additional series of frames; and instructions to the computer system to use a keyword associated with one of the video and the additional video, to select from a storage device, said information.

33. The one or more non-transitory computer-readable storage media of claim 28 wherein the plurality of instructions further comprise:

instructions to the computer system to use a criterion associated with the handheld device to filter said information prior to transmission to the handheld device.

34. The one or more non-transitory computer-readable storage media of claim 28 wherein the plurality of instructions further comprise:

instructions to the computer system to select said information independent of the video, from a repository.

35. The one or more non-transitory computer-readable storage media of claim 28 wherein:

the video is associated with a first keyword;

at least a portion of said information is associated with a second keyword; and the plurality of instructions further comprise instructions to the computer system to match the first keyword and the second keyword to one another.

36. The one or more non-transitory computer-readable storage media of claim 28 wherein the plurality of instructions further comprise:

instructions to the computer system to automatically identify a subset of computer files from among a plurality of computer files using a predetermined technique;

instructions to the computer system to automatically sort identifiers of computer files in the subset into a sorted list based on a ranking criterion; and instructions to the computer system to automatically identify a computer file from the top of the sorted list;

wherein at least a portion of said information is comprised in the computer file.

37. The one or more non-transitory computer-readable storage media of claim 28 wherein:

a first computer comprised in the computer system executes the instructions to transmit the signal to the handheld device;

a second computer comprised in the computer system executes the instructions to transmit the sequence of frames to the television; and the plurality of instructions further comprise instructions to the first computer to transmit to the second computer, another signal comprising the identification of the video and an identification of the television.

38. The one or more non-transitory computer-readable storage media of claim 28 wherein the plurality of instructions further comprise:

instructions to at least one of the television or the handheld device transmitting to the computer system an association between an identification of the handheld device and an identification of the television.

39. The one or more non-transitory computer-readable storage media of claim 28 wherein the handheld device comprises a cellular phone and the plurality of instructions comprise:

instructions to the cellular phone to transmit said identification to a cellular base station outside a building comprising the television.

40. The one or more non-transitory computer-readable storage media of claim 28 wherein the handheld device comprises a cellular phone and the plurality of instructions comprise:

instructions to download into the cellular phone an application comprising the electronic program guide.

41. The one or more non-transitory computer-readable storage media of claim 28 wherein said user input is hereinafter "first user input" and the plurality of instructions comprise:

instructions, responsive to the first user input, to the handheld device to automatically display a description of the video; and instructions to the handheld device to receive a second user input during the display of said description.

42. The one or more non-transitory computer-readable storage media of claim 28 wherein the plurality of instructions comprise:

instructions to the handheld device to perform said transmission of identification of the video in response to receipt of said user input.

43. The one or more non-transitory computer-readable storage media of claim 28 wherein:

said information comprises a plurality of messages;

a first message in said plurality of messages is a social media message comprising a user name and a string of text input by a user having said user name; and a second message in said plurality of messages is a promotional message comprising a name of a product.

44. The one or more non-transitory computer-readable storage media of claim 28 wherein the handheld device comprises a wireless antenna and the plurality of instructions comprise:

instructions to the handheld device to transmit said identification via the wireless antenna to a wireless access point inside a building comprising the television.

45. The one or more non-transitory computer-readable storage media of claim 28 wherein the plurality of instructions comprise:

instructions to the computer system to maintain in a database, additional information in which the television and the handheld device are associated with one another.

46. The one or more non-transitory computer-readable storage media of claim 28 wherein the computer is hereinafter first computer, the signal is transmitted by the first computer, and the plurality of instructions comprise:

instructions to a second computer in the computer system to transmit the sequence of frames.

47. The one or more non-transitory computer-readable storage media of claim 28 wherein the plurality of instructions comprise:

instructions to match said information to the sequence of frames by use of a globally unique identifier associated with each of said information and the sequence of frames.

48. The one or more non-transitory computer-readable storage media of claim 28 wherein the plurality of instructions comprise:

instructions to transmit said information from the computer system, through a data network, to the handheld device.

49. The one or more non-transitory computer-readable storage media of claim 28 wherein the plurality of instructions comprise:

instructions to transmit said identification from the handheld device, through a data network, to the computer system.

50. The one or more non-transitory computer-readable storage media of claim 49 wherein the plurality of instructions comprise:

instructions to transmit said identification from the handheld device, via a data network interface circuit, to the data network;

wherein the data network interface circuit is comprised in an Internet-enabled television.

* * * * *